United States Patent
Eriksson et al.

(10) Patent No.: US 12,166,664 B2
(45) Date of Patent: Dec. 10, 2024

(54) FIRST NODE, SECOND NODE, FOURTH NODE AND METHODS PERFORMED THEREBY IN A COMMUNICATIONS NETWORK

(71) Applicant: Telefonaktiebolaget LM Ericsson (publ), Stockholm (SE)

(72) Inventors: Per-Erik Eriksson, Stockholm (SE); Jose Luis Pradas, Stockholm (SE); Ajmal Muhammad, Sollentuna (SE); Marco Belleschi, Solna (SE); Oumer Teyab, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 381 days.

(21) Appl. No.: 17/775,933

(22) PCT Filed: Nov. 23, 2020

(86) PCT No.: PCT/SE2020/051111
§ 371 (c)(1),
(2) Date: May 11, 2022

(87) PCT Pub. No.: WO2021/101435
PCT Pub. Date: May 27, 2021

(65) Prior Publication Data
US 2022/0393966 A1 Dec. 8, 2022

Related U.S. Application Data

(60) Provisional application No. 63/094,376, filed on Oct. 21, 2020, provisional application No. 62/938,404, filed on Nov. 21, 2019.

(51) Int. Cl.
*H04L 45/00* (2022.01)
*H04L 45/24* (2022.01)
(Continued)

(52) U.S. Cl.
CPC .............. *H04L 45/20* (2013.01); *H04L 45/24* (2013.01); *H04W 40/22* (2013.01); *H04L 45/302* (2013.01)

(58) Field of Classification Search
CPC ....... H04L 45/20; H04L 45/24; H04L 45/302; H04W 40/22
See application file for complete search history.

(56) References Cited

U.S. PATENT DOCUMENTS

| 8,634,297 B2 | 1/2014 | Mishra et al. | |
| 2020/0351749 A1* | 11/2020 | Tesanovic | H04W 28/0268 |
| 2020/0383030 A1* | 12/2020 | Cho | H04W 40/28 |

OTHER PUBLICATIONS

International Search Report and Written Opinion dated Apr. 13, 2021 for International Application No. PCT/SE2020/051111 filed Nov. 23, 2020, consisting of 19-pages.
(Continued)

*Primary Examiner* — Hashim S Bhatti
(74) *Attorney, Agent, or Firm* — Weisberg I.P. Law, P.A.

(57) ABSTRACT

A method performed by a first node. The first node operates in a communications network. The first node determines, based on a header of a packet, a first number of hops. The first number of hops are the hops the packet has to traverse in the communications network to reach a second node in the communications network. The header of the packet indicates a second number of hops between the second node and a third node in the communications network in a first path. The first node obtains a wired backhaul connection to a core network of the communications network from the third node. The first node then initiates routing the packet towards the second node based on the determined first number of hops.

19 Claims, 20 Drawing Sheets

(51) Int. Cl.
    *H04W 40/22*     (2009.01)
    *H04L 45/302*     (2022.01)

(56) References Cited

OTHER PUBLICATIONS

3GPP TR 38.874 V0.6.2; 3rd Generation Partnership Project; Technical Specification Group Radio Access Network; Study on Integrated Access and Backhaul; (Release 15), Nov. 2018, consisting of 91-pages.

3GPP TSG RAN meeting #85 RP-192118; Title: Status Report to TSG; Agenda Item: 13.2.3; Date and Location: Sep. 16-20, 2019, Newport Beach, USA, consisting of 3-pages.

Oumer Teyeb et al.; Integrated Access Backhauled Networks; Arxiv.org; Jun. 21, 2019, consisting of 5-pages.

3GPP TSG-RAN WG3 Meeting #104 R3-192514; Title: Consideration on Routing in IAB; Agenda Item: 13.3.1; Source: ZTE Corporation, Sanechips; Document for: Discussion and Approval; Date and Location: May 13-17, 2019, Reno, USA, consisting of 6-pages.

3GPP TSG-RAN WG2 Meeting #107 R2-1910483; Title: Backhaul Adaptation Protocol (BAP) Header Content; Agenda Item: 11.1.3; Source: Ericsson; Document for: Discussion, Decision; Date and Location: Aug. 26-30, 2019, Prague, Czech Republic, consisting of 3-pages.

\* cited by examiner c)

a)

b)

a)

b)

a)

b)

a)

b)

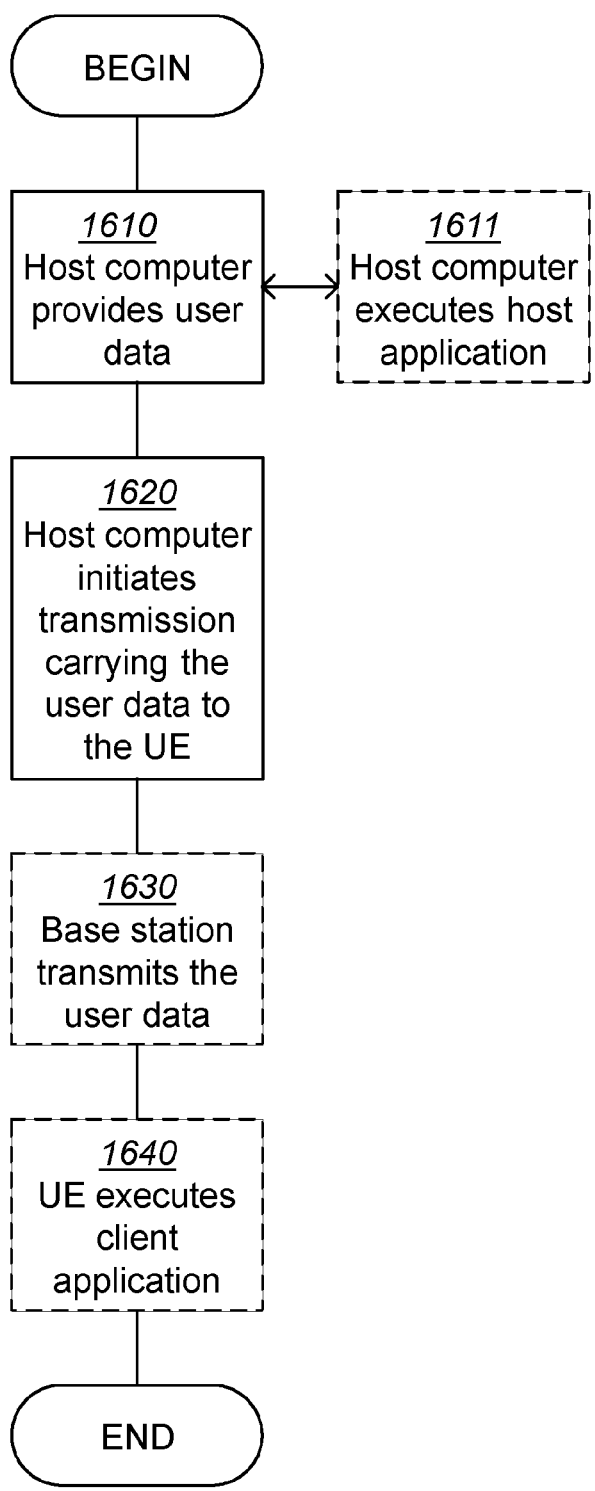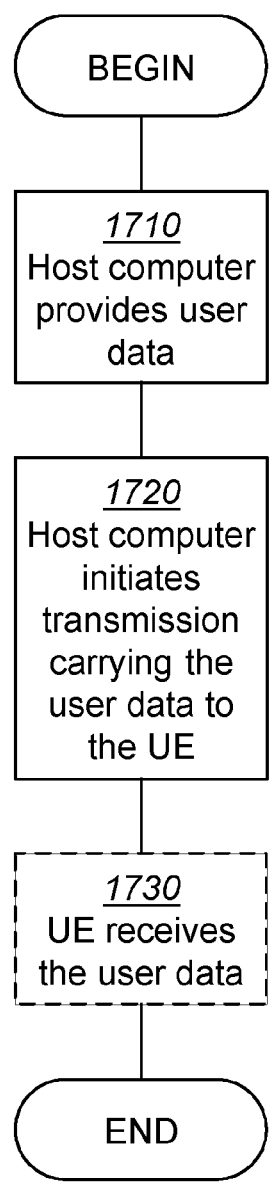
FIG. 16
FIG. 17

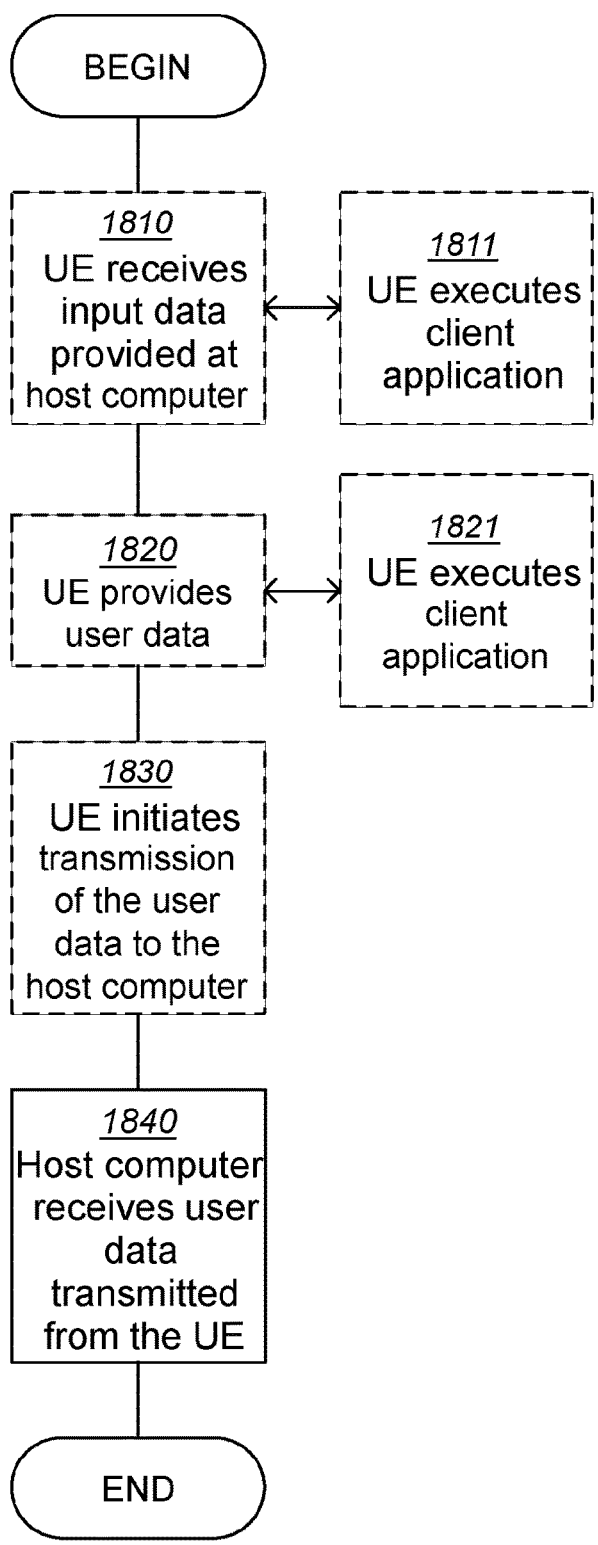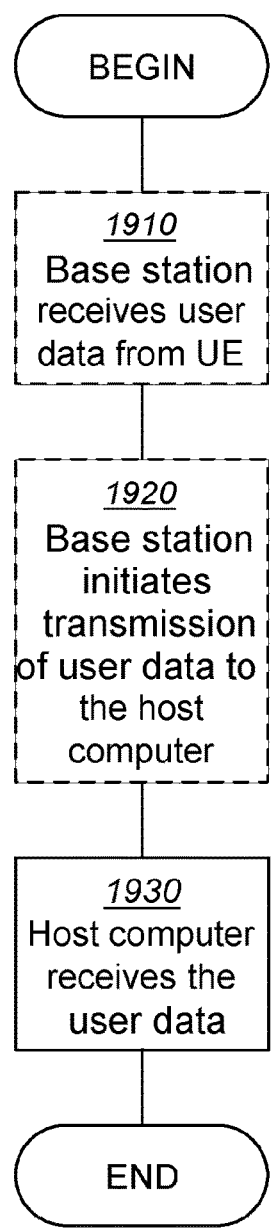
FIG. 18
FIG. 19

FIRST NODE, SECOND NODE, FOURTH NODE AND METHODS PERFORMED THEREBY IN A COMMUNICATIONS NETWORK

CROSS-REFERENCE TO RELATED APPLICATIONS

This application is a Submission Under 35 U.S.C. § 371 for U.S. National Stage Patent Application of International Application No.: PCT/SE2020/051111, filed Nov. 23, 2020 entitled "FIRST NODE, SECOND NODE, FOURTH NODE AND METHODS PERFORMED THEREBY IN A COMMUNICATIONS NETWORK," which claims priority to U.S. Provisional Application No. 63/094,376, filed Oct. 21, 2020, entitled "FIRST NODE, FOURTH NODE, SECOND NODE AND METHODS PERFORMED THEREBY IN A COMMUNICATIONS NETWORK," and U.S. Provisional Application No. 62/938,404, filed Nov. 21, 2019, entitled "FIRST NODE, FOURTH NODE, SECOND NODE AND METHODS PERFORMED THEREBY IN A COMMUNICATIONS NETWORK," the entireties of all of which are incorporated herein by reference.

TECHNICAL FIELD

The present disclosure relates generally to a first node and methods performed thereby for handling a packet in a communications network. The present disclosure relates generally to a second node and methods performed thereby for handling a packet in a communications network. The present disclosure relates generally to a fourth node and methods performed thereby for handling a packet in a communications network.

BACKGROUND

Nodes within a communications network may be wireless devices such as e.g., User Equipments (UEs), stations (STAs), mobile terminals, wireless terminals, terminals, and/or Mobile Stations (MS). Wireless devices are enabled to communicate wirelessly in a cellular communications network or wireless communication network, sometimes also referred to as a cellular radio system, cellular system, or cellular network. The communication may be performed e.g., between two wireless devices, between a wireless device and a regular telephone, and/or between a wireless device and a server via a Radio Access Network (RAN), and possibly one or more core networks, comprised within the communications network. Wireless devices may further be referred to as mobile telephones, cellular telephones, laptops, or tablets with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another terminal or a server.

Nodes may also be network nodes, such as radio network nodes, e.g., Transmission Points (TP). The communications network covers a geographical area which may be divided into cell areas, each cell area being served by a network node such as a Base Station (BS), e.g. a Radio Base Station (RBS), which sometimes may be referred to as e.g., gNB, evolved Node B ("eNB"), "eNodeB", "NodeB", "B node", or BTS (Base Transceiver Station), depending on the technology and terminology used. The base stations may be of different classes such as e.g. Wide Area Base Stations, Medium Range Base Stations, Local Area Base Stations and Home Base Stations, based on transmission power and thereby also cell size. A cell is the geographical area where radio coverage is provided by the base station at a base station site. One base station, situated on the base station site, may serve one or several cells. Further, each base station may support one or several communication technologies. The communications network may also be a non-cellular system, comprising network nodes which may serve receiving nodes, such as wireless devices, with serving beams. In 3rd Generation Partnership Project (3GPP) Long Term Evolution (LTE), base stations, which may be referred to as eNodeBs or even eNBs, may be directly connected to one or more core networks. In the context of this disclosure, the expression Downlink (DL) may be used for the transmission path from the base station to the wireless device. The so-called 5th Generation (5G) system, from a radio perspective started to be standardized in 3GPP, and the so-called New Radio (NR) is the name for the radio interface. NR architecture is being discussed in 3GPP. In the current concept, gNB denotes NR BS, where one NR BS may correspond to one or more transmission/reception points. The expression Uplink (UL) may be used for the transmission path in the opposite direction i.e., from the wireless device to the base station.

Integrated Access Backhaul Networks

Protocol and Architecture Overview

3GPP is currently standardizing Integrated Access Backhaul (IAB). For example, in Rel-16 NR, the Work Item Description (WID) for the standardization was RP-192188.

The usage of short range mmWave spectrum in NR may be understood to create a need for densified deployment with multi-hop backhauling. However, optical fiber to every base station will be too costly and sometimes not even possible, e.g., in historical sites. The main IAB principle may be understood to be the use of wireless links for the backhaul, instead of fiber, to enable flexible and very dense deployment of cells without the need for densifying the transport network. Use case scenarios for IAB may include coverage extension, deployment of massive number of small cells and Fixed Wireless Access (FWA), e.g., to residential/office buildings. The larger bandwidth available for NR in mmWave spectrum may be understood to provide an opportunity for self-backhauling, without limiting the spectrum to be used for the access links. On top of that, the inherent multi-beam and Multiple input multiple output (MIMO) support in NR may reduce cross-link interference between backhaul and access links allowing higher densification.

In a multi-hop wireless relay network, some UEs may connect to the network via relay nodes over more than one hop. FIG. 1 is a schematic diagram showing a high-level architectural view of an IAB network. In FIG. 1, a multi-hop integrated access and backhaul (IAB) deployment is presented, where the IAB donor node, in short IAB donor, may be understood to have a wired connection to the core network (CN) and the IAB relay nodes, in short IAB nodes, may be understood to be wirelessly connected to the IAB donor, either directly, understood as a single hop, or indirectly via other IAB nodes, understood as a multi-hop. The connection between IAB donor/node and UEs may be referred to as access link, whereas the connection between two IAB nodes or between an IAB donor and an IAB node may be referred to as backhaul link. For the IAB network, the backhaul links may be realized as NR wireless links. The IAB donor and some of the IAB nodes may serve not only the User Equipment (UE) traffic within the serving range over the access link, but also the aggregated traffic from/to the child nodes over the backhaul link.

When an IAB node is turned on, its parent node, that is, what node—a donor node in case of single hop or another already connected IAB node in case of multi-hop- to eventually connect to, may need to be decided on. The connection determination of each IAB node may form a certain topology between the IAB donor and IAB nodes that may impact on the achievable performance of the UEs.

For different reasons, an already connected IAB node may also, potentially, have to change its connection to a different parent node.

The specifications for IAB strive to reuse existing functions and interfaces defined in NR. In particular, MT, gNB-DU, gNB-CU, User Plane Function (UPF), Access and Mobility Functions (AMF) and Session Management Functions (SMF) as well as the corresponding interfaces NR Uu, between MT and gNB, F1, NG, X2 and N4 may be used as baseline for the IAB architectures. Modifications or enhancements to these functions and interfaces for the support of IAB will be explained in the context of the architecture discussion. Additional functionality such as multi-hop forwarding is included in the architecture discussion as may be understood to be necessary for the understanding of IAB operation and certain aspects may require standardization.

During the study item phase of the IAB work, a summary of which study item may be found in the technical report TR 38.874, it has been agreed to adopt a solution that leverages the Central Unit (CU)/Distributed Unit (DU) split architecture of NR, where the IAB node may be hosting a DU part that may be controlled by a central unit. The IAB nodes may also have a Mobile Termination (MT) part that they may use to communicate with their parent nodes.

The Mobile-Termination (MT) function has been defined as a component of the IAB node. In the context of this study, MT is referred to as a function residing on an IAB-node that terminates the radio interface layers of the backhaul Uu interface toward the IAB-donor or other IAB-nodes.

FIG. 1 shows a reference diagram for IAB in standalone mode, which contains one IAB-donor and multiple IAB-nodes. The IAB-donor may be treated as a single logical node that may comprise a set of functions such as gNB-DU, gNB-CU-CP, gNB-CU-UP and potentially other functions. In a deployment, the IAB-donor may be split according to these functions, which may all be either collocated or non-collocated as allowed by 3GPP NG-RAN architecture. IAB-related aspects may arise when such split is exercised. Also, some of the functions presently associated with the IAB-donor may eventually be moved outside of the donor in case it becomes evident that they do not perform IAB-specific tasks.

The baseline user plane and control plane protocol stacks for IAB are shown in the FIG. 2. FIG. 2 is a schematic diagram illustrating in panels a), b) and c), a Baseline control plane (CP) Protocol stack for IAB in rel-16, according to existing methods, and in panel d), a Baseline User Plane (UP) Protocol stack for IAB in rel-16, according to existing methods.

As shown in FIG. 2, the chosen protocol stacks may reuse the current CU-DU split specification in rel-15, where the full user plane F1-U, General Packet Radio System tunneling protocol user plane (GTP-U)/User Datagram Protocol (UDP)/Internet Protocol (IP), may be terminated at the IAB node, as a normal DU, and the full control plane F1-C, F1-Application Protocol (AP)/Stream Control Transmission Protocol (SCTP)/IP, may be also terminated at the IAB node, as a normal DU. In the above cases, Network Domain Security (NDS) has been employed to protect both UP and CP traffic, IPsec in the case of UP, and Datagram Transport Layer Security (DTLS) in the case of CP. IPsec may also be used for the CP protection instead of DTLS, in this case no DTLS layer may be used.

A new protocol layer called Backhaul Adaptation Protocol (BAP) has been introduced in the IAB nodes and the IAB donor, which may be used for routing of packets to the appropriate downstream/upstream node, and also mapping the UE bearer data to the proper backhaul Radio Link Controller (RLC) channel, and also between ingress and egress backhaul RLC channels in intermediate IAB nodes, to satisfy the end to end QoS requirements of bearers.

Backhaul Adaptation Protocol (BAP)

As mentioned above, 3GPP Rel-16 has introduced a new protocol layer known as Backhaul Adaptation Protocol (BAP), which may be understood to be mainly responsible for routing and bearer mapping of packets in the IAB network. More specifically, the BAP layer may be understood to be responsible for the forwarding of the packets in the intermediate nodes/hops between the IAB-donor-DU and the access IAB-node. For this purpose, the IAB-Donor-CU may assign a distinct BAP address to each IAB-node during the integration process, which may be understood to facilitate the unique identification of each IAB-node in the network. For the downstream traffic, the BAP layer of the IAB-Donor-DU may add a BAP header to packets received from the upper layer. Similarly, for the upstream traffic, the BAP layer of the access IAB-node may add a BAP header to the upper layer packets.

At the RAN2 #105 meeting, the modelling of the Adaptation layer had been discussed and the following was agreed, although this was later changed or modified:

---

Agreements:

RAN2 confirms that routing and bearer mapping, e.g., mapping of BH RLC channels, are adaptation layer functions R2 assumes that TX part of adaptation layer performs routing and "bearer mapping", RX part of adaptation layer performs "bearer demapping"

R2 assumes that SDUs are forwarded from RX part of adaptation layer to TX part of adaptation layer, for the next hop, for packets that are relayed by the IAB node.

FFS how we model with respect to protocol entities, e.g., whether separate for DU and MT or not, and FFS how these are configured, F1-AP or RRC.

---

Several other agreements related to BAP layer were made in subsequent RAN2 meetings, which are illustrated below, although they were was later changed or modified:

---

Agreements:

BAP may have a DU part configured by F1-AP and a MT part configured by RRC.
A BAP DU part and MT part each may have one transmitter and one receiver.
The BAP Routing ID, carried in the BAP header, consists of BAP address and BAP path ID.
Each BAP address defines a unique destination, unique for IAB network of one Donor, either an IAB access node, or the IAB donor.
Each BAP address can have one or multiple entries in the routing table to enable local route selection. Multiple entries are for load balancing, re-routing at RLF. For load balancing still FFS what is decided locally and/or decided by the IAB-donor-CU.
Each BAP Routing ID may have only one entry in the routing table.
The BAP address of the IAB node is used to differentiate traffic to be delivered to upper layers from traffic to be delivered to egress RLC layer (FFS for the Donor node).
For routing and bearer mapping of a packet retrieved from RLC layer, the IAB-node may need to be configurable with the following mappings:
    BAP routing ID in BAP header → Egress link (routing table)
    Ingress RLC channel → Egress RLC channel (bearer mapping)
For the selection/addition of a BAP routing ID as well as routing and bearer mapping for a packet retrieved from upper layers, the IAB-node and IAB donor may need to be configurable with the following mappings:
    (FFS) Upper layer information → BAP Routing ID to be added in BAP header
    BAP routing ID in BAP header → Egress link
    Upper layer information (FFS) → Egress RLC channel

---

Furthermore, when it comes to the BAP header which was current during the RAN2 #105 meeting, the following agreements were made during RAN2_107bis meeting, although this was later changed or modified:

---

Agreements:

Routing ID is 13 bits.
There is a C/D bit.
Length of the BAP address and BAP path ID sub-fields of the BAP routing ID to be fixed/predefined.
For the DL, BAP address is 10 bits and BAP path ID is 3 bits.
For the UL, BAP address is FFS bits and BAP path ID is FFS bits.
R2 expects that there will be no restrictions in the TS to restrict configuration of routing ID and its components. The network may have to ensure that e.g. there is no path confusion.

---

FIG. 3, panel a, is a schematic diagram showing a sample header for the data PDU, where the Most Significant Byte (MSB) may indicate whether it may be a control or data header and then a few reserve bits for flags and future compatibility. This was also later changed or modified.

FIG. 3, panel b, is another schematic diagram showing an example of a structure for a BAP header, which may contain a 10-bit BAP address field and a 10-bit BAP path Identity (ID) field apart from a 1-bit flag and 3 reserve bits for future use. It may be noted that 3GPP specifications define the 20-bit BAP Routing ID which may comprise a 10-bit BAP address and a 10-bit BAP path ID field. The purpose of the BAP address field may be understood to be to carry the address of the destination IAB-node, while the Path ID field may contain the path identity to be used for traversing the packets towards the destination IAB-node. This latter field may be understood to be important for situations where multiple paths may be configured for an IAB-node to improve network robustness and/or resilience and achieve load balancing by transporting a part of the traffic via each path towards the IAB-node.

To illustrate the above concept, FIG. 4 shows an example topology for an IAB network where two paths, e.g., Path 1 and Path 2, have been configured for IAB-node 5 (IAB5) by the IAB-donor-CU (not shown), wherein Path 1 for IAB5 is IAB-Donor-Du-IAB1-IAB2-IAB4-IAB5 and Path 2 for IAB5 is IAB-Donor-Du-IAB1-IAB3-IAB4-IAB5. This may be understood to mean that the routing tables in the BAP layer of all the intermediate IAB-nodes, that is, IAB1, IAB2, IAB3, etc. may be properly configured with next-hop link information for all the BAP addresses and BAP path IDs carried in the packets BAP header that these nodes may route in the network. Furthermore, the IAB-donor-DU may have mapping rules, e.g., configured by the donor-CU, on how to select the BAP address and BAP path ID fields for packets from the upper layer based on the information in the IP address fields, e.g., Differentiated Services (DS)/DSCP, of the F1-AP signaling. IAB1 has BAP Address 1, IAB2 has BAP Address 2, IAB3 has BAP Address 3, IAB4 has BAP Address 4, IAB5 has BAP Address 5, IAB6 has BAP Address 6 and the IAB-Donor-DU has BAP Address 7. IAB1 has connections with UE1 and UE2, IAB3 has connections with UE3, UE4 and UE5, IAB2 has connections with UE6 and UE7, IAB4 has connections with UE8 and UE9, IAB5 has connections with UE10, UE11, UE12 and UE13, and IAB6 has connections with UE14 and UE15. An example may be considered wherein the IAB-donor-DU receives a packet with IP address fields marked with information that is mapped to BAP address 5 and BAP path ID 1, the donor-DU may add a BAP header with proper field values, that is, address 5 and path ID 1, and may forward the packet to IAB2. Once the IAB2 receives the packet, the node may examine the BAP header of the packet and based on the BAP address, carried in the packet, and its routing table information may transmit the packet towards IAB4. Similarly, IAB4 may route the packet to IAB5, where the IAB5 upon examining the BAP header field of the packet may notice that the packet is destined for it. Hence, IAB5 may remove the BAP header before delivering the packet to its upper layer for further processing.

In another scenario, if the IAB1 receives a packet, from IAB-donor-DU, with a BAP header containing BAP address 5 and path ID 2, IAB1 may forward the packet towards IAB3 instead of IAB2, and so on IAB3 may forward the packet to IAB4. When it comes to the upstream traffic, the BAP layer of IAB5 may add a BAP header containing IAB-donor-DU BAP address and appropriate path ID, either path ID 1 or path ID 2 based on the configuration information, to packets received from the upper layer. Next, IAB5 may forward the packets to IAB4, which may be further forwarded by IAB4 either to IAB1 or IAB2 depending on the path ID field value carried in the packets BAP headers. Once the packets reach IAB-donor-DU, the DU may remove the BAP header before delivering the packets to the upper layer for subsequent processing.

Existing methods for establishing connections in a multi-hop integrated access and backhaul (IAB) deployment may lead to waste of radio resources, increased latency, waste of processing resources, and waste of energy resources.

SUMMARY

It is an object of embodiments herein to improve the handling of a packet in a communications network.

According to a first aspect of embodiments herein, the object is achieved by a method, performed by a first node. The method may be understood to be for handling a packet in a communications network. The first node operates in the communications network. The first node determines, based on a header of a packet, a first number of hops the packet has to traverse in the communications network to reach a second node in the communications network. The header of the packet indicates a second number of hops between the second node and a third node in the communications network in a first path. The first node obtaining a wired backhaul connection to a core network of the communications network from the third node. The first node then initiates routing the packet towards the second node based on the determined first number of hops.

According to a second aspect of embodiments herein, the object is achieved by a method, performed by a fourth node. The method may be understood to be for enabling to handle the packet in the communications network. The fourth node operates in the communications network. The fourth node allocates a first Backhaul Adaptation Protocol (BAP) address to the first node operating in the communications network. The allocated first BAP address is based on a third number of hops between the first node and the third node in the communications network in a second path. The wired backhaul connection to the core network of the communications network is provided to the first node by the third node. The fourth node then provides the first indication to the first node. The first indication indicates the allocated first BAP address.

According to a third aspect of embodiments herein, the object is achieved by a method, performed by a second node. The method may be understood to be for enabling to handle the packet in the communications network. The second node operates in the communications network. The second node obtains a respective first BAP address, from the fourth node operating in the communications network. The obtained respective first BAP address is based on a second number of hops between the second node and the third node in the communications network in a first path. The second node obtains the wired backhaul connection to the core network of the communications network from the third node.

According to a fourth aspect of embodiments herein, the object is achieved by the first node. The first node may be considered to be for handling the packet in the communications network. The first node is configured to operate in the communications network. The first node is further configured to determine, based on the header of the packet, the first number of hops the packet is configured to have to traverse in the communications network to reach the second node in the communications network. The header of the packet is configured to indicate the second number of hops between the second node and the third node in the communications network in the first path. The first node being configured to obtain the wired backhaul connection to the core network of the communications network from the third node. The first node is also configured to initiate routing the packet towards the second node based on the first number of hops configured to be determined.

According to a fifth aspect of embodiments herein, the object is achieved by the fourth node. The fourth node may be understood to be for enabling to handle the packet in the communications network. The fourth node is configured to operate in the communications network. The fourth node is further configured to allocate the first BAP address, to the first node configured to operate in the communications network. The first BAP address configured to be allocated is configured to be based on the third number of hops between the first node and the third node in the communications network in the second path. The wired backhaul connection to the core network of the communications network is configured to be provided to the first node by the third node. The fourth node is further configured to provide the first indication to the first node. The first indication is configured to indicate the first BAP address configured to be allocated.

According to a sixth aspect of embodiments herein, the object is achieved by the second node. The method may be understood to be for enabling to handle the packet in the communications network. The second node is configured to operate in the communications network. The second node is further configured to obtain the respective first BAP address, from the fourth node configured to operate in the communications network. The respective first BAP address configured to be obtained is configured to be based on the second number of hops between the second node and the third node in the communications network in the first path. The second node is configured to obtain the wired backhaul connection to the core network of the communications network from the third node.

By determining the first number of hops the packet has to traverse to reach the second node based on the header, the first node may be enabled to initiate routing the packet towards the second node accordingly. The first node may thereby be enabled to optimize the routing of the packet according to one or more criteria, such as e.g., QoS of the packet, or number of hops the packet may need to traverse to reach the second node, which may be understood to optimize the routing of the packet in terms of latency and maintenance of expected QoS. For example, a scheduler of the first node may be enabled to prioritize traffic destined for relatively far away nodes over traffic destined to a relatively near node. As another advantage, the first node determining the first number of hops may be understood to involve less signaling overhead than other methods, and even no signaling may be required if the information based on which the first node may determine the first number of hops, e.g., the first list of BAP addresses and/or the second list of BAP addresses, may be pre-configured. As a further advantage, the first node determining the first number of hops may be understood to facilitate that, for examples wherein the first node may have multiple parent nodes, the first node may perform a smart local routing decision for the uplink traffic. For example, the BAP addresses of the parent nodes may be configured as a next hop ID in the routing table, the first node may be able to know the hops between the parent nodes and the third node and may be able to exploit this information for differentiated routing for the upstream traffic.

BRIEF DESCRIPTION OF THE DRAWINGS

Examples of embodiments herein are described in more detail with reference to the accompanying drawings, and according to the following description.

FIG. 16 is a flowchart depicting embodiments of a method in a communications system including a host computer, a base station and a user equipment, according to embodiments herein.

FIG. 17 is a flowchart depicting embodiments of a method in a communications system including a host computer, a base station and a user equipment, according to embodiments herein.

FIG. 18 is a flowchart depicting embodiments of a method in a communications system including a host computer, a base station and a user equipment, according to embodiments herein.

FIG. 19 is a flowchart depicting embodiments of a method in a communications system including a host computer, a base station and a user equipment, according to embodiments herein.

DETAILED DESCRIPTION

Figure 1:
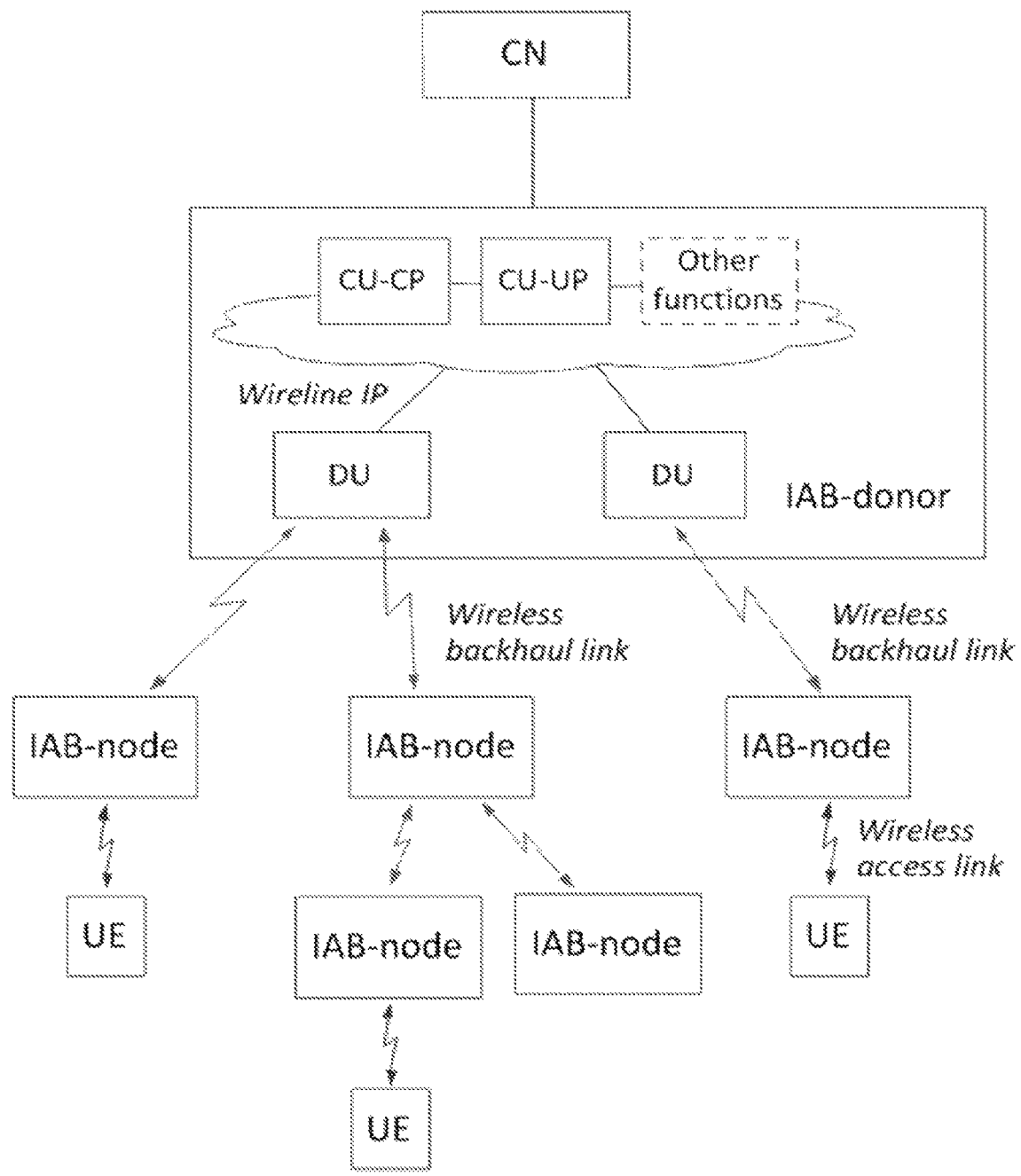
FIG. 1 is a schematic diagram illustrating a multi-hop deployment in an integrated access and backhaul (IAB) network, according to 3GPP TR 38.874, v 0.6.2.
Figure 2:
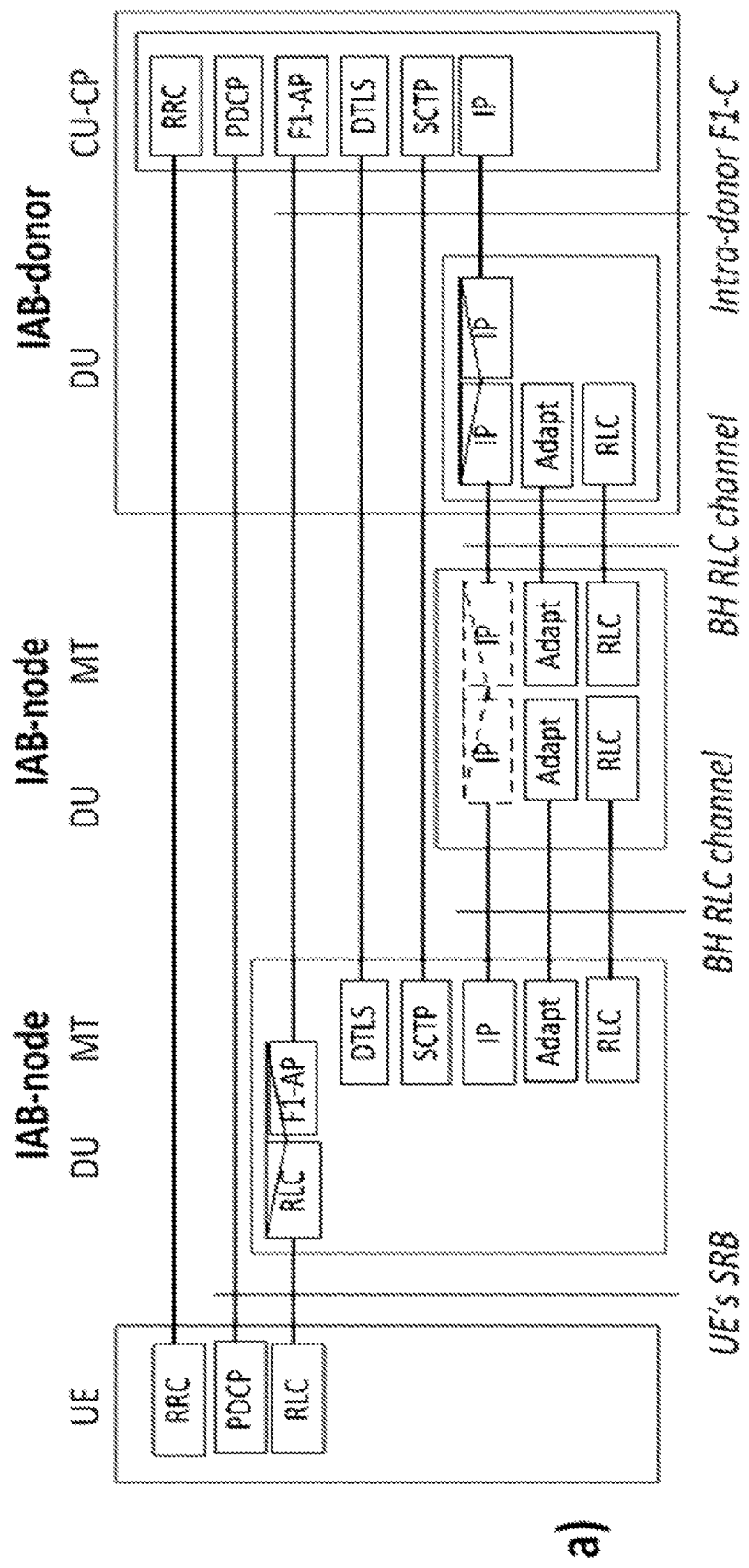
FIG. 2 is a schematic diagram illustrating, in panels a), b) and c), a Baseline control plane (CP) Protocol stack for IAB in rel-16, according to existing methods and in panel d) a Baseline User Plane (UP) Protocol stack for IAB in rel-16, according to existing methods.
Figure 2:
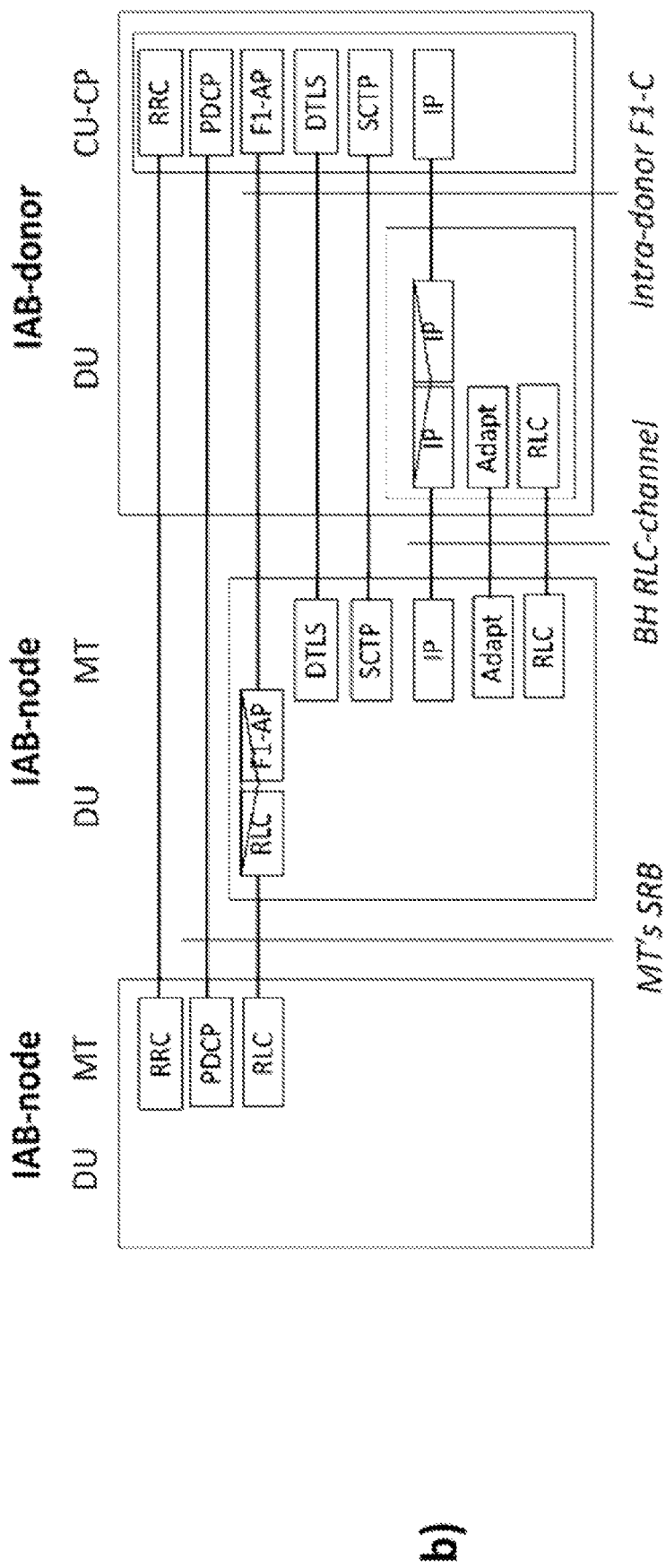
Figure 2:
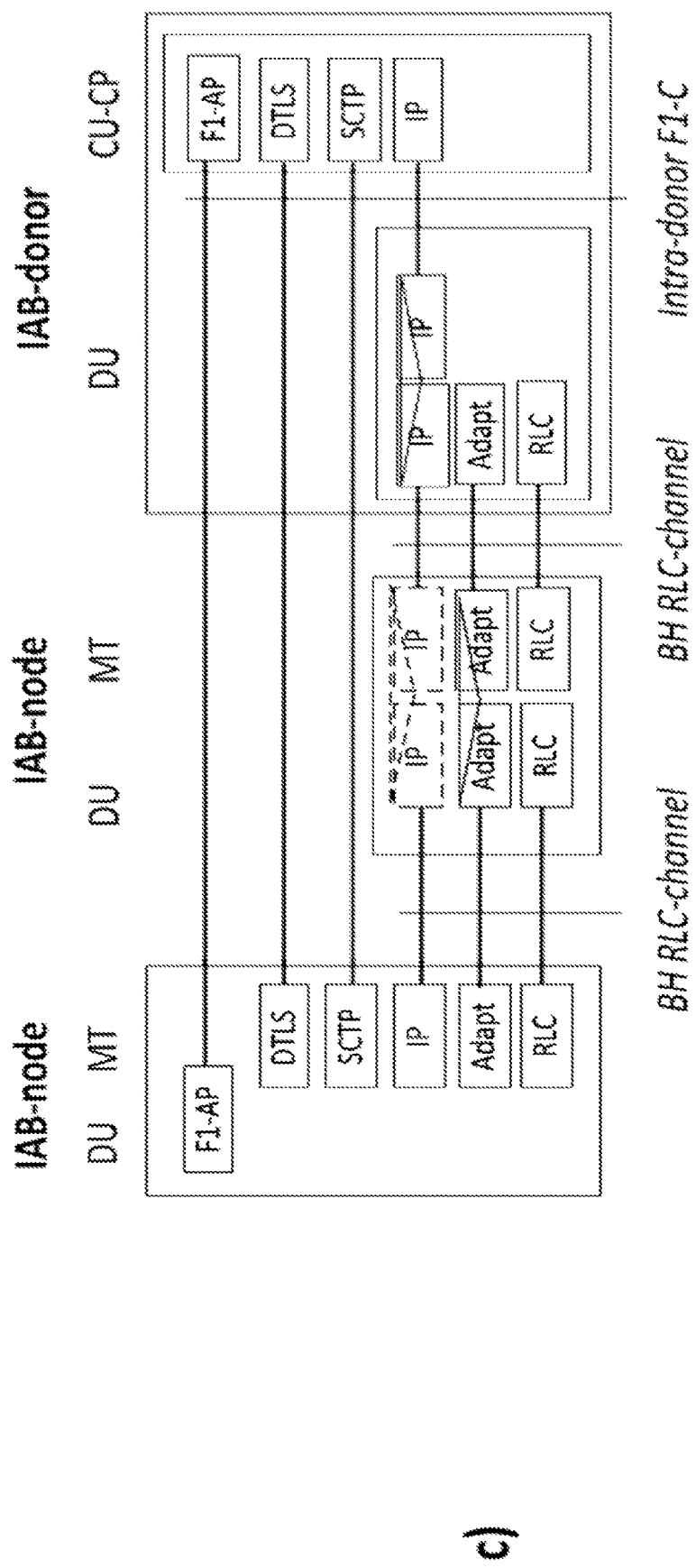
Figure 2:
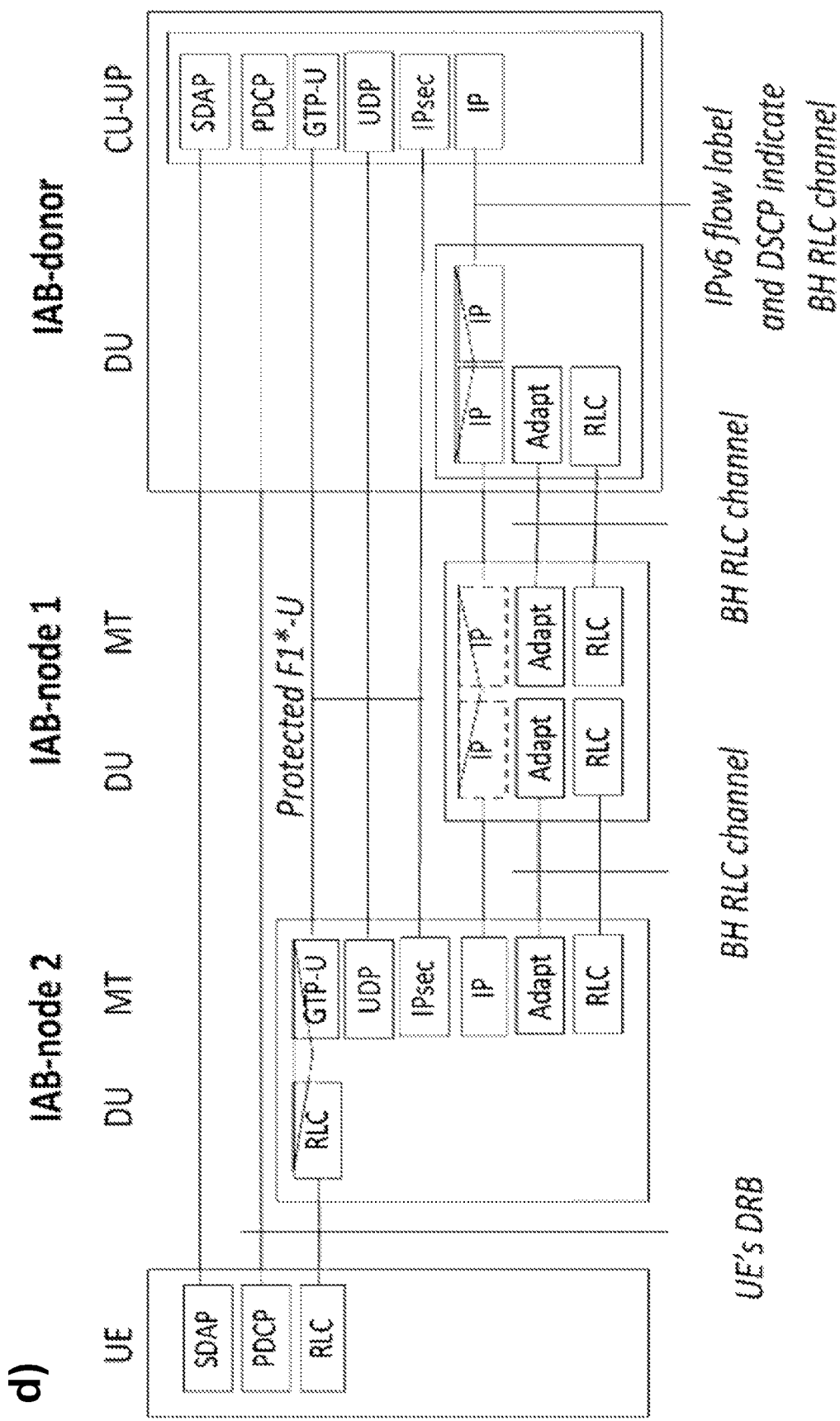
Figure 3:
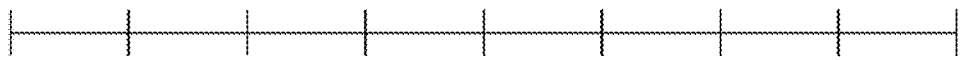
FIG. 3 is a schematic diagram illustrating an example of a structure of a BAP header, according to existing methods.
Figure 3:
Figure 4:
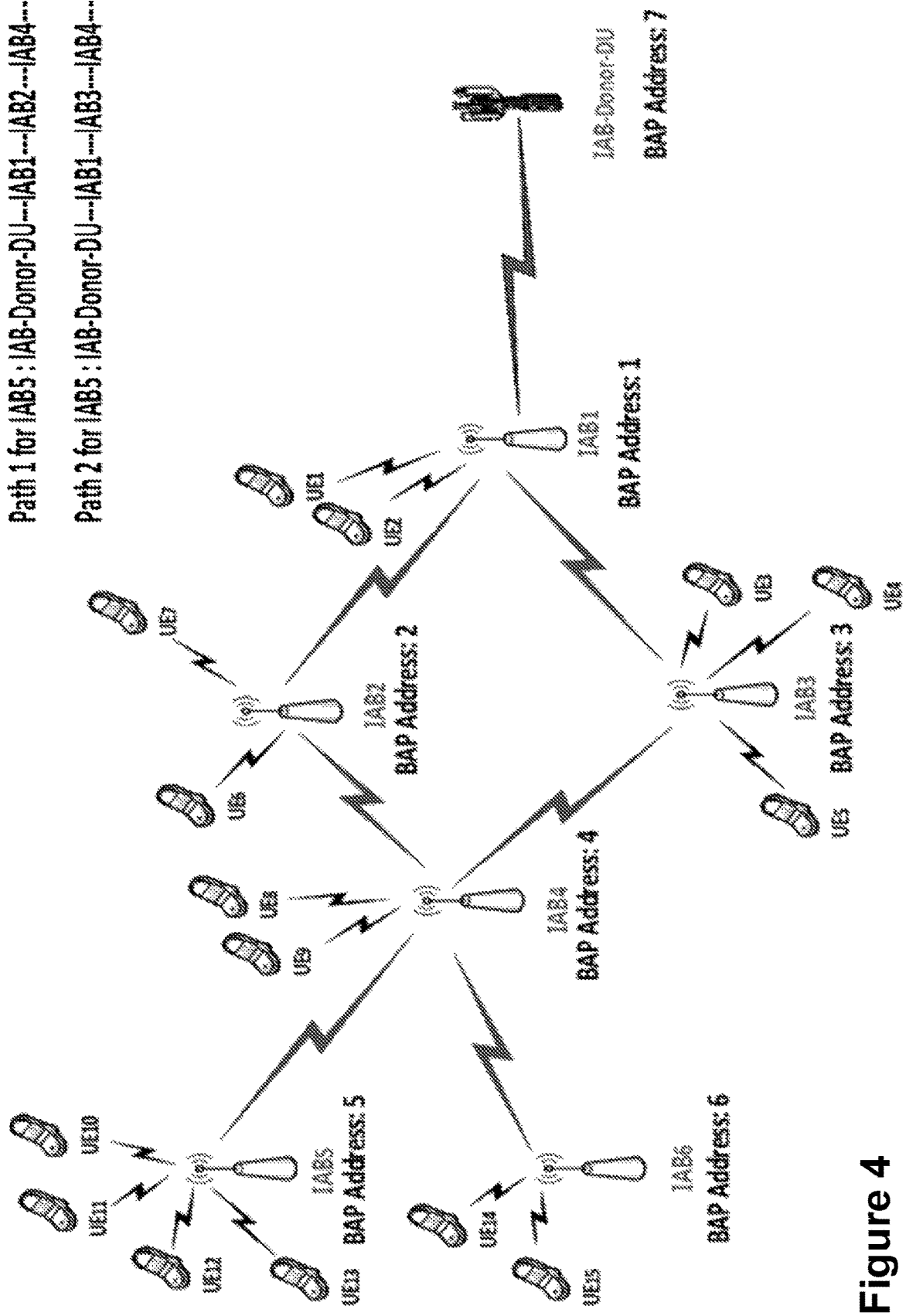
FIG. 4 is a schematic diagram illustrating an example of an IAB network.

As part of the development of embodiments herein, one or more challenges with the existing technology will first be identified and discussed.

The IAB-network may need to attempt to meet Quality of Service (QoS) requirements, and to apply appropriate fairness schemes when scheduling resources for multiple UE bearers. In case the UE bearer may need to meet stringent QoS requirements, it may be 1:1 mapped to a BH RLC channel. Since the BH RLC channel may be configurable with the UE-bearer's QoS profile, the scheduler may enforce the necessary QoS requirements. In addition to the UE-bearer's QoS profile, in IAB networks, it may be beneficial in some cases to know the UE-bearer's remaining BH hop count so that the scheduler may apportion the appropriate fraction of the latency budget for this BH RLC channel. Existing specifications for IAB, that is, Rel16, do not provide such information. One of the objectives of IAB work in Rel17 is to specify enhancements to improve topology-wide fairness, and QoS requirements of UE bearers mapped to a BH RLC channel in N:1 fashion.

Certain aspects of the present disclosure and their embodiments may provide solutions to these challenges or other challenges. There are, proposed herein, various embodiments which address one or more of the issues disclosed herein.

Embodiments and examples herein may be understood to address the problem of how to provide the BH hop count information of the UE-bearer to the schedulers of the intermediate IAB nodes enabling them to fulfil the QoS requirement and fair scheduling. As a brief overview, embodiments herein may be understood to relate to a method of using an IAB node BAP Address for QoS Purposes. Embodiments herein may provide a hierarchical BAP Address allocation scheme where the BAP addresses and the BAP Routing IDs may be used for implementing QoS. In other words, from the BAP address and the BAP Routing ID held in the BAP header of a packet, the IAB node(s) of a given network may be enabled to know about the number of hops the packet has to traverse towards the destination node and may hence utilize this information for scheduling data on the backhaul links.

In general, embodiments herein may therefore be understood to be related to 5G NR, IAB, multipath connectivity, F1.C, mapping, and/or IAB-donor-CU.

Some of the embodiments contemplated will now be described more fully hereinafter with reference to the accompanying drawings, in which examples are shown. In this section, the embodiments herein will be illustrated in more detail by a number of exemplary embodiments. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art. It should be noted that the exemplary embodiments herein are not mutually exclusive. Components from one embodiment may be tacitly assumed to be present in another embodiment and it will be obvious to a person skilled in the art how those components may be used in the other exemplary embodiments.

Note that although terminology from LTE/5G has been used in this disclosure to exemplify the embodiments herein, this should not be seen as limiting the scope of the embodiments herein to only the aforementioned system. Other wireless systems with similar features, may also benefit from exploiting the ideas covered within this disclosure.

Figure 5:
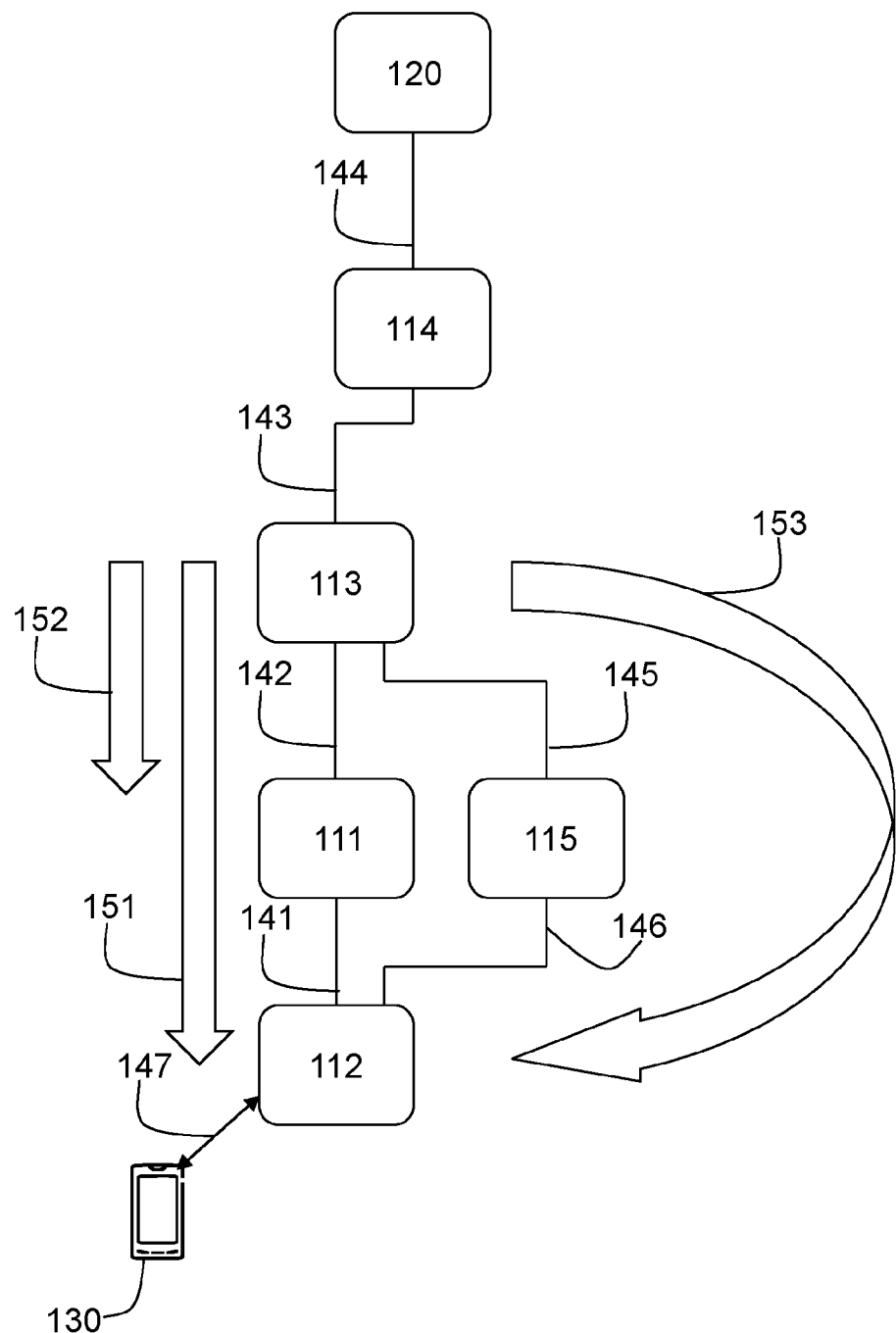
FIG. 5 is a schematic diagram illustrating a communications network, according to embodiments herein.

FIG. 5 depicts a non-limiting example of a communications network 100, which may be a wireless communications network, sometimes also referred to as a wireless communications system, cellular radio system, or cellular network, in which embodiments herein may be implemented. The communications network 100 may typically be a 5G system, 5G network, NR-U or Next Gen System or network, LAA, or MulteFire. The communications network 100 may alternatively be a younger system than a 5G system. The communications network 100 may support other technologies such as, particularly, Long-Term Evolution (LTE) system, LTE-Advanced/LTE-Advanced Pro, e.g., LTE Frequency Division Duplex (FDD), LTE Time Division Duplex (TDD), LTE Half-Duplex Frequency Division Duplex (HD-FDD), and LTE operating in an unlicensed band. The communications network 100 may support yet other technologies such as, for example, License-Assisted Access (LAA), Narrow Band Internet of Things (NB-IoT), Machine Type Communication (MTC), MulteFire, Wideband Code Division Multiplexing Access (WCDMA), Universal Terrestrial Radio Access (UTRA) TDD, Global System for Mobile communications (GSM) network, Enhanced Data for GSM Evolution (EDGE) network, GSM/EDGE Radio Access Network (GERAN) network, Ultra-Mobile Broadband (UMB), network comprising of any combination of Radio Access Technologies (RATs) such as e.g., Multi-Standard Radio (MSR) base stations, multi-RAT base stations etc., any 3rd Generation Partnership Project (3GPP) cellular network, WiFi networks, Worldwide Interoperability for Microwave Access (WiMax). Thus, although terminology from 5G/NR and LTE may be used in this disclosure to exemplify embodiments herein, this should not be seen as limiting the scope of the embodiments herein to only the aforementioned systems.

The communications network 100 comprises a plurality of nodes, whereof a first node 111, a second node 112, a third node 113, a fourth node 114, and a fifth node 115 are depicted in the non-limiting example of FIG. 5. Any of the first node 111, the second node 112, the third node 113, the fourth node 114, and the fifth node 115 may be a radio network node, such as a radio base station, base station or a transmission point, or any other network node with similar features capable of serving a user equipment, such as a wireless device or a machine type communication device, in the communications network 100. For example, any of the first node 111, the second node 112, the third node 113, the fourth node 114, and the fifth node 115 may be a gNB, an eNB, an eNodeB, a Home eNode B, or a Home Node B. Any of the first node 111, the second node 112, the third node 113, the fourth node 114, and the fifth node 115 may be of different classes, such as, e.g., macro base station (BS), home BS or pico BS, based on transmission power and thereby also cell size. In some embodiments, any of the first node 111, the second node 112, the third node 113, the fourth node 114, and the fifth node 115 may be implemented as one or more distributed nodes, such as virtual nodes in the cloud, and they may perform their functions entirely on the cloud, or partially, in collaboration with one or more radio network nodes.

As depicted in the non-limiting example of FIG. 5, the communications network 100 comprises a multi-hop deployment, wherein the third node 113 and the fourth node 114 may be understood as being enabled to be a donor node. Each of the first node 111, the second node 112 and the fifth node 115 may be understood as a relay node or an IAB node, which may be a stationary relay/IAB node or a mobile relay/IAB node. In the context of this disclosure, the first node 111 may be an intermediate node. The second node 112 may be a destination node, e.g., for a packet. The third node 113 may be an IAB-Donor DU. The fourth node 114 may be an IAB-Donor CU. It may be understood that the communications network 100 may comprise more nodes, which are not depicted in FIG. 5 to simplify the Figure.

The fourth node 114 and the third node 113 may be independent nodes or may be co-localized or be part of the same network node.

The communications network 100 covers a geographical area which may be divided into cell areas, wherein each cell area may be served by a node, although, one node may serve one or several cells. In the non-limiting example of FIG. 5, the cells are not depicted to simplify the Figure.

The fourth node 114 has a connection, e.g., a wired backhaul connection, to a core network 120 of the communications network 100.

A wireless device 130, or more, may be located in the wireless communication network 100. The wireless device 130, e.g., a 5G UE, may be a wireless communication device which may also be known as e.g., a UE, a mobile terminal, wireless terminal and/or mobile station, a mobile telephone, cellular telephone, or laptop with wireless capability, just to mention some further examples. The wireless device 130 may be, for example, portable, pocket-storable, hand-held, computer-comprised, or a vehicle-mounted mobile device, enabled to communicate voice and/or data, via the RAN, with another entity, such as a server, a laptop, a Personal Digital Assistant (PDA), or a tablet, Machine-to-Machine (M2M) device, device equipped with a wireless interface, such as a printer or a file storage device, modem, or any other radio network unit capable of communicating over a radio link in a communications system. The wireless device 130 comprised in the communications network 100 is enabled to communicate wirelessly in the communications network 100. The communication may be performed e.g., via a RAN, and possibly the one or more core networks, which may be comprised within the communications network 100.

The first node 111 may be configured to communicate in the communications network 100 with the second node 112 over a first link 141. The first node 111 may be configured to communicate in the communications network 100 with the third node 113 over a second link 142. The third node 113 may be configured to communicate in the communications network 100 with the fourth node 114 over a third link 143. The fourth node 114 may be configured to communicate in the communications network 100 with the core network 120 over a fourth link 144. The fifth node 115 may be configured to communicate in the communications network 100 with the third node 113 over a fifth link 145. The fifth node 115 may be configured to communicate in the communications network 100 with the second node 112 over a sixth link 146. The wireless device 130 may be configured to communicate in the communications network 100 with the second node 112 over a seventh link 147.

Each of the first link 141, the second link 142, the third link 143, the fifth link 145, the sixth link 146 and the seventh link 147 may be, e.g., a radio link. The fourth link 144 may be e.g., a wired link.

A connection between any two given nodes in the communications network may follow one or more paths. For example, a packet may follow different paths in the communications network 100 between any two given nodes. A first path 151 may be followed from the third node 113 to the second node 112, via the first node 111. A second path 152 may be followed from the third node 113 to the first node 111. A third path 153 may be followed from the third node 113 to the second node 112 via the fifth node 115.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In general, the usage of "first", "second", "third", "fourth", "fifth", . . . , "seventh", etc. herein may be understood to be an arbitrary way to denote different elements or entities and may be understood to not confer a cumulative or chronological character to the nouns they modify, unless otherwise noted, based on context.

Several embodiments are comprised herein. It should be noted that the examples herein are not mutually exclusive. Components from one embodiment may be tacitly assumed to be present in another embodiment and it will be obvious to a person skilled in the art how those components may be used in the other exemplary embodiments.

More specifically, the following are embodiments related to a first node, such as the first node 111, e.g., an IAB node, embodiments related to a fourth node, such as the fourth node 114, e.g., an IAB Donor Central Unit, and embodiments related to a second node, such as the second node 112, e.g., another IAB node.

Figure 6:
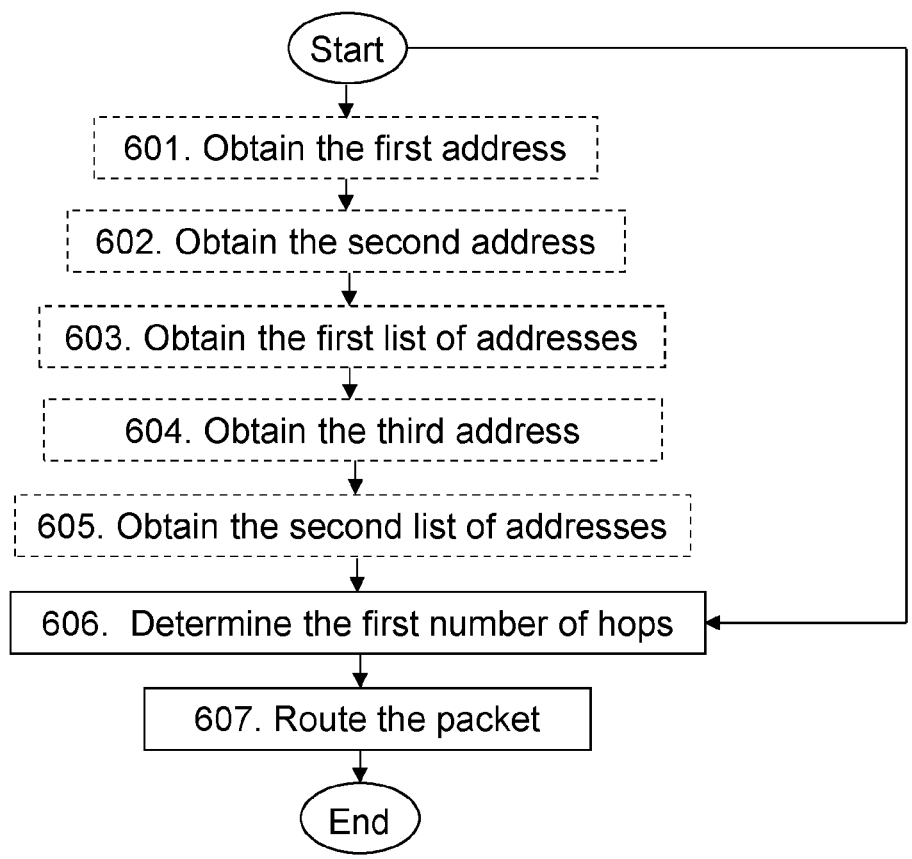
FIG. 6 depicts a flowchart of a method in a first node, according to embodiments herein.

Embodiments of a method, performed by the first node 111, will now be described with reference to the flowchart depicted in FIG. 6. The method may be understood to be for handling a packet in the communications network 100. The first node 111 operates in the communications network 100. The communications network 100 may be a multi-hop deployment. In some embodiments, the communications network 100 may be an Integrated Access Backhaul (IAB) network. The first node 111 may also be known as an intermediate or relay node.

Several embodiments are comprised herein. In some embodiments all the actions may be performed. In other embodiments, one or more actions may be performed. It should be noted that the examples herein are not mutually exclusive. Components from one embodiment may be tacitly assumed to be present in another embodiment and it will be obvious to a person skilled in the art how those components may be used in the other exemplary embodiments. One or more embodiments may be combined, where applicable. All possible combinations are not described to simplify the description. Some actions may be performed in a different order than that shown in FIG. 6. In FIG. 6, actions which may be optional in some examples are depicted with dashed boxes. In some examples, Actions 601-607 may be performed. In other examples, Actions 606-607 may be performed.

Action 601

The communications network 100 may have different deployments, and it may be understood that the example depicted in FIG. 5 is non-limiting. The node that provides a wired backhaul connection to the core network 120, that is, the third node 113 may be connected to the nodes in the plurality of nodes, such as the first node 111, the second node 112, and the fifth node 115, directly and/or via one or more intermediate nodes. The third node 113 may be an IAB-Donor DU. In some particular examples, e.g., of co-localization, the third node 113 may be an IAB-Donor-CU/DU. If connected directly, any given node may be said to be 1 hop away from the third node 113. The hop count may then go up one count, for every intermediate node that may be in between any given node and the third node 113.

The first node 111 may be an intermediate node. As such, the first node 111 may receive a packet that it may need to forward to the second node 112. The second node 112 may be a destination node. In embodiments herein, the packet has to traverse a first number of hops in the communications network 100 to reach the second node 112. It may be noted that while the second node 112 is downstream of the first node 111 in the non-limiting example of FIG. 5, this is for illustrative purposes only, and need not be the case in embodiments herein. The second node 112 may also be upstream of the first node 111 towards the third node 113.

There may be scenarios when the nodes comprised in the communications network 100 may have multi-connectivity with the third node 113, and the nodes may be different number of hops away from the third node 113 via different paths. For instance, while this is not illustrated in FIG. 5, the first node 111 may have three paths with the third node 113; Path1, Path2 and Path3. One of them may be 1-hop while the other two may be 2-hops long, if there is an intermediate node in between. An example of this will be illustrated later in FIG. 10.

In embodiments herein, the second node 112 may be a second number of hops away from the third node 113 in the first path 151.

Embodiments herein may be understood to be drawn to a method at the level of the communications network 100, that may divide identifiers of the nodes comprised in it into several classes, based on deployment scenarios, which may be understood to follow a hierarchical BAP address scheme. Each class may represent a set of BAP addresses to be allocated to the nodes comprised in the communications network 100 that may be a certain number of hops away from the third node 113, that is, the node that provides the wired backhaul connection to the core network 120. One such identifier may be the BAP Routing ID, which may comprise, e.g., 10 bits BAP address and 10 bits Path ID for both the downlink and uplink routing.

In a first group of examples, the BAP address space may be divided into N classes, for example, Table 1 shown below, based on the deployment scenario, that is, the maximum number of acceptable/allowable hops between any node of the communications network 100 and the third node 113. The value of N may depend on several parameters/factors, such as the applications and/or services that the communications network 100 may provide, geographical area to cover, etc. For example, some latency critical applications may not be able to be provided by an node that may be relatively far, in terms of hop count, from the fourth node 113 and/or the third node 113, and this may set limits on the number of possible and/or allowable hops in a given network. Depending on the deployment situations, the sizes of these N classes may be the same or different. For instance, if there are more 1-hop away nodes from the third node 113, then the set of BAP addresses for 1-hop away nodes may be larger, e.g., $(1-x_1)>(x_1-x_2)$, than the other classes and so on. Furthermore, the size of each set may be fixed and/or predefined or may be changed and/or updated while the communications network 100 may be in operation. In the latter case, the nodes comprised in the communications network 100 may be informed about the size change of the classes. Also, the BAP addresses to each class may be assigned in an ordered fashion, for instance, 1,2,3,4,5 may be assigned to Class-1; 5,7,8,9 may be assigned to Class-2; 10,11,12,13,14,15 may be assigned to Class-3 and so on, or in random fashion, e.g., 1,6,9,11,34 may be assigned to Class-1; 2,4,9 may be assigned to Class-2; 33, 7,16,14 may be assigned to Class-3 and so on.

TABLE 1

| Class | Size of the Class |
| --- | --- |
| 1 | $1-x_1$ |
| 2 | $x_1-x_2$ |
| 3 | $x_2-x_3$ |
| — | — |
| — | — |
| N | $xn-1-2^{10}$ |

The hierarchical BAP address scheme will be illustrated later with a particular non-limiting example in FIG. 9.

According to some embodiments herein, the nodes comprised in the communications network 100 may be assigned BAP addresses that may be equal to the different number of hop counts between the particular node and the third node 113.

According to the foregoing, in this Action 601, the first node 111 may obtain a first Backhaul Adaptation Protocol (BAP) address, from the fourth node 114 operating in the communications network 100. The obtained first BAP address may be based on a number of hops, that may be referred to herein as a third number of hops, between the first node 111 and the third node 113 in the communications network 100 in a path, referred to herein as the second path 152.

The first BAP address may be understood to belong to a first class of N classes corresponding in the communications network 100.

The fourth node 114 may be an IAB-Donor CU. The obtaining, e.g., receiving, may be performed, e.g., via the second link 142, and the third link 143. Obtaining in this Action 601 may comprise, in some examples, retrieving a pre-configuration, e.g., a hard-coded pre-configuration, in the first node 111. In other examples, obtaining in this Action 601 may comprise receiving a configuration via an Operations, administration, and management (OAM) node.

In some examples, the obtaining in this Action 601 may be, e.g., during an integration procedure of the first node 111 into the communications network 100.

In some embodiments, the obtaining in this Action 601 may be performed via RRC signalling.

The first BAP address may be obtained indicated by a first indication.

In some of the examples wherein the first node 111 may have different paths to the third node 113, which examples are not depicted in FIG. 5, the first node 111 may be assigned one BAP address based on the hop count of its primary path, that is, the path with the shortest hop count. In other words, the first BAP address may be a BAP address based on the hop count of its primary path.

Once the first node 111 may obtain the first BAP address in this Action 601, it may be able to know how far it is from the third node 113, e.g., the IAB-Donor-CU/DU following the second path 152.

Action 602

As mentioned earlier, the first node 111 may be different number of hops away from the third node 113 via different paths. In this Action 602, the first node 111 may obtain a second BAP address, from the fourth node 114. The obtained second BAP address may be based on another number of hops, referred to herein as a fourth number of hops, between the third node 113 and the first node 111 in the communications network 100 in another path, referred to herein as the third path 153.

The obtaining in this Action 602 may performed as described for Action 601. For example, the obtaining in this Action 602 may be, e.g., during an integration procedure of the first node 111 into the communications network 1000.

In some embodiments, the obtaining in this Action 602 may be performed via RRC signalling.

It may be understood that the second BAP address may be obtained, e.g., indicated by a second indication.

The second BAP address may be understood to belong to a second class of N classes corresponding in the communications network 100. The first class and the second class may be the same in some examples, and different in others.

In some of the examples wherein the first node 111 may have different paths to the third node 113, and the first node 111 may have been assigned one BAP address based on the hop count of its primary path in Action 601, the BAP Path ID field may, in this Action 602, be used as the second BAP address, to signify the other paths for nodes that may be longer, in terms of hop count, than the primary path. For example, BAP Path ID values from $P_1$ to $P_a$ may be used for paths with the same hop count as that of primary path, BAP Path IDS from $P_{a+1}$ to $P_b$ may be used for paths that are one hop longer than the primary path, BAP Path IDS from $P_{b+1}$ to $P_c$ may be used for paths that are twos hop longer than the primary path, and so on.

Once the first node 111 may obtain the second BAP address in this Action 602, it may be able to know how far it is from the third node 113, e.g., the IAB-Donor-CU/DU following the third path 153.

Action 603

In this Action 603, the first node 111 may obtain, from the fourth node 114, a first list of BAP addresses. Each of the BAP addresses in the obtained first list may correspond to each node in the communications network 100 to which the fourth node 114 may provide a wired backhaul connection to the core network 120 of the communications network 100. Each of the BAP addresses in the obtained first list may be based on a respective fifth number of hops between the third node 113 and each node in the communications network 100 to which the third node 113 provides the wired backhaul connection to the core network 120.

The first list of BAP addresses may comprise a list of the N classes for the BAP addresses described above, wherein each class may correspond to a certain number of hops.

The obtaining in this Action 603 may performed as described for Action 601. In some embodiments, the first node 111 may obtain the first list of BAP addresses in this Action 603 by either retrieving it from a preconfiguration, a hard-coded memory, or it may be received by configuration via OAM during the integration process with the list of N classes for the BAP addresses.

The first list of BAP addresses, which may be, e.g., a list of BAP Path ID classes, for the indication of hop count information, may either be pre-configured, e.g., hard-coded, in the nodes comprised in the communications network 100, or configured via OAM.

In some embodiments, the obtaining in this Action 603 may be performed via RRC signalling.

It may be understood that the first list of BAP addresses may be obtained, e.g., indicated by a third indication.

By obtaining the first list of BAP addresses in this Action 603, the first node 111 may be able to know how far the other nodes, e.g., the second node 112, and the fifth node 115, may be from the third node 113, e.g., the IAB-Donor CU/DU, and from itself, via the list of classes for nodes addresses, and so may use this information to prioritize traffic destined for some nodes over the others, as will be described later. For example, the first node 111 may use a path with a lower hop count to route higher priority traffic and another path with a higher hop count to route lower priority traffic.

Action 604

In case of topology adaptation due to e.g., a Radio Link Failure (RLF) or load balancing, etc., if the first node 111 was H1 hops away from the third node 113 before topology adaptation and now H2 hops away after topology adaptation, where H2 may be greater or smaller than H1, the fourth node 114 may assign a new BAP address from the class for H2 hops BAP addresses to the first node 111.

Accordingly, in this Action 604, the first node 111 may obtain a third BAP address from the fourth node 114. The obtained third BAP address may be based on an updated sixth number of hops between the third node 113 and the first node 111 in the communications network 100.

Alternatively, the first node 111 may use the same BAP Address while the list of N classes stored in the other nodes comprised in the communications network 100 may be updated via OAM, or RRC, by moving the BAP address of the first node 111 from H1 class to H2 class.

The obtaining in this Action 604 may performed as described for Action 601. In some embodiments, the obtaining in this Action 604 may be performed via RRC signalling.

It may be understood that the third BAP address may be obtained, e.g., indicated by a fourth indication.

By obtaining this third BAP address in this Action 604, the first node 111 may then be enabled to have an address indicating the number of hops between the third node 113 and the first node 111, even after that number may change due to changes in the topology of the communications network 100, such as those that may be necessary after a RLF.

Action 605

As mentioned above, in some examples, instead of updating a BAP address when a change in topology is implemented in the communications network 100, it may be the first list of BAP addresses that may be changed by moving the first BAP address from one class to another. This may be done not only for the first node 111, but for any other node comprised in the communications network 100.

In this Action 605, the first node 111 may obtain, from the fourth node 114, a second list of BAP addresses. The obtained second list may comprise at least one updated BAP address based on an updated seventh number of hops between the third node 113 and at least one node in the communications network 100 to which the third node 113 provides a wired backhaul connection to the core network 120. That is, the second list of BAP addresses may be obtained, e.g., received, whenever the topology of the communications network 100 may change due to at least one of the nodes comprised in the communications network 100 having changed the number hops that may separate it from the third node 113 in at least one path.

The at least one updated BAP address may be one of: a changed address allocated to the same node, e.g., the third BAP address for the first node 111, and/or a change to the to the class of address assigned to a particular same address allocated to a node.

The obtaining in this Action 605 may performed as described for Action 601. In some embodiments, the obtaining in this Action 605 may be performed via RRC signalling.

It may be understood that the second list of BAP addresses may be obtained, e.g., indicated by a fifth indication.

By obtaining this second list of BAP addresses in this Action 605, the first node 111 may then be enabled to have an up-to-date knowledge of the respective number of hops between the third node 113 and the nodes in the communications network 100, even after at least one of those numbers may change due to changes in the topology of the communications network 100, such as those that may be necessary after a RLF.

Action 606

In the course of operations of the communications network 100, the first node 111 may obtain, e.g., receive, a packet destined to the second node 112. The packet may comprise a header. In this Action 606, the first node 111 determines, based on the header of the packet, the first number of hops the packet has to traverse in the communications network 100 to reach the second node 112 in the communications network 100. The header of the packet indicates the second number of hops between the second node 112 and the third node 113 in the communications network 100 in the first path 151. The first node 111 obtains the wired backhaul connection to the core network 120 of the communications network 100 from the third node 113, e.g., via the fourth node 114.

Determining may be understood as calculating or deriving.

The header may comprise an address and an identifier (ID) of a route to be followed by the packet in the communications network 100.

In some embodiments wherein the communications network 100 may be an Integrated Access Backhaul (IAB) network, the address may be a Backhaul Adaptation Protocol (BAP) address and the identifier may be a BAP routing ID. The BAP routing ID may comprise a 10-bit BAP address and a 10-bit Path ID.

That the header may indicate the second number of hops between the second node 112 and the third node 113 may be understood to mean e.g., that from a value in the header, e.g., a BAP address, IP address, the first node 111 may be enabled to know/infer/derive how many hops there are, although the number, e.g., the second number, may not be explicitly provided in the header.

The first node 111 may determine the first number of hops in this Action 606 by comparing the its own BAP-address with the destination address, that is the destination of the second node 112. If different branches or paths are used, this may be reflected in an identifier of the path, e.g., the path ID. In general, the number of hops may be the number of classes.

Furthermore, different path identifiers, for example, BAP identifiers, such as Path IDs, in the BAP headers of different packets, for differentiating the different paths towards the first node 111 e.g., "000" and "001", may be used for Path2 and Path3, respectively. Accordingly, in some embodiments, the second path 152 may have a first path identifier indicating the third number of hops. The third path 153 may have a second path identifier indicating the fourth number of hops.

Thus, when the first node 111 may receive a packet for a particular destination node such as the second node 112 with a BAP address belonging to an h-hop class of addresses and a Path ID $P_u$ belonging to the class of Path IDs for paths with the same length as the primary path, the first node 111 may be enabled to know that the destination node for these packets is h-hop away from the third node 113, e.g., the IAB-Donor-CU/DU.

By determining the first number of hops the packet has to traverse to reach the second node 112 based on the header in this Action 606, the first node 111 may be enabled to route the packet accordingly. For example, a scheduler of the first node 111 may prioritize traffic destined for relatively far away nodes over traffic destined to a relatively near node.

As another advantage, the first node 111 determining the first number of hops may be understood to involve less signaling overhead than other methods, and even no signaling may be required if the information based on which the first node 111 may determine the first number of hops, e.g., the first list of BAP addresses and/or the second list of BAP addresses, may be pre-configured.

As a further advantage, the first node 111 determining the first number of hops may be understood to facilitate that, for examples wherein the first node 111 may have multiple parent nodes, the first node 111 may perform a smart local routing decision for the uplink traffic. For example, the BAP addresses of the parent nodes may be configured as a next hop ID in the routing table, the first node 111 may be able to know the hops between the parent nodes and the third node 113 and may be able to exploit this information for differentiated routing for the upstream traffic. For example, there may be a rule in the first node 111 that that certain packets based on QoS may need to use the shortest path.

Action 607

In this Action 607, the first node 111 initiates routing the packet towards the second node 112 based on the determined first number of hops.

To initiate routing may be understood as to start, trigger, or facilitate routing or to route.

The initiating in this Action 607 of the routing may be based on additional factors.

In some embodiments, the initiating of the routing in this Action 607 may be further based on a quality of service associated with the packet. Similarly, in some embodiments, the packet may be a first packet, and the first node 111 may receive a second packet via at least one of the second path 152 and the third path 153, based on a quality of service to be fulfilled for the second packet.

In an additional group of examples built on the above embodiments, if the first node 111 has multiple parent nodes, which is not illustrated in FIG. 5 to simplify the Figure, that may be different hops away from the third node 113, the first node 111 may utilize the BAP addresses to route traffic with different QoS requirements through different uplink paths. For example, the first node 111 may route latency critical data to a first parent node, not depicted in FIG. 5, knowing that the first parent node is 1-hop away from the third node 113 via its BAP address, and less critical data to a second parent node, knowing that the second parent node is 2-hops away from the third node 113 via its BAP address. Similarly for the downstream, if the first node 111 has multiple children, it may utilize the BAP addresses to route traffic with different QoS requirements through different downlink paths, e.g., the first node 111 may route latency critical traffic to a first child node that is 1-hop away from the third node 113, and non-latency critical traffic via a second child node that is 2-hops away from the third node 113. Furthermore, during the Radio Resource Control (RRC) establishment, if there are several candidate parent nodes for camping, the first node 111 may choose one that is relatively close, in terms of hop count, to the third node 113. However, for this, the parent nodes may need to broadcast their BAP Addresses in Master Information Block (MIB) or System Information Block 1 (SIB1).

According to the foregoing, in some examples, the initiating routing in this Action 607 may comprise selecting between at least two different paths. Each of the at least two different paths may be associated with a respective first number of hops between the first node 111 and the second node 112, determined based on a respective BAP address for the second node 112 for each path. The selecting may be based on the quality of service to be fulfilled for the packet.

In yet another group of examples, a scheduler of the first node 111, when performing scheduling of certain services, may consider both the BAP address of the destination and the BAP address of the next hop. Accordingly, in some examples, the initiating routing in this Action 607 may be further based on a fourth BAP address of a next hop node towards the second node 112.

In one option, the first node 111 may first schedule the packets which may be destined to the BAP addresses that may correspond to the farthest away destination, then the packets which may be located at a smaller number of hops apart. In another option, the first node 111 may compare the BAP address of the destination and the BAP address of the next hops. If the BAP addresses of the next hops are associated to different classes of BAP addresses, some that may be closer to the BAP destination, some others that may be farther away from the destination, then the first node 111 may first schedule packets whose next hop may be located at a higher number of hops from the destination, then the packets whose next hop may be closer to the destination. For example, assuming that the first node 111 has to schedule data belonging to two BH RLC channels having the same QoS requirements, one that is configured to be routed via a node being 2-hops away from the third node 113, and another via another node that is 1-hop away from the third node 113, then the first node 111 may prioritize first packets of the BH RLC channel which has the node that is 2-hops away from the third node 113 as next hop, and then the packets for the BH RLC channel which has the node that is 1-hop away from the third node 113 as next hop. This may be understood to be to allow the packets that may have a longer route to follow, and that may need more time to reach their destination, to be scheduled first and before those that may have a shorter route to their destination, and which may need a shorter time to reach it.

In accordance with the foregoing, in some embodiments, the packet may be comprised in a set of packets to be scheduled by the first node 111. The first node 111 may schedule the packets according to at least one of the following options. According to a first option, the first node 111 may schedule the packets according to a first order, e.g., a first descending order, of a first respective amount of hops for the packets until their respective destination nodes, based on a respective BAP address of the respective destination nodes.

According to a second option, the first node 111 may schedule the packets according to a second order, e.g., a second descending order, of a second respective amount of hops from respective next hop nodes for the packets and their respective destination nodes, based on a respective BAP address of the respective destination nodes, and a respective BAP address of the respective next hop nodes.

By initiating routing the packet towards the second node 112 based on the determined first number of hops in this Action 607, the first node 111 may be enabled to optimize the routing of the packet according to one or more criteria, such as e.g., QoS of the packet, or number of hops the packet may need to traverse to reach the second node 112, which may be understood to optimize the routing of the packet in terms of latency and maintenance of expected QoS. As explained for Action 605, the scheduler of the first node 111 may prioritize traffic destined for relatively far away nodes over traffic destined to a relatively near node.

As a further advantage, by initiating routing the packet towards the second node 112 based on the determined first number of hops the first node 111 may be understood to facilitate that, for examples wherein the first node 111 may have multiple parent nodes, the first node 111 may perform a smart local routing decision for the uplink traffic, as explained earlier.

Figure 7:
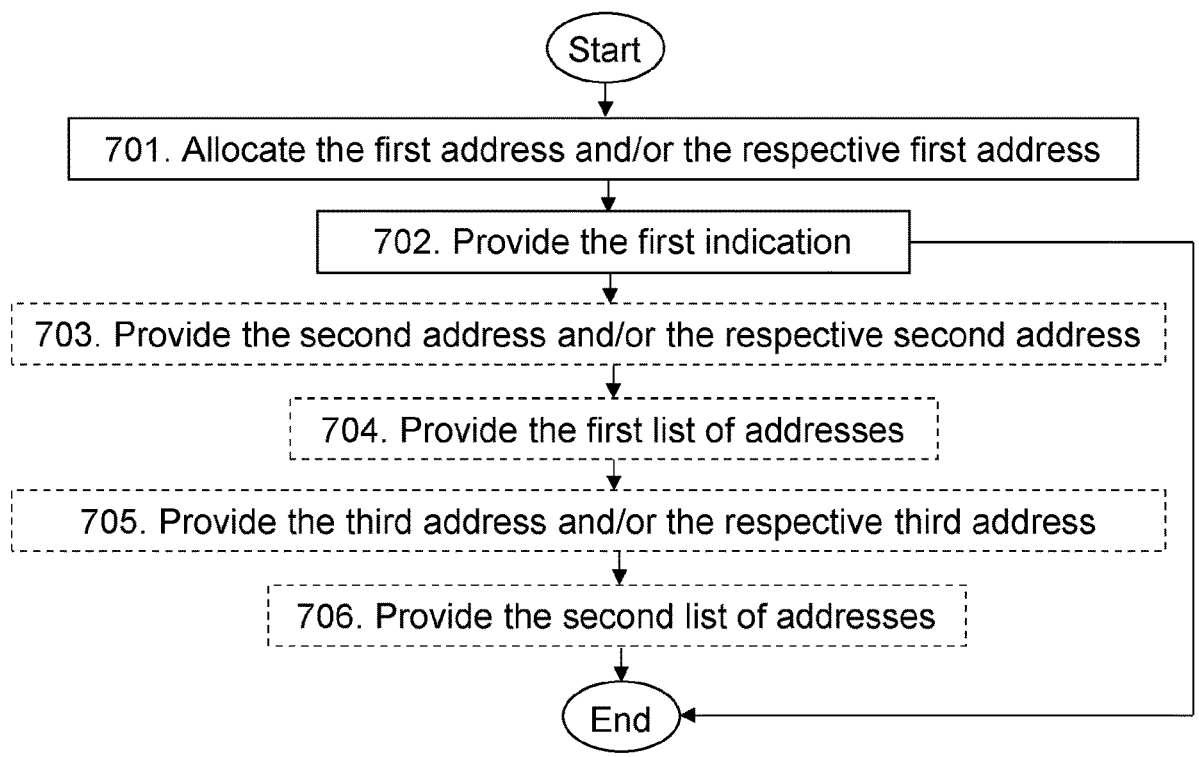
FIG. 7 depicts a flowchart of another method in a fourth node, according to embodiments herein.

Embodiments of a method, performed by the fourth node 114, will now be described with reference to the flowchart depicted in FIG. 7. The method may be understood to be for handling communications the communications network 100. Particularly, the method may be understood to be for enabling to handle the packet in the communications network. The fourth node 114 operates in the communications network 100. The communications network 100 may be in a multi-hop deployment. In some embodiments, the communications network 100 may be an Integrated Access Backhaul (IAB) network.

Several embodiments are comprised herein. In some embodiments all the actions may be performed. In other embodiments, some actions may be performed. In some embodiments, actions may be optional. In FIG. 7, optional actions are indicated with dashed lines. It should be noted that the examples herein are not mutually exclusive. Components from one embodiment may be tacitly assumed to be present in another embodiment and it will be obvious to a person skilled in the art how those components may be used in the other exemplary embodiments. One or more embodiments may be combined, where applicable. All possible combinations are not described to simplify the description. Some actions may be performed in a different order than that shown in FIG. 7. The detailed description of some of the following corresponds to the same references provided above, in relation to the actions described for the first node 111 and will thus not be repeated here to simplify the description. For example, in some embodiments, the third node 113 may be an IAB-Donor DU. The fourth node 114 may be an IAB-Donor CU. In some examples, the fourth node 114 may be an IAB-Donor DU or an IAB-Donor DU/CU. The first node 111 may be an intermediate node. The second node 112 may be a destination node.

Action 701

The fourth node 114 may allocate one or more of: a) the first address, e.g., the first BAP address to the first node 111 operating in the communications network 100, and b) the respective first address, e.g., the respective first BAP address to the second node 112.

In this Action 701, the fourth node 114 allocates the first BAP address, to the first node 111 operating in the communications network 100. The allocated first BAP address is based on the third number of hops between the first node 111 and the third node 113 in the communications network 100 in the second path 152. The wired backhaul connection to the core network 120 of the communications network 100 is provided to the first node 111 by the third node 113.

In this Action 701, the fourth node 114 may also allocate a respective first address, e.g., a respective first BAP address to the second node 112. The allocated respective first BAP address may be based on the second number of hops between the second node 112 and the third node 113 in the communications network 100, e.g., in the first path 151.

In some examples, the allocating in this Action 701 of the one or more of: the first BAP address and the respective first BAP address may comprise selecting the first BAP address and/or the respective first BAP address from a group of BAP addresses.

In some embodiments, the allocating in this Action 701 of the first BAP address may comprise selecting the first BAP address from the group of BAP addresses. The group of BAP addresses may comprise a plurality of subsets of BAP addresses. Each of the subsets may correspond to a respective class of addresses, of a plurality of classes of addresses (N). Each of the respective class of addresses may correspond to a respective number of hops between a certain node and the third node 113. The first BAP address may be selected from a first class of addresses in the communications network 100 corresponding to the third number of hops between the third node 113 and the first node 111.

The respective first BAP address may be selected from a second class of addresses in the communications network 100 corresponding to the second number of hops between the third node 113 and the second node 112.

By allocating the first BAP address in this Action 701, the fourth node 114 may then be enabled to provide the first BAP address to the first node 111 in the next Action 702, and thereby enable it to know how far it is from the third node 113, e.g., the IAB-Donor-CU/DU following the second path 152.

Action 702

The fourth node 114 may provide a first indication to one or more of the first node 111 and the second node 112. The first indication may indicate the allocated one or more of: a) the first BAP address, and b) the respective first BAP address.

In this Action 702, the fourth node 114 provides the first indication to the first node 111. The first indication indicates the allocated first BAP address.

The fourth node 114 may also provide the second node 112, wherein the first indication may indicate the respective first BAP address.

Providing may be e.g., sending. The providing 702 may be performed, e.g., via the second link 142, and the third link 143, and/or via the fifth link 145 and the sixth link 146.

In some embodiments, the providing in this Action 702 may be performed via RRC signalling By providing the first BAP address in this Action 702, the fourth node 114 enables the first node 111 know how far it is from the third node 113, e.g., the IAB-Donor-CU/DU following the second path 152.

Action 703

The fourth node 114 may provide one or more of: a) the second BAP address to the first node 111, and b) a respective second BAP address to the second node 112.

It may be understood that the fourth node 114 may have allocated the one or more of: a) the second BAP address to the first node 111, and b) the respective second BAP address to the second node 112, similarly to how it has been described in Action 701. The provided respective second BAP address may be based on a respective fourth number of hops between the third node 113 and the second node 112 in the communications network 100, e.g., in another path.

In this Action 703, the fourth node 114 may provide the second BAP address to the first node 111. The provided second BAP address may be based on the fourth number of hops between the third node 113 and the first node 111 in the communications network 100 in the third path 153.

The providing, or sending, in this Action 703 may be performed, e.g., via the second link 142, and the third link 143, and/or via the fifth link 145 and the sixth link 146.

It may be understood that the second BAP address may be provided, e.g., indicated by a second indication.

In some embodiments, the second path 152 may have the first path identifier indicating the third number of hops, and the third path 153 may have the second path identifier indicating the fourth number of hops.

In some embodiments, the first path 151 may have a respective first path identifier indicating the second number of hops. The another path may have a respective second path identifier indicating the respective fourth number of hops.

By providing the second BAP address in this Action 703, the fourth node 114 may enable the first node 111 know how far it may be from the third node 113, e.g., the IAB-Donor-CU/DU following the third path 153.

Action 704

The fourth node 114 may provide the first list of BAP addresses, to one or more of: a) the first node 111 and b) the second node 112.

In this Action 704, the fourth node 114 may provide, to the first node 111, the first list of BAP addresses. Each of the BAP addresses in the provided first list may correspond to each node in the communications network 100 to which the fourth node 114 may provide the wired backhaul connection to the core network 120 of the communications network 100. Each of the BAP addresses in the obtained first list may be based on the respective fifth number of hops between the third node 113 and each node in the communications network 100 to which the third node 113 may provide the wired backhaul connection to the core network 120.

The providing, or sending, in this Action 704, may be performed, e.g., via the second link 142, and the third link 143, and/or via the fifth link 145 and the sixth link 146.

It may be understood that the first list of BAP addresses may be provided, e.g., indicated by a third indication.

By providing the first list of BAP addresses in this Action 704, the fourth node 114 may enable the first node 111 to know how far the other nodes, e.g., the second node 112, and the fifth node 115, may be from the third node 113, e.g., the IAB-Donor CU/DU, and from itself, so that the first node 111 may use this information to prioritize traffic destined for some nodes over the others, as will be described earlier.

Action 705

The fourth node 114 may provide one or more of: a) the third BAP address, to the first node 111, and b) a respective third BAP address, to the second node 112.

In this Action 705, the fourth node 114 may provide the third BAP address to the first node 111. The provided third BAP address is based on the updated sixth number of hops between the third node 113 and the first node 111 in the communications network 100.

It may be understood that the third BAP address may be provided, e.g., indicated by a fourth indication.

The provided respective third BAP address may be based on an updated respective sixth number of hops between the third node 113 and the second node 112 in the communications network 100.

The providing, or sending, in this Action 705 may be performed, e.g., via the second link 142, and the third link 143, and/or via the fifth link 145 and the sixth link 146.

It may be understood that the fourth node 114 may have allocated the one or more of: a) the third BAP address, to the first node 111, and b) the respective third BAP address, to the second node 112, similarly to how it has been described in Action 701.

By providing the third BAP address in this Action 705, the first node 111 may then be enabled to have an address indicating the number of hops between the third node 113 and the first node 111, even after that number may have changed due to changes in the topology of the communications network 100, such as those that may be necessary after a RLF.

Action 706

The fourth node 114 may provide the second list of BAP addresses, to one or more of: the first node 111, and b) the second node 112.

In this Action 706, the fourth node 114 may provide, to the first node 111, the second list of BAP addresses. The provided second list may comprise the at least one updated BAP address based on the updated seventh number of hops between the third node 113 and the at least one node in the communications network 100 to which the third node 113 may provide the wired backhaul connection to the core network 120.

The providing, or sending in this Action 706 may be performed, e.g., via the second link 142, and the third link 143, and/or via the fifth link 145 and the sixth link 146.

It may be understood that the second list of BAP addresses may be provided, e.g., indicated by a fifth indication.

By providing the second list of BAP addresses in this Action 706, the fourth node 114 may then enable the first node 111 to have an up-to-date knowledge of the respective number of hops between the third node 113 and the nodes in the communications network 100, even after at least one of those numbers may change due to changes in the topology of the communications network 100, such as those that may be necessary after a RLF.

Figure 8:
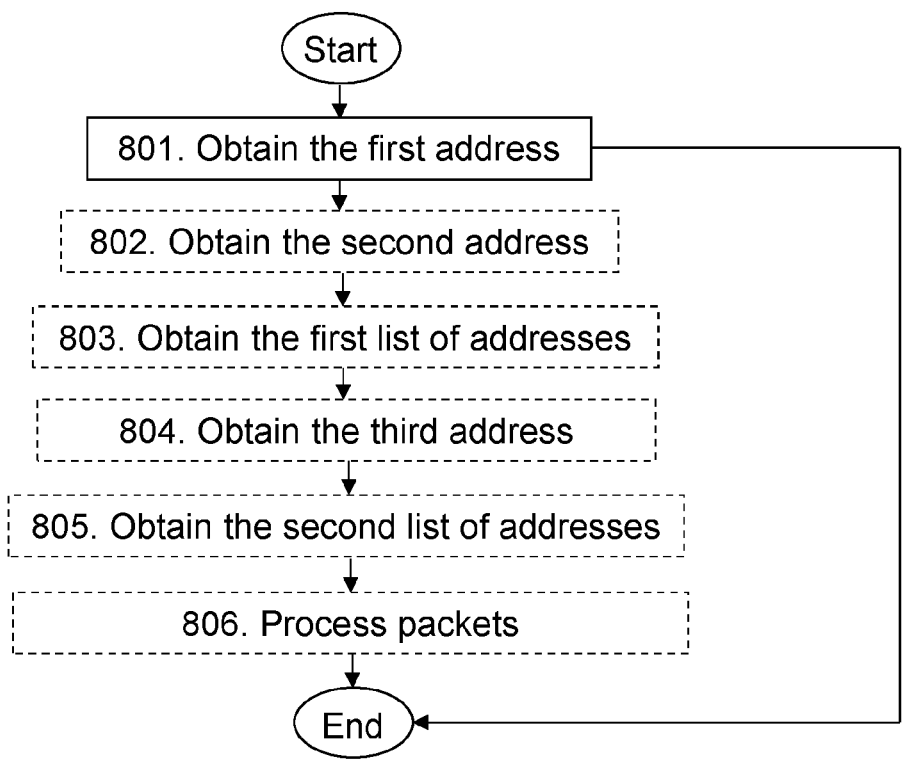
FIG. 8 depicts a flowchart of a method in a second node, according to embodiments herein.

Embodiments of a method, performed by the second node 112, will now be described with reference to the flowchart depicted in FIG. 8. The method may be understood to be for handling communications the communications network 100. Particularly, the method may be understood to be enabling to handle the packet in the communications network. The second node 112 operates in the communications network 100. The communications network 100 may be a multi-hop deployment. In some embodiments, the communications network 100 may be an Integrated Access Backhaul (IAB) network.

Several embodiments are comprised herein. The method may comprise one or more of the following actions. In some embodiments all the actions may be performed. In other embodiments, one or more actions may be performed. In some embodiments, actions may be optional. In FIG. 8, actions which may be optional in some examples are depicted with dashed boxes. It should be noted that the examples herein are not mutually exclusive. Components from one embodiment may be tacitly assumed to be present in another embodiment and it will be obvious to a person skilled in the art how those components may be used in the other exemplary embodiments. One or more embodiments may be combined, where applicable. All possible combinations are not described to simplify the description. Some actions may be performed in a different order than that shown in FIG. 8. The detailed description of some of the following corresponds to the same references provided above, in relation to the actions described for the first node 111 and will thus not be repeated here to simplify the description. For example, in some embodiments, the third node 113 may be an IAB-Donor DU. The second node 112, which may also be known as an intermediate, a relay node, or a destination node, may be an IAB-Donor CU. The fourth node 114 may be an IAB-Donor CU. The first node 111 may be an intermediate node.

Any of the obtaining, e.g., receiving, in Action 801-805 may be performed, e.g., via the first link 141, the second link 142, and the third link 143.

Action 801

In this Action 801, the second node 112 obtains the respective first BAP address from the fourth node 114 operating in the communications network 100. The obtained respective first BAP address is based on the second number of hops between the second node 112 and the third node 113 in the communications network 100 in the first path 151. The second node 112 obtains the wired backhaul connection to the core network 120 of the communications network 100 from the third node 113.

The obtaining, e.g., receiving, may be performed, e.g., via the first link 141, the second link 142, and the third link 143. Obtaining in this Action 801 may comprise, in some examples, retrieving a pre-configuration, e.g., a hard-coded pre-configuration, in the second node 112. In other examples, obtaining in this Action 801 may comprise receiving a configuration via an Operations, administration, and management (OAM) node.

It may be understood that the respective first BAP address may be obtained, e.g., indicated by a respective first indication.

In some examples, the obtaining in this Action 801 may be, e.g., during an integration procedure of the second node 112 into the communications network 100.

In some embodiments, the obtaining in this Action 801 may be performed via RRC signalling.

By obtaining the respective first BAP address in this Action 801, the second node 112 is enabled to know how far it is from the third node 113, e.g., the IAB-Donor-CU/DU following the first path 151, and process packets accordingly, as will be described later.

Action 802

In this Action 802, the second node 112 may obtain the respective second BAP address, from the fourth node 114. The obtained respective second BAP address may be based on the respective fourth number of hops between the third node 113 and the second node 112 in the communications network 100 in another path, e.g., the third path 153.

In some embodiments, the obtaining in this Action 802 may be performed via RRC signalling.

In some embodiments, the first path 151 may have the respective first path identifier indicating the second number of hops, and the another path may have the respective second path identifier indicating the respective fourth number of hops.

In some examples, the obtaining in this Action 802 may be, e.g., during an integration procedure of the second node 112 into the communications network 100.

In some embodiments, the obtaining in this Action 802 may be performed via RRC signalling.

It may be understood that the respective second BAP address may be obtained, e.g., indicated by a respective second indication.

By obtaining the respective second BAP address in this Action 802, the second node 112 may be enabled know how far it may be from the third node 113, e.g., the IAB-Donor-CU/DU following the another path 153, e.g., the third path 153.

Action 803

In this Action 803, the second node 112 may obtain, from the fourth node 114, the first list of BAP addresses. Each of the BAP addresses in the obtained first list may correspond to each node in the communications network 100 to which the fourth node 114 provides the wired backhaul connection to the core network 120 of the communications network 100. Each of the BAP addresses in the obtained first list may be based on the respective fifth number of hops, e.g., the fifth number of hopes, between the third node 113 and each node in the communications network 100 to which the third node 113 may provide the wired backhaul connection to the core network 120.

In some examples, the obtaining in this Action 803 may be, e.g., during an integration procedure of the second node 112 into the communications network 100.

In some embodiments, the obtaining in this Action 803 may be performed via RRC signalling.

It may be understood that the first list of BAP addresses may be obtained, e.g., indicated by the third indication.

By obtaining the first list of BAP addresses in this Action 803, the second node 112 may be enabled to know how far the other nodes, e.g., the first node 111, and the fifth node 115, may be from the third node 113, e.g., the IAB-Donor CU/DU, and from itself, so that the second node 112 may use this information to prioritize traffic destined for some nodes over the others.

Action 804

In this Action 804, the second node 112 may obtain the respective third BAP address from the fourth node 114. The obtained respective third BAP address may be based on an updated respective sixth number of hops between the third node 113 and the second node 112 in the communications network 100.

In some examples, the obtaining in this Action 804 may be, e.g., during an integration procedure of the second node 112 into the communications network 100.

In some embodiments, the obtaining in this Action 804 may be performed via RRC signalling.

It may be understood that the respective third BAP address may be obtained, e.g., indicated by a respective fourth indication.

By obtaining the respective third BAP address in this Action 804, the second node 112 may then be enabled to have an address indicating the number of hops between the third node 113 and the second node 112, even after that number may have changed due to changes in the topology of the communications network 100, such as those that may be necessary after a RLF.

Action 805

In this Action 805, the second node 112 may obtain, from the fourth node 114, the second list of BAP addresses. The obtained second list may comprise at least one updated BAP address based on the updated seventh number of hops between the third node 113 and at least one node in the communications network 100 to which the third node 113 may provide the wired backhaul connection to the core network 120.

In some examples, the obtaining in this Action 804 may be, e.g., during an integration procedure of the second node 112 into the communications network 100.

In some embodiments, the obtaining in this Action 804 may be performed via RRC signalling.

It may be understood that the second list of BAP addresses may be obtained, e.g., indicated by the fifth indication.

By obtaining the second list of BAP addresses in this Action 805, the second node 112 may then be enabled to have an up-to-date knowledge of the respective number of hops between the third node 113 and the nodes in the communications network 100, even after at least one of those numbers may change due to changes in the topology of the communications network 100, such as those that may be necessary after a RLF.

Action 806

In this Action 806, the second node 112 may process packets based on one or more of the obtained BAP addresses.

Processing the packets in this Action 806 may comprise, e.g., a determining action such as that described for that of the first node 111, but in relation to another destination node.

In some embodiments, the processing in this Action 806 may comprise routing at least one packet by selecting between at least two different paths. Each of the at least two different paths may be associated with a respective first number of hops between the second node 112 and a destination node, determined based on a respective BAP address for the destination node for each path. The selecting may be based on a quality of service to be fulfilled for the at least one packet.

In some examples wherein the second node 112 may be a destination node, the BAP address in the packet may map with the BAP-address of the MT in the second node 112, and the processing in this Action 806 may comprise sending the packet to a higher layer. Here, the GTP process may be reversed and what remains may be the PDCP-PDU to be ultimately sent to the wireless device 130.

In some embodiments, the second node 112 may receive another packet via at least one of the first path 151 and the third path 153, based on a quality of service to be fulfilled for the another packet.

In some embodiments, the processing in this Action 806 may be further based on the fourth BAP address of a next hop node, that is, a respective next hop node, towards the destination node. The next hop node may be, e.g., IAB3 in FIG. 10.

In some embodiments, at least one packet may be comprised in a set of packets to be scheduled by the second node 112. The second node 112 may schedule the packets according to at least one of: a) a first order, e.g., a first descending order of a first respective amount of hops for the packets until their respective destination nodes, based on a respective BAP address of the respective destination nodes; and b) a second order, e.g., a second descending order of a second respective amount of hops from respective next hop nodes for the packets and their respective destination nodes, based on the respective BAP address of the respective destination nodes, and a respective BAP address of the respective next hop nodes.

By providing processing the packets based on the one or more of the obtained BAP addresses in this Action 806, the second node 112 may then be enabled to optimize the processing of the packets according to one or more criteria, such as e.g., QoS of the packets, or number of hops the packets may need to traverse to reach their respective destination nodes, which may be understood to optimize the processing of the packets in terms of latency and maintenance of expected QoS.

Examples

Some embodiments herein will now be further described with some non-limiting examples.

In the following description, any reference to a/the/any intermediate IAB-node, or simply "IAB-node", and/or "IAB1" may be understood to equally refer the first node 111; any reference to a/the IAB-Donor CU/DU, or simply "IAB-Donor" may be understood to equally refer the fourth node 114; any reference to a/the "IAB-Donor DU" and/or "IAB-donor DU1" may be understood to equally refer to the third node 113; any reference to a/the/any destination IAB-node, destination node, and/or "IAB4" may be understood to equally refer the second node 112.

It may also be noted that in the following description, the terms BAP address and BAP routing ID are used interchangeably.

As stated earlier, some embodiments herein may be understood to be drawn to a method performed by the first node 111. The first node 111 operates in the communications network 100. The method comprises determining 606, based on the header of a packet, the first number of hops the packet has to traverse in the communications network 100 to reach the second node 112 in the communications network 100. The header of the packet indicates the second number of hops between the second node 112 and the third node 113 in the communications network 100 providing the wired backhaul connection to the core network 120 of the communications network 100 in the first path 151, and initiating 607 routing the packet towards the second node 112 based on the determined first number of hops.

Figure 9:
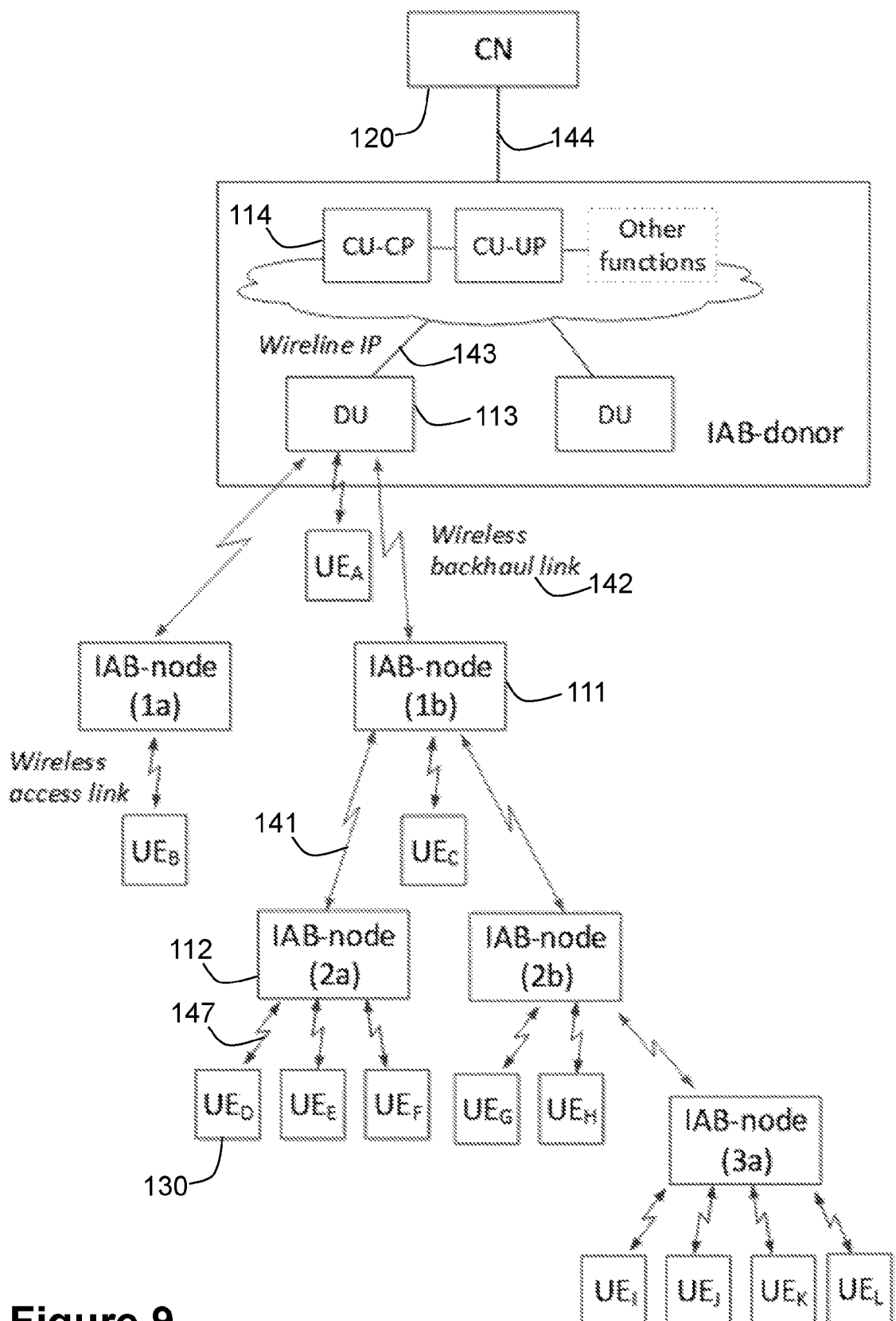
FIG. 9 is a schematic diagram illustrating an example of a communications network as an IAB network, according to embodiments herein.

FIG. 9 is a schematic diagram illustrating an example of the communications network 100 as an IAB network, wherein the hierarchical BAP address scheme described earlier is illustrated. The third node 113, which is an IAB-Donor DU, and the fourth node 114, which is IAB-Donor CU, are comprised in an IAB donor providing a wired backhaul connection, the fourth link 144, to the core network 120. The third node 113 is connected to the fourth node 114 via the third link 143, a wireline IP. The IAB donor further comprises another DU, a CU-UP, and other functions. A number of IAB-nodes are comprised in this non-limiting example: IAB nodes 1a and 1 b, wherein the first node 111 is IAB node 1b, IAB nodes 2a and 2b, wherein IAB node 2a is the second node 112, and IAB node 3a. Each of the IAB nodes provides a wireless access link, a respective seventh link 147, to a respective set of one or more wireless devices, $UE_A$, $UE_B$, $UE_C$, $UE_D$, $UE_E$, $UE_F$, $UE_G$, $UE_H$, $UE_I$, $UE_J$, $UE_K$, and $UE_L$, wherein the wireless device 130 is $UE_D$. The first node 111 is connected to the second node 112 via the first link 141, the first node 111 is connected to the third node 113 via the second link 142, a wireless backhaul link. Embodiments herein may be understood to be drawn to a method at the IAB network level that may divide the BAP Routing ID, e.g., 10 bits BAP address and 10 bits Path ID for both the downlink and uplink routing, into several classes, based on deployment scenarios. Each class may represent a set of BAP addresses to be allocated to IAB nodes, e.g., during an IAB integration procedure, that may be a certain number of hops away from the IAB-Donor DU. For example, in FIG. 9, IAB nodes 1a and 1b belong to a class comprising nodes 1-hop away from the IAB-Donor DU, while IAB nodes 2a and 2b belong to a class that comprising nodes 2-hop away from the IAB-donor DU. Similarly, IAB node 3a belongs to another class that includes nodes 3-hops away from the IAB-Donor DU. In a first group of examples, the BAP address space may be divided into N classes, for example, Table 1 shown above, based on the deployment scenario, that is, the maximum number of acceptable/allowable hops between any IAB node of the network and the IAB-Donor-DU. For instance, the value of N for the example topology shown in FIG. 9 will be 3. The value of N may depend on several parameters/factors, such as the applications and/or services that the network may provide, geographical area to cover, etc. For example, some latency critical applications may not be able to be provided by an IAB node that may be relatively far, in terms of hop count, from the IAB-Donor CU and/or DU (IAB-Donor CU/DU) and this may set limits on the number of possible and/or allowable hops in a given IAB network. Depending on the deployment situations, the sizes of these N classes may be the same or different. For instance, if there are more 1-hop away IAB nodes from the IAB-Donor DU then the set of BAP addresses for 1-hop away nodes may be larger (i.e., (1−x1)>(x1−x2)) than the other classes and so on.

During the IAB node connection and/or integration procedure, the IAB-Donor may acquire the number of hops between its DU and the new IAB node. The methods for how the IAB-Donor CU/DU may figure out the distance in terms of hop count for a newly integrated IAB node have already been covered in PCT/SE2019/050477. Once the IAB-Donor CU may have the information about the number of hops, the IAB-Donor-CU may allocate, according to Action 701 a BAP address from the class of addresses for that specific number of hops via RRC signaling. 3GPP Rel 16 has already agreed to use RRC configuration to assign BAP address(es) by Donor-CU during the IAB integration process. Furthermore, the newly integrated IAB node may be, according to Action 603 and/or Action 605, either preconfigured, hard-coded, or may be configured via Operations, administration, and management (OAM) during the integration process with the list of N classes for the BAP addresses. Hence, once the IAB node may, according to Action 601 receive its BAP address, it may be able to know how far it is from the IAB-Donor-CU/DU. Also, the IAB may be able to know, according to Action 606 how far the other IAB nodes may be from the IAB-Donor CU/DU, and from itself, via the list of classes for IAB nodes addresses, and so may use this information to, according to Action 607, prioritize traffic destined for some IAB nodes over the others.

Figure 10:
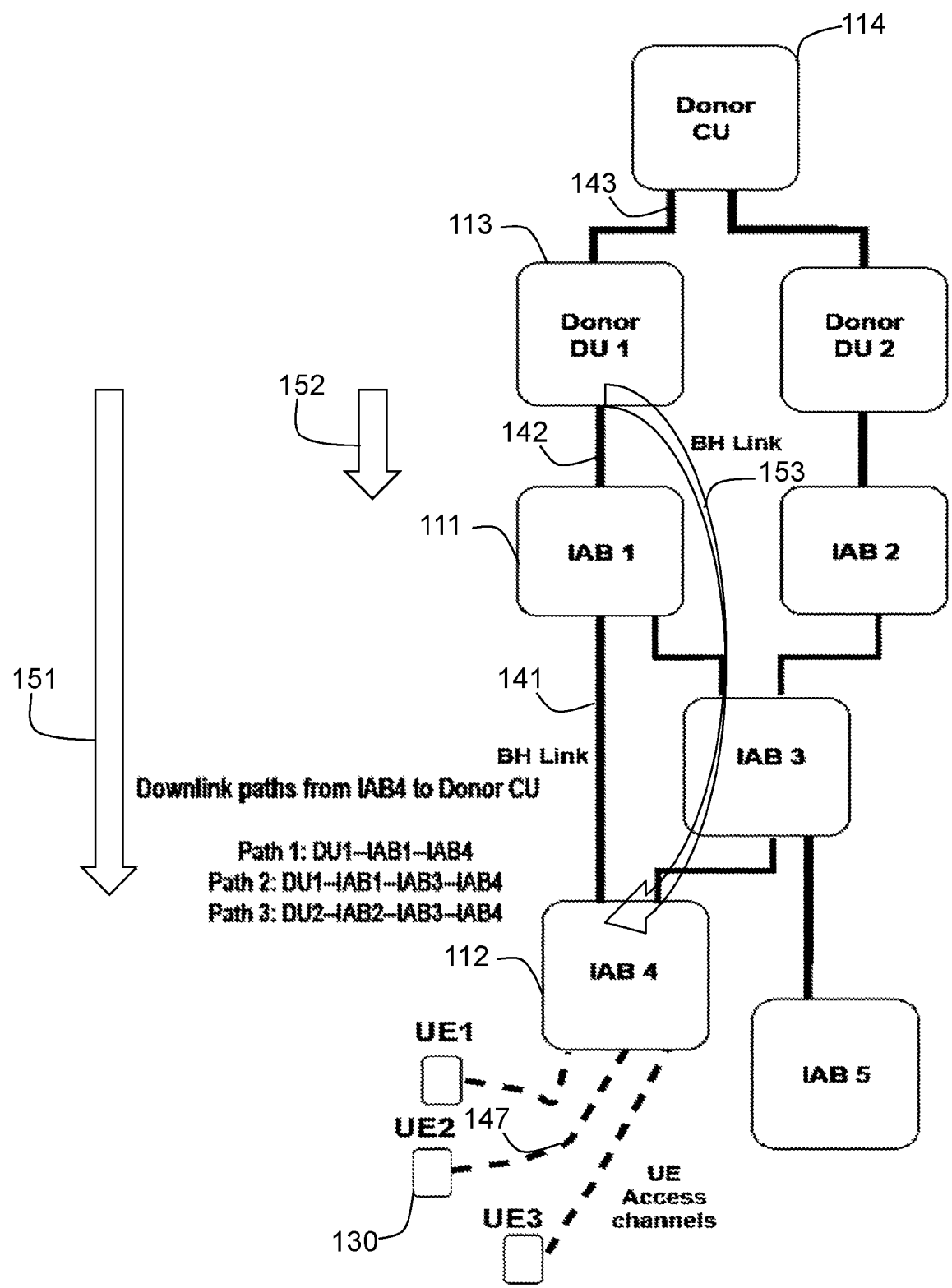
FIG. 10 is a schematic diagram illustrating another example of a communications network as an IAB network, according to embodiments herein.

FIG. 10 is a schematic diagram illustrating another example of the communications network 100 as an IAB network wherein the fourth node 114 is IAB-Donor CU with two Donor DUs: Donor DU 1, which is the third node 113, and Donor DU 2. A number of IAB-nodes are comprised in this non-limiting example: IAB 1, which is the first node 111, IAB node 2, IAB node 3, IAB node 4, which is the second node 112, and IAB node 5. FIG. 10 depicts an example of IAB network with multi-connectivity. The first node 111 is connected to the third node 113 in the second path 152. The second node 112 is connected to the third node 113 via the first node 111 in the first path 151, and via the first node 111 and IAB 3 in the third path 153. The second node 112 provides a wireless access link to a respective set of three wireless devices, UE1, UE2 and UE3, wherein the wireless device 130 is UE2. A second group of examples covers the scenarios when the IAB nodes may have multi-connectivity with the IAB-donor-DU/CU, and the IAB nodes may be different number of hops away from the IAB-donor-DU/CU via different paths. For example, in FIG. 10, IAB4 is 2-hops away from IAB-donor DU1 via the first path, Path1, that is, DU1-IAB1-IAB4, while it is 3-hop away via the third path, Path2, that is, DU1-IAB1-IAB3-IAB4.

In one sub-group of examples, the IAB nodes may be assigned BAP addresses equal to the different number of hop counts between the IAB node and the IAB-Donor-CU/DU. For instance, IAB4 in FIG. 10 has three paths with IAB-Donor-CU: Path1, Path2 and Path3, that is, DU2-IAB2-IAB3-IAB4. One of them is 1-hop while the other two are 2-hop long. Hence, IAB4 may be assigned two BAP addresses, one from the 1-hop class of addresses and another from the 2-hop class of addresses. So, packets, for IAB4, routed through Path1 may hold a BAP address assigned from the 1-hop class, while packets routed via Path2 and Path3 may carry BAP address assigned from the 2-hop class. Furthermore, different BAP Path IDs, e.g., "000" and "001", may be used for Path2 and Path3 in the BAP headers, for differentiating the different paths towards IAB4.

In a second sub-group of examples, the IAB nodes may be assigned one BAP address based on the hop count of their primary paths. For example, IAB4 in FIG. 10 may be assigned a BAP address from the 1-hop class of addresses based on the hop count of its primary path (Path1). While the BAP Path ID field may be used to signify the other paths for IAB nodes that are longer, in terms of hop count, than the primary path. For example, BAP Path ID values from $P_1$ to $P_a$ may be used for paths with same hop count as that of primary path, BAP Path IDS from $P_{a+1}$ to $P_b$ may be used for paths that are one hop longer than the primary path, BAP Path IDS from $P_{b+1}$ to $P_c$ may be used for paths that are two hop longer than the primary path, and so. Thus, when an intermediate IAB node such as the first node 111 may receive a packet for a particular destination node with BAP Address belonging to h-hop class of address and Path ID $P_u$ belonging to the class of Path IDs for paths with the same length as the primary path, the intermediate node may be enabled to know, as described in Action 606, that the destination node for these packets is h-hop away from the IAB-Donor-CU/DU.

The list of BAP Path ID classes, for the indication of hop count information, may either be pre-configured, e.g., hard-coded, in the IAB nodes or configured via OAM.

In an additional group of examples built on the above embodiments, an IAB node with multiple parent nodes, that may be different hops away from the IAB-Donor-CU/DU, may utilize the BAP addresses to route traffic with different QoS requirements through different uplink paths. For example, IAB4 in FIG. 10 may route latency critical data to IAB1, knowing that IAB1 is 1-hop away from the IAB-Donor-DU via its BAP address, and less critical data to IAB3, knowing that IAB3 is 2-hops away from the IAB-Donor-DU/CU via its BAP address. Similarly for the downstream, if an IAB node has multiple children, it may utilize the BAP addresses to route traffic with different QoS requirements through different downlink paths, e.g., IAB node 1 may route latency critical traffic to IAB 4, and non-latency critical traffic via IAB-3. Furthermore, during the RRC establishment, if there are several candidate parent nodes for camping, an IAB node may choose one that is relatively close, in terms of hop count, to the IAB-Donor-CU/DU. However, for this, the parent IAB nodes may need to broadcast their BAP Addresses in MIB or SIB1.

In yet another group of examples, a scheduler of an IAB node, when performing scheduling of certain services, may consider, as described in Action 606 and Action 607, both the BAP address of the destination and the BAP address of the next hop. The next hop node towards the second node 112 may be, e.g., IAB3 in FIG. 10. In one option, it may first schedule the packets which may be destined to the BAP addresses that may correspond to the farthest away destination, then the packets which may be located at a smaller number of hops apart. In another option, it may compare, as described in Action 606, the BAP address of the destination and the BAP address of the next hops. If the BAP addresses of the next hops are associated to different classes of BAP addresses, some that may be closer to the BAP destination, some others that may be farther away from the destination, then the concerned IAB node may first schedule packets whose next hop may be located at a higher number of hops from the destination, then the packets whose next hop may be closer to the destination. For example, assuming that the IAB 4 has to schedule data belonging to two BH RLC channels having same QoS requirements, one that is configured to be routed via IAB3 another via IAB1, then the IAB 4 may prioritize first packets of the BH RLC channel which has IAB3 as next hop, and then the packets for the BH RLC channel which has IAB1 as next hop.

In case of topology adaptation due to RLF or load balancing, etc., if an IAB node that was H1 hops away from IAB-Donor-CU before topology adaptation and now H2 hops away after topology adaptation, where H2 may be greater or smaller than H1, the IAB-Donor-CU may assign, as described in Action 701, a new BAP address from the class for H2 hops BAP addresses. Alternatively, the IAB node may use the same BAP Address while the list of N classes stored in the other IAB nodes may be updated via OAM by moving the BAP address of that IAB node for H1 class to H2 class.

Certain embodiments disclosed herein may provide one or more of the following technical advantage(s), which may be summarized as follows.

As a first advantage, embodiments herein may be understood to facilitate the IAB nodes schedulers to prioritize traffic destined for relatively far away nodes.

As another advantage, embodiments herein may be understood to involve less signaling overhead, and even no signaling may be required if the information is pre-configured in IAB nodes.

As a further advantage, embodiments herein may be understood to facilitate the IAB nodes with multiple parent nodes to perform a smart local routing decision for the uplink traffic. From the BAP addresses of the parent IAB nodes, wherein the BAP addresses of the parent nodes may be configured as next hop ID in the routing table, an IAB node may be able to know the hops between the parent nodes and IAB-Donor DU/CU and may be able to exploit this information for differentiated routing for the upstream traffic.

Figure 11:
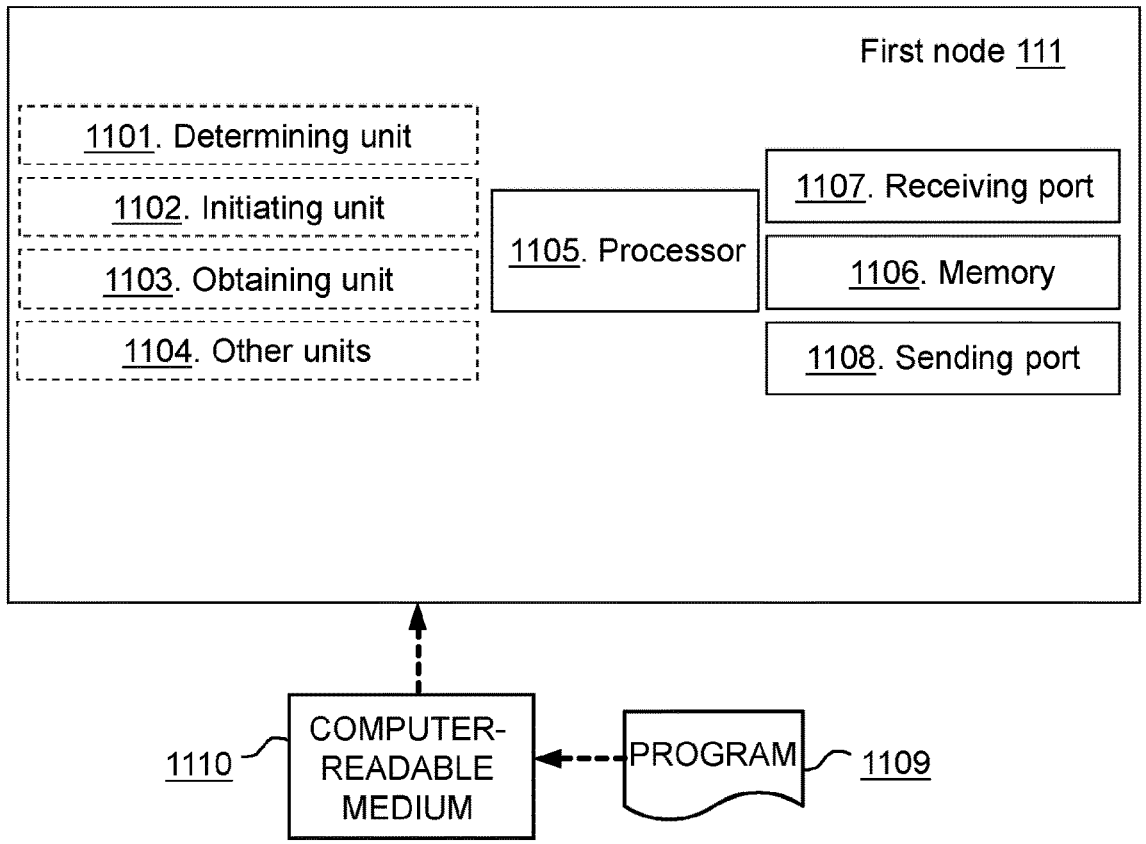
FIG. 11 is a schematic block diagram illustrating two non-limiting examples, a) and b), of a first node, according to embodiments herein.
Figure 11:
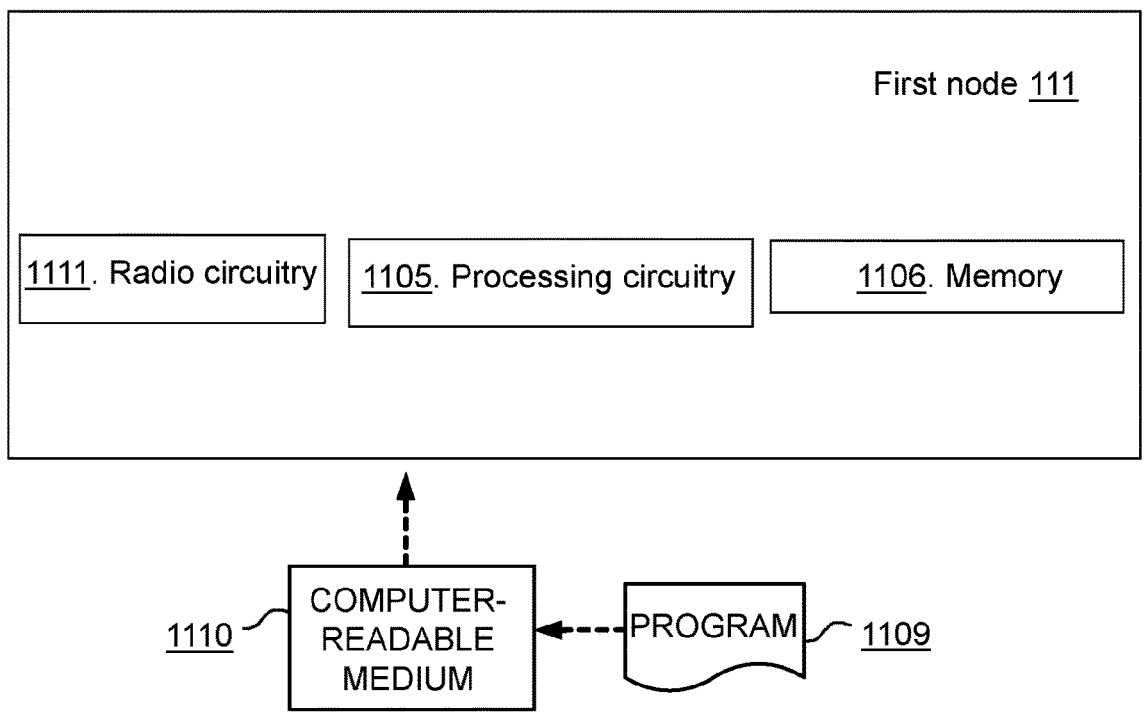

FIG. 11 depicts two different examples in panels a) and b), respectively, of the arrangement that the first node 111 may comprise. In some embodiments, the first node 111 may comprise the following arrangement depicted in FIG. 11a. The first node 111 may be understood to be for handling the packet in the communications network 10. The first node 111 is configured operate in the communications network 10.

Several embodiments are comprised herein. Components from one embodiment may be tacitly assumed to be present in another embodiment and it will be obvious to a person skilled in the art how those components may be used in the other exemplary embodiments. The detailed description of some of the following corresponds to the same references provided above, in relation to the actions described for the first node 111 and will thus not be repeated here. For example, in some embodiments, the third node 113 may be configured to be an IAB-Donor DU. The fourth node 114 may be configured to be an IAB-Donor CU.

In FIG. 11, optional units are indicated with dashed boxes.

The first node 111 is configured to perform the determining of Action 606, e.g. by means of a determining unit 1101 within the first node 111, configured to, determine, based on the header of a packet, the first number of hops the packet is configured to have to traverse in the communications network 100, to reach the second node 112 in the communications network 100. The header of the packet is configured to indicate the second number of hops between the second node 112 and the third node 113 in the communications network 100 in the first path 151. The first node 111 is configured to obtain the wired backhaul connection to the core network 120 of the communications network 100 from the third node 113.

The determining unit 1101 may be a processor 1105 of the first node 111, or an application running on such processor.

The first node 111 is configured to perform the initiating of Action 607 action, e.g. by means of an initiating unit 1102 within the first node 111, configured to, initiate routing the packet towards the second node 112 based on the first number of hops configured to be determined.

The initiating unit 1102 may be a processor 1105 of the first node 111, or an application running on such processor.

In some embodiments, the header may be configured to comprise the address and the identifier (ID), of the route configured to be followed by the packet in the communications network 100.

In some embodiments, the communications network 100 may be configured to be an IAB network, the address may be configured to be a BAP address and the identifier may be configured to be a BAP routing ID.

The initiating of the routing may be further configured to be based on the quality of service configured to be associated with the packet.

The first node 111 may be configured to perform the obtaining of Action 601, e.g. by means of an obtaining unit 1103 within the first node 111, configured to, obtain the first BAP address, from the fourth node 114 configured to operate in the communications network 100. The first BAP address configured to be obtained may be configured to be based on the third number of hops between the first node 111 and the third node 113 in the communications network 100 in the second path 152.

The obtaining unit 1103 may be the processor 1105 of the first node 111, or an application running on such processor.

The first BAP address may be configured to be obtained indicated by the first indication.

The first node 111 may be configured to perform the obtaining of Action 602, e.g., by means of the obtaining unit 1103 configured to, obtain the second BAP address, from the fourth node 114. The second BAP address configured to be obtained may be configured to be based on the fourth number of hops between the third node 113 and the first node 111 in the communications network 100 in the third path 153.

It may be understood that the second BAP address may be configured to be obtained, e.g., indicated by the second indication.

In some embodiments, the second path 152 may be configured to have the first path identifier configured to indicate the third number of hops. The third path 153 may be configured to have the second path identifier configured to indicate the fourth number of hops.

The first node 111 may be configured to perform the obtaining of Action 603 action, e.g., by means of the obtaining unit 1103 configured to, obtain, from the fourth node 114, the first list of BAP addresses. Each of the BAP addresses in the first list configured to be obtained may be configured to correspond to each node in the communications network 100 to which the fourth node 114 is configured to provide the wired backhaul connection to the core network 120 of the communications network 100. Each of the BAP addresses in the first list configured to be obtained may be configured to be based on the respective fifth number of hops between the third node 113 and each node in the communications network 100 to which the third node 113 may be configured to provide the wired backhaul connection to the core network 120.

It may be understood that the first list of BAP addresses may be configured to be obtained, e.g., indicated by the third indication.

The first node 111 may be configured to perform the obtaining of Action 604 action, e.g., by means of the obtaining unit 1103 configured to, obtain the third BAP address from the fourth node 114. The third BAP address configured to be obtained may be configured to be based on the updated sixth number of hops between the third node 113 and the first node 111 in the communications network 100.

It may be understood that the third BAP address may be configured to be obtained, e.g., indicated by the fourth indication.

The first node 111 may be configured to perform the obtaining of Action 605, e.g., by means of the obtaining unit 1103 configured to, obtain, from the fourth node 114, the second list of BAP addresses. The second list configured to be obtained may be configured to comprise at least one updated BAP address based on the updated seventh number of hops between the third node 113 and at least one node in the communications network 100 to which the third node 113 may be configured to provide the wired backhaul connection to the core network 120.

It may be understood that the second list of BAP addresses may be configured to be obtained, e.g., indicated by the fifth indication.

In some embodiments, to initiate routing may be configured to comprise selecting between at least two different paths. Each of the at least two different paths may be configured to be associated with the respective first number of hops between the first node 111 and the second node 112, configured to be determined based on the respective BAP address for the second node 112 for each path. The selecting may be configured to be based on the quality of service configured to be fulfilled for the packet.

In some embodiments, the first node 111 may be configured to receive the second packet via at least one of the second path 152 and the third path 153, based on the quality of service configured to be fulfilled for the second packet.

In some embodiments, to initiate routing may be further configured to be based on the fourth BAP address of the next hop node towards the second node 112.

In some embodiments, the packet may be configured to be comprised in the set of packets to be scheduled by the first node 111. The first node 111 may be configured to schedule the packets according to at least one of the following options. According to a first option, the first descending order of the first respective amount of hops for the packets until their respective destination nodes, based on the respective BAP address of the respective destination nodes. According to the second option, the second descending order of the second respective amount of hops from the respective next hop nodes for the packets and their respective destination nodes, based on the respective BAP address of the respective destination nodes, and the respective BAP address of the respective next hop nodes.

Other units 1104 may be comprised in the first node 111.

The embodiments herein in the first node 111 may be implemented through one or more processors, such as a processor 1105 in the first node 111 depicted in FIG. 11a, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the first node 111. One such carrier may be in the form of a CD ROM disc. It is however feasible with other data carriers such as a memory stick. The computer program code may furthermore be provided as pure program code on a server and downloaded to the first node 111.

The first node 111 may further comprise a memory 1106 comprising one or more memory units. The memory 1106 is arranged to be used to store obtained information, store data, configurations, schedulings, and applications etc. to perform the methods herein when being executed in the first node 111.

In some embodiments, the first node 111 may receive information from, e.g., the second node 112, the third node 113, the fourth node 114, the fifth node 115, the wireless device 130, or any other node, through a receiving port 1107. In some embodiments, the receiving port 1107 may be, for example, connected to one or more antennas in first node 111. In other embodiments, the first node 111 may receive information from another structure in the communications network 100 through the receiving port 1107. Since the receiving port 1107 may be in communication with the processor 1105, the receiving port 1107 may then send the received information to the processor 1105. The receiving port 1107 may also be configured to receive other information.

The processor 1105 in the first node 111 may be further configured to transmit or send information to e.g., the second node 112, the third node 113, the fourth node 114, the fifth node 115, the wireless device 130, or any other node, or another structure in the communications network 100, through a sending port 1108, which may be in communication with the processor 1105, and the memory 1106.

Those skilled in the art will also appreciate that the units 1101-1104 described above may refer to a combination of analog and digital circuits, and/or one or more processors configured with software and/or firmware, e.g., stored in memory, that, when executed by the one or more processors such as the processor 1105, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different units 1101-1104 described above may be implemented as one or more applications running on one or more processors such as the processor 1105.

Thus, the methods according to the embodiments described herein for the first node 111 may be respectively implemented by means of a computer program 1109 product, comprising instructions, i.e., software code portions, which, when executed on at least one processor 1105, cause the at least one processor 1105 to carry out the actions described herein, as performed by the first node 111. The computer program 1109 product may be stored on a computer-readable storage medium 1110. The computer-readable storage medium 1110, having stored thereon the computer program 1109, may comprise instructions which, when executed on at least one processor 1105, cause the at least one processor 1105 to carry out the actions described herein, as performed by the first node 111. In some embodiments, the computer-readable storage medium 1110 may be a non-transitory computer-readable storage medium, such as a CD ROM disc, or a memory stick. In other embodiments, the computer program 1109 product may be stored on a carrier containing the computer program 1109 just described, wherein the carrier is one of an electronic signal, optical signal, radio signal, or the computer-readable storage medium 1110, as described above.

The first node 111 may comprise a communication interface configured to facilitate communications between the first node 111 and other nodes or devices, e.g., the second node 112, the third node 113, the fourth node 114, the fifth node 115, the wireless device 130, or any other node. The interface may, for example, include a transceiver configured to transmit and receive radio signals over an air interface in accordance with a suitable standard.

In other embodiments, the first node 111 may comprise the following arrangement depicted in FIG. 11b. The first node 111 may comprise a processing circuitry 1105, e.g., one or more processors such as the processor 1105, in the first node 111 and the memory 1106. The first node 111 may also comprise a radio circuitry 1111, which may comprise e.g., the receiving port 1107 and the sending port 1108. The processing circuitry 1105 may be configured to, or operable to, perform the method actions according to FIG. 6, FIGS. 9-10 and/or FIGS. 15-19, in a similar manner as that described in relation to FIG. 11a. The radio circuitry 1111 may be configured to set up and maintain at least a wireless connection with the the second node 112, the third node 113, the fourth node 114, the fifth node 115, the wireless device 130, and/or any other node. Circuitry may be understood herein as a hardware component.

Hence, embodiments herein also relate to the first node 111 operative to operate in the communications network 100. The first node 111 may comprise the processing circuitry 1105 and the memory 1106, said memory 1106 containing instructions executable by said processing circuitry 1105, whereby the first node 111 is further operative to perform the actions described herein in relation to the first node 111, e.g., in FIG. 6, FIGS. 9-10 and/or FIGS. 15-19.

Figure 12:
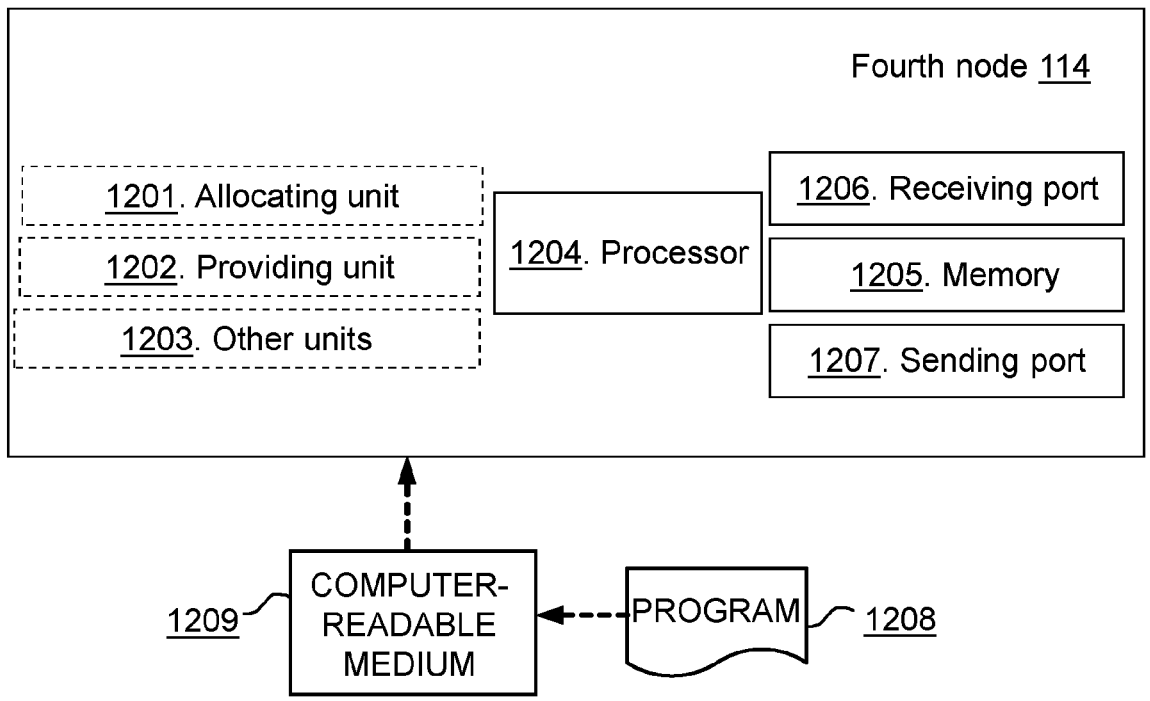
FIG. 12 is a schematic block diagram illustrating two non-limiting examples, a) and b), of a fourth node, according to embodiments herein.
Figure 12:
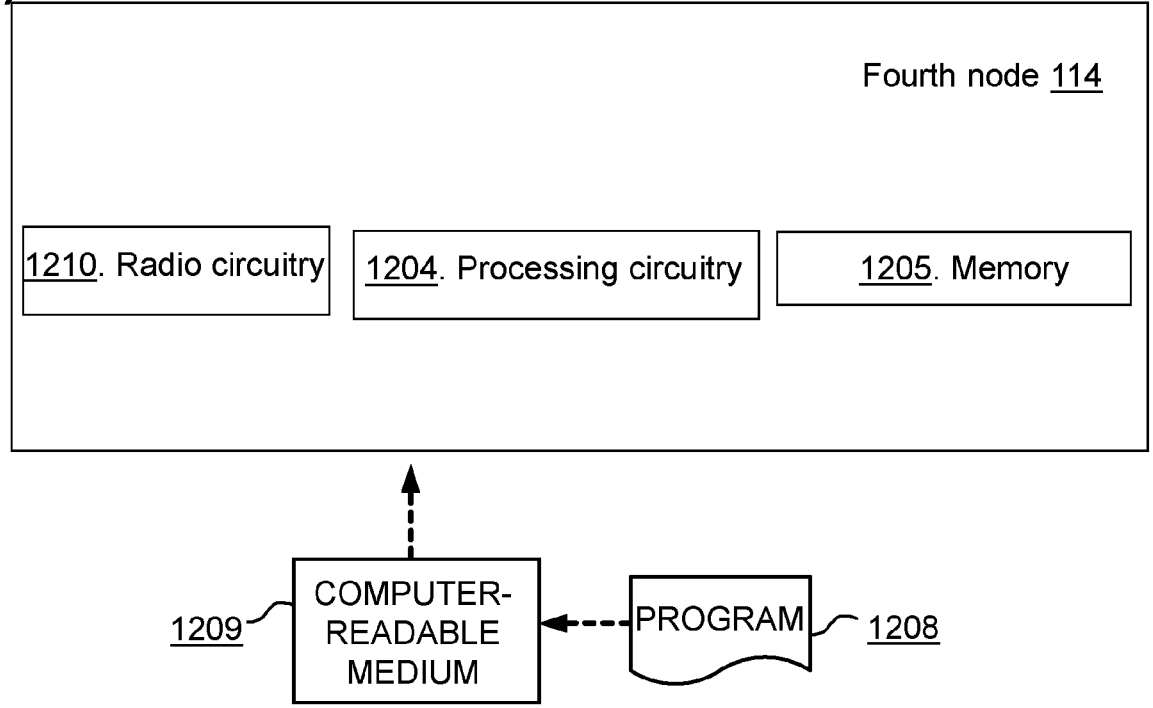

FIG. 12 depicts two different examples in panels a) and b), respectively, of the arrangement that the fourth node 114 may comprise. In some embodiments, the fourth node 114 may comprise the following arrangement depicted in FIG. 12a. The fourth node 114 may be understood to be for enabling to handle a packet in the communications network. The fourth node 114 is configured operate in the communications network 10.

Several embodiments are comprised herein. Components from one embodiment may be tacitly assumed to be present in another embodiment and it will be obvious to a person skilled in the art how those components may be used in the other exemplary embodiments. The detailed description of some of the following corresponds to the same references provided above, in relation to the actions described for the first node 111 and will thus not be repeated here. For example, in some embodiments, the third node 113 may be configured to be an IAB-Donor DU. The fourth node 114 may be configured to be an IAB-Donor CU.

In FIG. 12, optional units are indicated with dashed boxes.

The fourth node 114 is configured to perform the allocating of Action 701, e.g., by means of an allocating unit 1201 within the fourth node 114, configured to, allocate the first BAP address, to the first node 111 configured to operate in the communications network 100. The first BAP address configured to be allocated is configured to be based on the third number of hops between the first node 111 and the third node 113 in the communications network 100 in the second path 152. The wired backhaul connection to the core network 120 of the communications network 100 is configured to be provided to the first node 111 by the third node 113.

The allocating unit 1201 may be the processor 1204 of the fourth node 114, or an application running on such processor.

The fourth node 114 is also configured to perform the providing of Action 702, e.g., by means of a providing unit 1202 within the fourth node 114, configured to, provide the first indication to the first node 111. The first indication is configured to indicate the first BAP address configured to be allocated.

The providing unit 1202 may be the processor 1204 of the fourth node 114, or an application running on such processor.

In some embodiments, to allocate the first BAP address may be configured to comprise selecting the first BAP address from the group of BAP addresses. The group of BAP addresses may be configured to comprise the plurality of subsets of BAP addresses. Each of the subsets may be configured to correspond to the respective class of addresses, of the plurality of classes of addresses (N). Each of the respective class of addresses may be configured to correspond to the respective number of hops between a certain node and the third node 113. The first BAP address may be configured to be selected from the first class of addresses in the communications network 100 configured to correspond to the third number of hops between the third node 113 and the first node 111.

To provide may be configured to be performed via RRC signalling.

The communications network 100 may be configured to be an IAB network.

The fourth node 114 may be configured to perform the providing of Action 703, e.g., by means of the providing unit 1202 within the fourth node 114, configured to, provide the second BAP address to the first node 111. The second BAP address configured to be provided may be configured to be based on the fourth number of hops between the third node 113 and the first node 111 in the communications network 100 in the third path 153.

It may be understood that the second BAP address may be configured to be provided, e.g., indicated by the second indication.

In some embodiments, the second path 152 may be configured to have the first path identifier configured to indicate the third number of hops. The third path 153 may be configured to have the second path identifier configured to indicate the fourth number of hops.

The fourth node 114 may be configured to perform the providing of Action 704, e.g., by means of the providing unit 1202 within the fourth node 114, configured to, provide, to the first node 111, the first list of BAP addresses. Each of the BAP addresses in the first list configured to be provided may be configured to correspond to each node in the communications network 100 to which the fourth node 114 may be configured to provide the wired backhaul connection to the core network 120 of the communications network 100. Each of the BAP addresses in the first list configured to be obtained may be configured to be based on the respective fifth number of hops between the third node 113 and each node in the communications network 100 to which the third node 113 may be configured to provide the wired backhaul connection to the core network 120.

It may be understood that the first list of BAP addresses may be configured to be provided, e.g., indicated by the third indication.

The fourth node 114 may be configured to perform the providing of Action 705, e.g., by means of the providing unit 1202 within the fourth node 114, configured to, provide the third BAP address to the first node 111. The third BAP address configured to be provided may be configured to be based on the updated sixth number of hops between the third node 113 and the first node 111 in the communications network 100.

It may be understood that the third BAP address may be configured to be provided, e.g., indicated by the fourth indication.

The fourth node 114 may be configured to perform the providing of Action 706, e.g., by means of the providing unit 1202 within the fourth node 114, configured to, provide, to the first node 111, the second list of BAP addresses. The second list configured to be provided may be configured to comprise at least one updated BAP address based on the updated seventh number of hops between the third node 113 and at least one node in the communications network 100 to which the third node 113 may be configured to provide the wired backhaul connection to the core network 120.

It may be understood that the second list of BAP addresses may be configured to be provided, e.g., indicated by the fifth indication.

Other units 1203 may be comprised in the fourth node 114.

The embodiments herein in the fourth node 114 may be implemented through one or more processors, such as a processor 1204 in the fourth node 114 depicted in FIG. 12*a*, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the fourth node 114. One such carrier may be in the form of a CD ROM disc. It is however feasible with other data carriers such as a memory stick. The computer program code may furthermore be provided as pure program code on a server and downloaded to the fourth node 114.

The fourth node 114 may further comprise a memory 1205 comprising one or more memory units. The memory 1205 is arranged to be used to store obtained information, store data, configurations, schedulings, and applications etc. to perform the methods herein when being executed in the fourth node 114.

In some embodiments, the fourth node 114 may receive information from, e.g., the first node 111, the second node 112, the third node 113, the fifth node 115, the wireless device 130, or any other node, through a receiving port 1206. In some embodiments, the receiving port 1206 may be, for example, connected to one or more antennas in the fourth node 114. In other embodiments, the fourth node 114 may receive information from another structure in the communications network 100 through the receiving port 1206. Since the receiving port 1206 may be in communication with the processor 1204, the receiving port 1206 may then send the received information to the processor 1204. The receiving port 1206 may also be configured to receive other information.

The processor 1204 in the fourth node 114 may be further configured to transmit or send information to e.g., the first node 111, the second node 112, the third node 113, the fifth node 115, the wireless device 130, or any other node, or another structure in the communications network 100, through a sending port 1207, which may be in communication with the processor 1204, and the memory 1205.

Those skilled in the art will also appreciate that the units 1201-1203 described above may refer to a combination of analog and digital circuits, and/or one or more processors configured with software and/or firmware, e.g., stored in memory, that, when executed by the one or more processors such as the processor 1204, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different units 1201-1203 described above may be implemented as one or more applications running on one or more processors such as the processor 1204.

Thus, the methods according to the embodiments described herein for the fourth node 114 may be respectively implemented by means of a computer program 1208 product, comprising instructions, i.e., software code portions, which, when executed on at least one processor 1204, cause the at least one processor 1204 to carry out the actions described herein, as performed by the fourth node 114. The computer program 1208 product may be stored on a computer-readable storage medium 1209. The computer-readable storage medium 1209, having stored thereon the computer program 1208, may comprise instructions which, when executed on at least one processor 1204, cause the at least one processor 1204 to carry out the actions described herein, as performed by the fourth node 114. In some embodiments, the computer-readable storage medium 1209 may be a non-transitory computer-readable storage medium, such as a CD ROM disc, or a memory stick. In other embodiments, the computer program 1208 product may be stored on a carrier containing the computer program 1208 just described, wherein the carrier is one of an electronic signal, optical signal, radio signal, or the computer-readable storage medium 1209, as described above.

The fourth node 114 may comprise a communication interface configured to facilitate communications between the fourth node 114 and other nodes or devices, e.g., the first node 111, the second node 112, the third node 113, the fifth node 115, the wireless device 130, or any other node, or another structure. The interface may, for example, include a transceiver configured to transmit and receive radio signals over an air interface in accordance with a suitable standard.

In other embodiments, the fourth node 114 may comprise the following arrangement depicted in FIG. 12b. The fourth node 114 may comprise a processing circuitry 1204, e.g., one or more processors such as the processor 1204, in the fourth node 114 and the memory 1205. The fourth node 114 may also comprise a radio circuitry 1210, which may comprise e.g., the receiving port 1206 and the sending port 1207. The processing circuitry 1204 may be configured to, or operable to, perform the method actions according to FIG. 7, FIGS. 9-10 and/or FIGS. 15-19, in a similar manner as that described in relation to FIG. 12a. The radio circuitry 1210 may be configured to set up and maintain at least a wireless connection with the the first node 111, the second node 112, the third node 113, the fifth node 115, the wireless device 130, and/or any other node. Circuitry may be understood herein as a hardware component.

Hence, embodiments herein also relate to the fourth node 114 operative to operate in the communications network 100. The fourth node 114 may comprise the processing circuitry 1204 and the memory 1205, said memory 1205 containing instructions executable by said processing circuitry 1204, whereby the fourth node 114 is further operative to perform the actions described herein in relation to the fourth node 114, e.g., in FIG. 7, FIGS. 9-10 and/or FIGS. 15-19.

Figure 13:
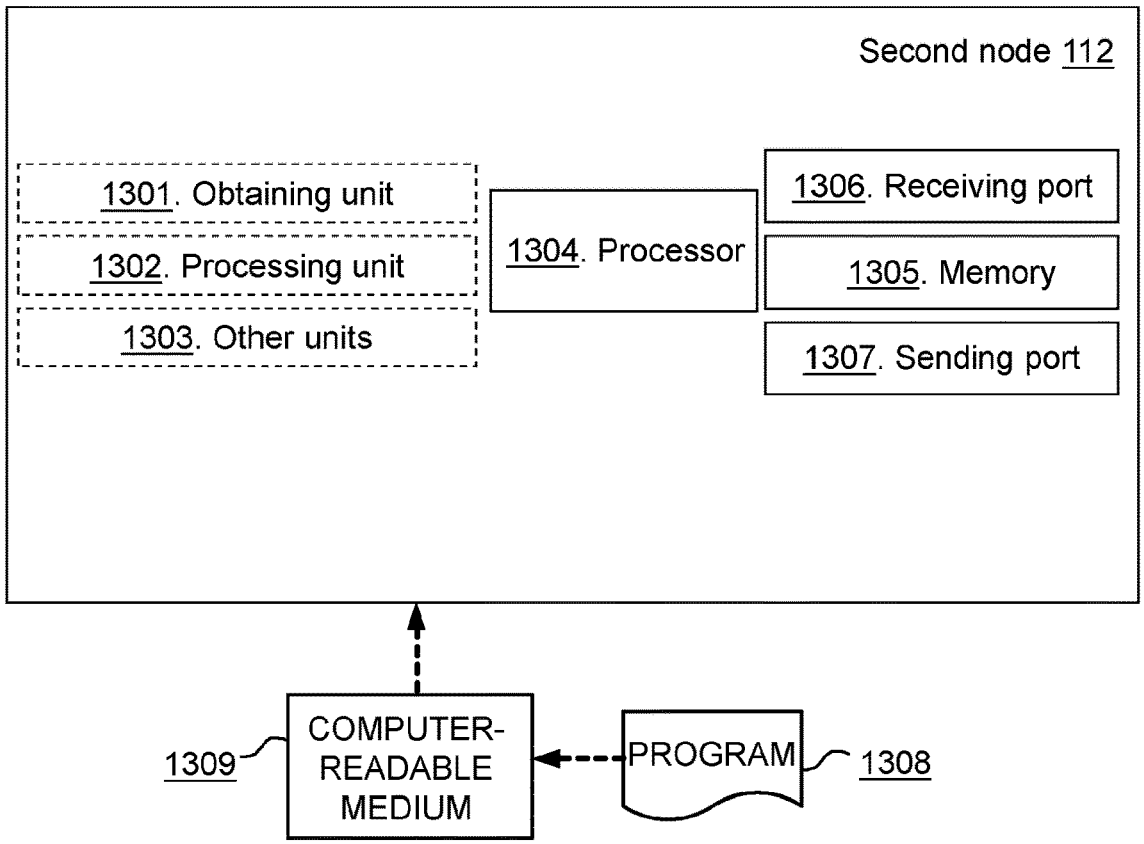
FIG. 13 is a schematic block diagram illustrating two non-limiting examples, a) and b), of a second node, according to embodiments herein.
Figure 13:
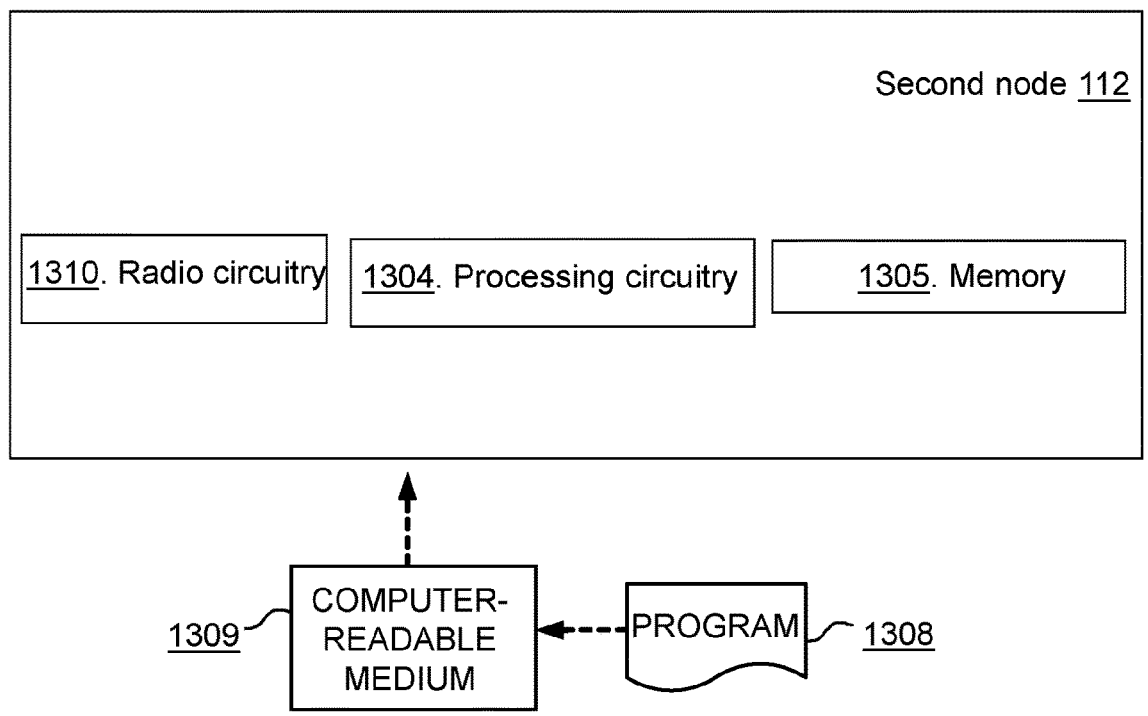

FIG. 13 depicts two different examples in panels a) and b), respectively, of the arrangement that the second node 112 may comprise. In some embodiments, the second node 112 may comprise the following arrangement depicted in FIG. 13a. The second node 112 may be understood to be for enabling to handle the packet in the communications network. The second node 112 is configured operate in the communications network 10.

Several embodiments are comprised herein. Components from one embodiment may be tacitly assumed to be present in another embodiment and it will be obvious to a person skilled in the art how those components may be used in the other exemplary embodiments. The detailed description of some of the following corresponds to the same references provided above, in relation to the actions described for the first node 111 and will thus not be repeated here. For example, in some embodiments, the third node 113 may be configured to be an IAB-Donor DU. The fourth node 114 may be configured to be an IAB-Donor CU In FIG. 13, optional units are indicated with dashed boxes.

The second node 112 is configured to perform the obtaining of Action 801, e.g. by means of an obtaining unit 1301 within the second node 112, configured to, obtain the respective first BAP address, from the fourth node 114 configured to operate in the communications network 100. The respective first BAP address configured to be obtained is configured to be based on the second number of hops between the second node 112 and the third node 113 in the communications network 100 in the first path 151. The second node 112 is configured to obtain the wired backhaul connection to the core network 120 of the communications network 100 from the third node 113.

The obtaining unit 1301 may be a processor 1304 of the second node 112, or an application running on such processor.

The respective first BAP address may be configured to be obtained indicated by the respective first indication.

In some embodiments, the communications network 100 may be configured to be an IAB network.

The second node 112 may be configured to perform the obtaining of Action 802, e.g., by means of the obtaining unit 1301, configured to, obtain the respective second BAP address, from the fourth node 114. The respective second BAP address configured to be obtained may be based on the respective fourth number of hops between the third node 113 and the second node 112 in the communications network 100 in another path.

It may be understood that the respective second BAP address may be configured to be obtained, e.g., indicated by the respective second indication.

In some embodiments, the first path 151 may be configured to have the respective first path identifier configured to indicate the second number of hops. The another path may be configured to have the respective second path identifier configured to indicate the respective fourth number of hops.

The second node 112 may be configured to perform the obtaining of Action 803, e.g., by means of the obtaining unit 1301, configured to, obtain, from the fourth node 114, the first list of BAP addresses. Each of the BAP addresses in the first list configured to be obtained may be configured to correspond to each node in the communications network 100 to which the fourth node 114 may be configured to provide the wired backhaul connection to the core network 120 of the communications network 100. Each of the BAP addresses in the first list configured to be obtained may be configured to be based on the respective fifth number of hops between the third node 113 and each node in the communications network 100 to which the third node 113 may be configured to provide the wired backhaul connection to the core network 120.

It may be understood that the first list of BAP addresses may be configured to be obtained, e.g., indicated by the third indication.

The second node 112 may be configured to perform the obtaining of Action 804, e.g., by means of the obtaining unit 1301, configured to, obtain the respective third BAP address from the fourth node 114. The respective third BAP address configured to be obtained may be configured to be based on the updated respective sixth number of hops between the third node 113 and the second node 112 in the communications network 100.

It may be understood that the respective third BAP address may be configured to be obtained, e.g., indicated by the respective fourth indication.

The second node 112 may be configured to perform the obtaining of Action 805, e.g., by means of the obtaining unit 1301, configured to, obtain, from the fourth node 114, the second list of BAP addresses. The second list configured to be obtained may be configured to comprise at least one updated BAP address configured to be based on the updated seventh number of hops between the third node 113 and at least one node in the communications network 100 to which the third node 113 may be configured to be provide the wired backhaul connection to the core network 120.

It may be understood that the second list of BAP addresses may be configured to be obtained, e.g., indicated by the fifth indication.

The second node 112 may be configured to perform the processing of Action 806, e.g. by means of a processing unit 1302 within the second node 112, configured to, process packets based on the one or more of the BAP addresses configured to be obtained.

The processing unit 1302 may be the processor 1304 of the second node 112, or an application running on such processor.

In some embodiments, to process may be configured to comprise routing at least one packet by selecting between at least two different paths. Each of the at least two different paths may be configured to be associated with the respective first number of hops between the second node 112 and the destination node, configured to be determined based on the respective BAP address for the destination node for each path. The selecting may be configured to be based on the quality of service configured to be to be fulfilled for the at least one packet.

In some embodiments, the second node 112 may be configured to receive another packet via at least one of the first path 151 and the third path 153, based on the quality of service configured to be fulfilled for the another packet.

In some embodiments, to process may be further configured to be based on the fourth BAP address of the next hop node towards the destination node.

In some embodiments, at least one packet may be configured to be comprised in the set of packets configured to be scheduled by the second node 112. The second node 112 may be configured to schedule the packets according to at least one of the following options. According to a first option, the first descending order of the first respective amount of hops for the packets until their respective destination nodes, based on the respective BAP address of the respective destination nodes. According to a second option, the second descending order of the second respective amount of hops from the respective next hop nodes for the packets and their respective destination nodes, based on the respective BAP address of the respective destination nodes, and the respective BAP address of the respective next hop nodes.

Other units 1303 may be comprised in the second node 112.

The embodiments herein in the second node 112 may be implemented through one or more processors, such as a processor 1304 in the second node 112 depicted in FIG. 13a, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the second node 112. One such carrier may be in the form of a CD ROM disc. It is however feasible with other data carriers such as a memory stick. The computer program code may furthermore be provided as pure program code on a server and downloaded to the second node 112.

The second node 112 may further comprise a memory 1305 comprising one or more memory units. The memory 1305 is arranged to be used to store obtained information, store data, configurations, schedulings, and applications etc. to perform the methods herein when being executed in the second node 112.

In some embodiments, the second node 112 may receive information from, e.g., the first node 111, the third node 113, the fourth node 114, the fifth node 115, the wireless device 130, or any other node, through a receiving port 1306. In some embodiments, the receiving port 1306 may be, for example, connected to one or more antennas in the second node 112. In other embodiments, the second node 112 may receive information from another structure in the communications network 100 through the receiving port 1306.

Since the receiving port 1306 may be in communication with the processor 1304, the receiving port 1306 may then send the received information to the processor 1304. The receiving port 1306 may also be configured to receive other information.

The processor 1304 in the second node 112 may be further configured to transmit or send information to e.g., the first node 111, the third node 113, the fourth node 114, the fifth node 115, the wireless device 130, or any other node, or another structure in the communications network 100, through a sending port 1307, which may be in communication with the processor 1304, and the memory 1305.

Those skilled in the art will also appreciate that the units 1301-1303 described above may refer to a combination of analog and digital circuits, and/or one or more processors configured with software and/or firmware, e.g., stored in memory, that, when executed by the one or more processors such as the processor 1304, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different units 1301-1303 described above may be implemented as one or more applications running on one or more processors such as the processor 1304.

Thus, the methods according to the embodiments described herein for the second node 112 may be respectively implemented by means of a computer program 1308 product, comprising instructions, i.e., software code portions, which, when executed on at least one processor 1304, cause the at least one processor 1304 to carry out the actions described herein, as performed by the second node 112. The computer program 1308 product may be stored on a computer-readable storage medium 1309. The computer-readable storage medium 1309, having stored thereon the computer program 1308, may comprise instructions which, when executed on at least one processor 1304, cause the at least one processor 1304 to carry out the actions described herein, as performed by the second node 112. In some embodiments, the computer-readable storage medium 1309 may be a non-transitory computer-readable storage medium, such as a CD ROM disc, or a memory stick. In other embodiments, the computer program 1308 product may be stored on a carrier containing the computer program 1308 just described, wherein the carrier is one of an electronic signal, optical signal, radio signal, or the computer-readable storage medium 1309, as described above.

The second node 112 may comprise a communication interface configured to facilitate communications between the second node 112 and other nodes or devices, e.g., the first node 111, the third node 113, the fourth node 114, the fifth node 115, the wireless device 130, or any other node, or another structure. The interface may, for example, include a transceiver configured to transmit and receive radio signals over an air interface in accordance with a suitable standard.

In other embodiments, the second node 112 may comprise the following arrangement depicted in FIG. 13b. The second node 112 may comprise a processing circuitry 1304, e.g., one or more processors such as the processor 1304, in the second node 112 and the memory 1305. The second node 112 may also comprise a radio circuitry 1310, which may comprise e.g., the receiving port 1306 and the sending port 1307. The processing circuitry 1304 may be configured to, or operable to, perform the method actions according to FIG.

8, FIGS. 9-10 and/or FIGS. 15-19, in a similar manner as that described in relation to FIG. 13a. The radio circuitry 1310 may be configured to set up and maintain at least a wireless connection with the first node 111, the third node 113, the fourth node 114, the fifth node 115, the wireless device 130, and/or any other node. Circuitry may be understood herein as a hardware component.

Hence, embodiments herein also relate to the second node 112 operative to operate in the communications network 100. The second node 112 may comprise the processing circuitry 1304 and the memory 1305, said memory 1305 containing instructions executable by said processing circuitry 1304, whereby the second node 112 is further operative to perform the actions described herein in relation to the second node 112, e.g., in FIG. 8, FIGS. 9-10 and/or FIGS. 15-19.

As used herein, the expression "at least one of:" followed by a list of alternatives separated by commas, and wherein the last alternative is preceded by the "and" term, may be understood to mean that only one of the list of alternatives may apply, more than one of the list of alternatives may apply or all of the list of alternatives may apply. This expression may be understood to be equivalent to the expression "at least one of:" followed by a list of alternatives separated by commas, and wherein the last alternative is preceded by the "or" term.

When using the word "comprise" or "comprising" it shall be interpreted as non-limiting, i.e. meaning "consist at least of".

A processor may be understood herein as a hardware component.

The embodiments herein are not limited to the above described preferred embodiments. Various alternatives, modifications and equivalents may be used. Therefore, the above embodiments should not be taken as limiting the scope of the invention.

Further Extensions and Variations

Figure 14:
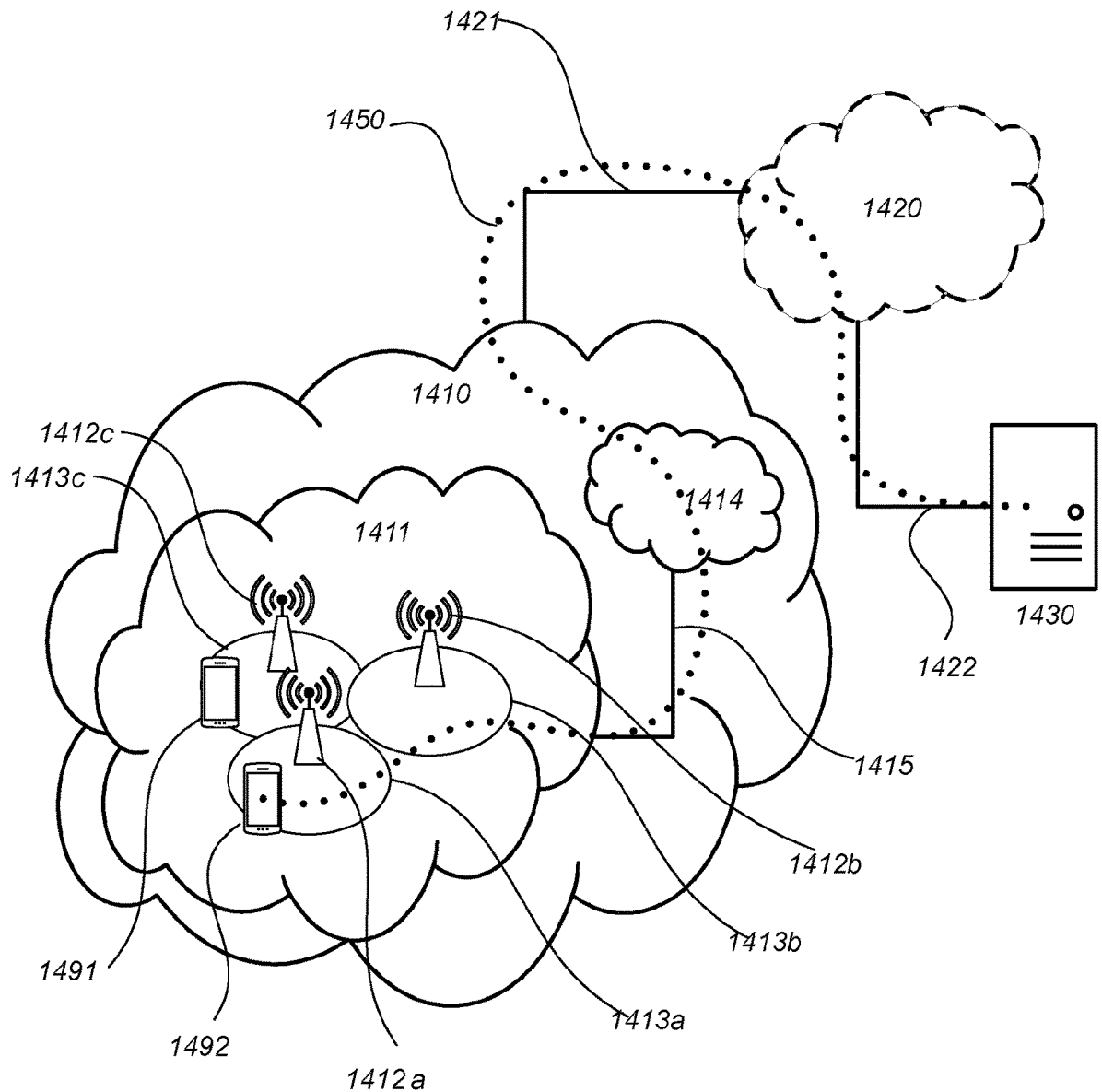
FIG. 14 is a schematic block diagram illustrating a telecommunication network connected via an intermediate network to a host computer, according to embodiments herein.

FIG. 14: Telecommunication Network Connected Via an Intermediate Network to a Host Computer in Accordance with Some Embodiments With reference to FIG. 14, in accordance with an embodiment, a communication system includes telecommunication network 1410 such as the communications network 100, for example, a 3GPP-type cellular network, which comprises access network 1411, such as a radio access network, and core network 1414. Access network 1411 comprises a plurality of network nodes such as any of the first node 111, the second node 112 and/or the fourth node 114. For example, base stations 1412a, 1412b, 1412c, such as NBs, eNBs, gNBs or other types of wireless access points, each defining a corresponding coverage area 1413a, 1413b, 1413c. Each base station 1412a, 1412b, 1412c is connectable to core network 1414 over a wired or wireless connection 1415. In FIG. 14, a first UE 1491 located in coverage area 1413c is configured to wirelessly connect to, or be paged by, the corresponding base station 1412c. A second UE 1492 in coverage area 1413a is wirelessly connectable to the corresponding base station 1412a. While a plurality of UEs 1491, 1492 are illustrated in this example, the disclosed embodiments are equally applicable to a situation where a sole UE is in the coverage area or where a sole UE is connecting to the corresponding base station 1412. Any of the UEs 1491, 1492 may be considered to, under certain circumstances, to act as examples of the first node 111, and/or the second node 112, e.g., of its respective MT function, and/or of the wireless device 130.

Telecommunication network 1410 is itself connected to host computer 1430, which may be embodied in the hardware and/or software of a standalone server, a cloud-implemented server, a distributed server or as processing resources in a server farm. Host computer 1430 may be under the ownership or control of a service provider, or may be operated by the service provider or on behalf of the service provider. Connections 1421 and 1422 between telecommunication network 1410 and host computer 1430 may extend directly from core network 1414 to host computer 1430 or may go via an optional intermediate network 1420. Intermediate network 1420 may be one of, or a combination of more than one of, a public, private or hosted network; intermediate network 1420, if any, may be a backbone network or the Internet; in particular, intermediate network 1420 may comprise two or more sub-networks (not shown).

The communication system of FIG. 14 as a whole enables connectivity between the connected UEs 1491, 1492 and host computer 1430. The connectivity may be described as an over-the-top (OTT) connection 1450. Host computer 1430 and the connected UEs 1491, 1492 are configured to communicate data and/or signaling via OTT connection 1450, using access network 1411, core network 1414, any intermediate network 1420 and possible further infrastructure (not shown) as intermediaries. OTT connection 1450 may be transparent in the sense that the participating communication devices through which OTT connection 1450 passes are unaware of routing of uplink and downlink communications. For example, base station 1412 may not or need not be informed about the past routing of an incoming downlink communication with data originating from host computer 1430 to be forwarded (e.g., handed over) to a connected UE 1491. Similarly, base station 1412 need not be aware of the future routing of an outgoing uplink communication originating from the UE 1491 towards the host computer 1430.

In relation to FIGS. 15, 16, 17, 18, and 19, which are described next, it may be understood that a UE may be considered to, under certain circumstances, to act as examples of the first node 111, and/or the second node 112, e.g., of its respective MT function, and that any description provided for the UE equally applies to the MT function of the first node 111, and/or the second node 112, and/or the wireless device 130. It may be also understood that the base station is an example of any of the first node 111, and/or the fourth node 114, and that any description provided for the base station equally applies to any of the first node 111, and/or the fourth node 114.

Figure 15:
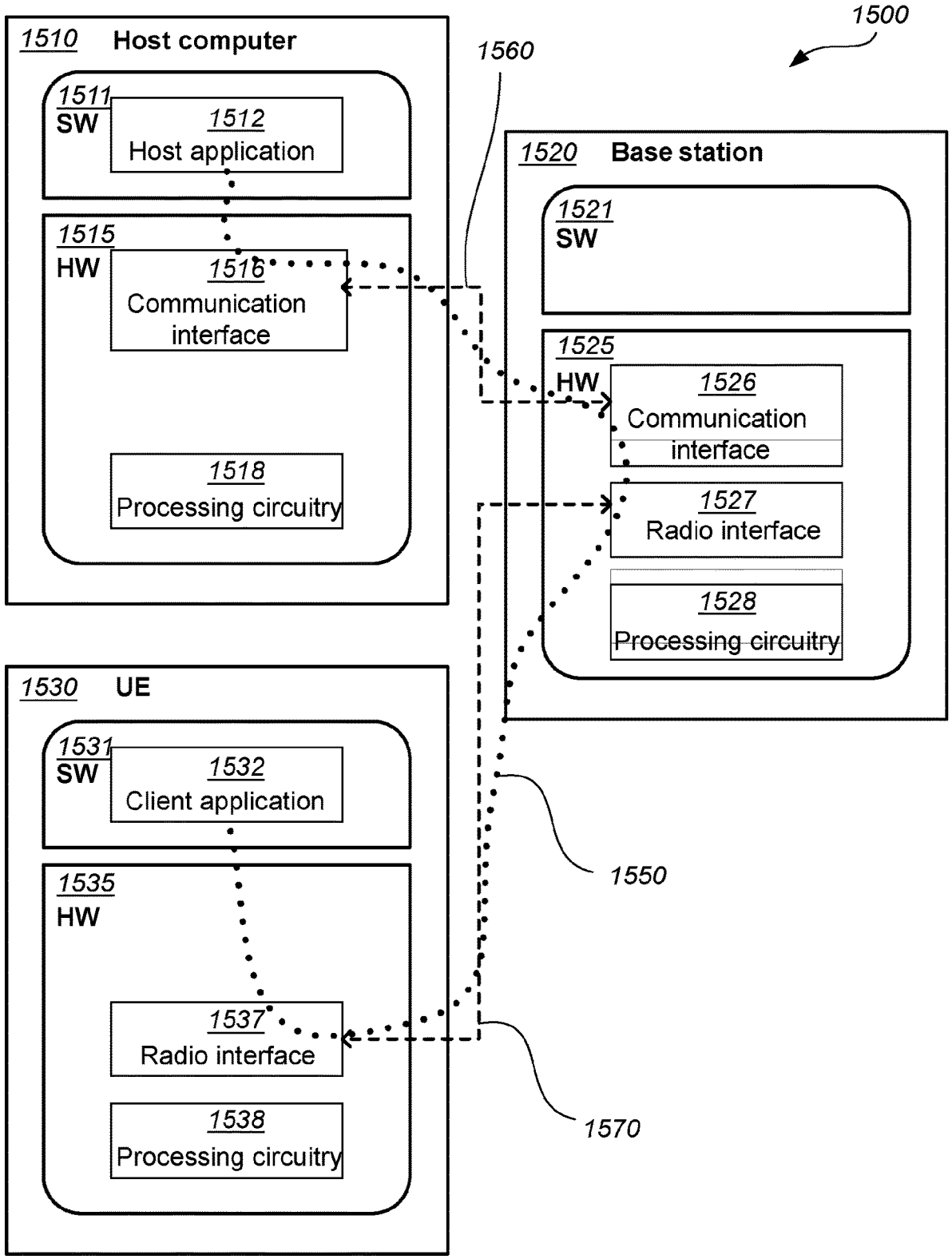
FIG. 15 is a generalized block diagram of a host computer communicating via a base station with a user equipment over a partially wireless connection, according to embodiments herein.

FIG. 15: Host Computer Communicating Via a Base Station with a User Equipment Over a Partially Wireless Connection in Accordance with Some Embodiments Example implementations, in accordance with an embodiment, of the UE, as an example of the first node 111, and/or the second node 112, e.g., of its respective MT function, and/or of the wireless device 130, any of the first node 111, the second node 112, and/or the fourth node 114, e.g., a base station and host computer discussed in the preceding paragraphs will now be described with reference to FIG. 15. In communication system 1500, such as the communications network 100, host computer 1510 comprises hardware 1515 including communication interface 1516 configured to set up and maintain a wired or wireless connection with an interface of a different communication device of communication system 1500. Host computer 1510 further comprises processing circuitry 1518, which may have storage and/or processing capabilities. In particular, processing circuitry 1518 may comprise one or more programmable processors, application-specific integrated circuits, field programmable gate arrays or combinations of these (not shown) adapted to execute instructions. Host computer 1510 further comprises software 1511, which is stored in or accessible by host computer 1510 and executable by processing circuitry 1518. Software 1511 includes host application 1512. Host application 1512 may be operable to provide a service to a remote user, such as UE 1530 connecting via OTT connection 1550 terminating at UE 1530 and host computer 1510. In providing the service to the remote user, host application 1512 may provide user data which is transmitted using OTT connection 1550.

Communication system 1500 further includes any of the first node 111, the second node 112, and/or the fourth node 114, exemplified in FIG. 15 as a base station 1520 provided in a telecommunication system and comprising hardware 1525 enabling it to communicate with host computer 1510 and with UE 1530. Hardware 1525 may include communication interface 1526 for setting up and maintaining a wired or wireless connection with an interface of a different communication device of communication system 1500, as well as radio interface 1527 for setting up and maintaining at least wireless connection 1570 with the first node 111, the second node 112, and/or the wireless device 130, exemplified in FIG. 15 as a UE 1530 located in a coverage area (not shown in FIG. 15) served by base station 1520. Communication interface 1526 may be configured to facilitate connection 1560 to host computer 1510. Connection 1560 may be direct or it may pass through a core network (not shown in FIG. 15) of the telecommunication system and/or through one or more intermediate networks outside the telecommunication system. In the embodiment shown, hardware 1525 of base station 1520 further includes processing circuitry 1528, which may comprise one or more programmable processors, application-specific integrated circuits, field programmable gate arrays or combinations of these (not shown) adapted to execute instructions. Base station 1520 further has software 1521 stored internally or accessible via an external connection.

Communication system 1500 further includes UE 1530 already referred to. Its hardware 1535 may include radio interface 1537 configured to set up and maintain wireless connection 1570 with a base station serving a coverage area in which UE 1530 is currently located. Hardware 1535 of UE 1530 further includes processing circuitry 1538, which may comprise one or more programmable processors, application-specific integrated circuits, field programmable gate arrays or combinations of these (not shown) adapted to execute instructions. UE 1530 further comprises software 1531, which is stored in or accessible by UE 1530 and executable by processing circuitry 1538. Software 1531 includes client application 1532. Client application 1532 may be operable to provide a service to a human or non-human user via UE 1530, with the support of host computer 1510. In host computer 1510, an executing host application 1512 may communicate with the executing client application 1532 via OTT connection 1550 terminating at UE 1530 and host computer 1510. In providing the service to the user, client application 1532 may receive request data from host application 1512 and provide user data in response to the request data. OTT connection 1550 may transfer both the request data and the user data. Client application 1532 may interact with the user to generate the user data that it provides.

It is noted that host computer 1510, base station 1520 and UE 1530 illustrated in FIG. 15 may be similar or identical to host computer 1430, one of base stations 1412*a*, 1412*b*, 1412*c* and one of UEs 1491, 1492 of FIG. 14, respectively. This is to say, the inner workings of these entities may be as shown in FIG. 15 and independently, the surrounding network topology may be that of FIG. 14.

In FIG. 15, OTT connection 1550 has been drawn abstractly to illustrate the communication between host computer 1510 and UE 1530 via base station 1520, without explicit reference to any intermediary devices and the precise routing of messages via these devices. Network infrastructure may determine the routing, which it may be configured to hide from UE 1530 or from the service provider operating host computer 1510, or both. While OTT connection 1550 is active, the network infrastructure may further take decisions by which it dynamically changes the routing (e.g., on the basis of load balancing consideration or reconfiguration of the network).

Wireless connection 1570 between UE 1530 and base station 1520 is in accordance with the teachings of the embodiments described throughout this disclosure. One or more of the various embodiments improve the performance of OTT services provided to UE 1530 using OTT connection 1550, in which wireless connection 1570 forms the last segment. More precisely, the teachings of these embodiments may improve the latency, signalling overhead, and service interruption and thereby provide benefits such as reduced user waiting time, better responsiveness and extended battery lifetime.

A measurement procedure may be provided for the purpose of monitoring data rate, latency and other factors on which the one or more embodiments improve. There may further be an optional network functionality for reconfiguring OTT connection 1550 between host computer 1510 and UE 1530, in response to variations in the measurement results. The measurement procedure and/or the network functionality for reconfiguring OTT connection 1550 may be implemented in software 1511 and hardware 1515 of host computer 1510 or in software 1531 and hardware 1535 of UE 1530, or both. In embodiments, sensors (not shown) may be deployed in or in association with communication devices through which OTT connection 1550 passes; the sensors may participate in the measurement procedure by supplying values of the monitored quantities exemplified above, or supplying values of other physical quantities from which software 1511, 1531 may compute or estimate the monitored quantities. The reconfiguring of OTT connection 1550 may include message format, retransmission settings, preferred routing etc.; the reconfiguring need not affect base station 1520, and it may be unknown or imperceptible to base station 1520. Such procedures and functionalities may be known and practiced in the art. In certain embodiments, measurements may involve proprietary UE signaling facilitating host computer 1510's measurements of throughput, propagation times, latency and the like. The measurements may be implemented in that software 1511 and 1531 causes messages to be transmitted, in particular empty or 'dummy' messages, using OTT connection 1550 while it monitors propagation times, errors etc.

The first node 111 embodiments relate to FIG. 6, FIGS. 9-10, FIG. 11 and FIGS. 14-19.

The first node 111 may also be configured to communicate user data with a host application unit in a host computer 1510, e.g., via another link such as 1550.

The first node 111 may comprise an interface unit to facilitate communications between the first node 111 and other nodes or devices, e.g., the second node 112, the third node 113, the fourth node 114, the fifth node 115, the wireless device 130, the host computer 1510, or any of the other nodes. In some particular examples, the interface may, for example, include a transceiver configured to transmit and receive radio signals over an air interface in accordance with a suitable standard.

The first node 111 may comprise an arrangement as shown in FIG. 11 or in FIG. 15.

The fourth node 114 embodiments relate to FIG. 7, FIGS. 9-10, FIG. 12 and FIGS. 14-19.

The fourth node 114 may also be configured to communicate user data with a host application unit in a host computer 1510, e.g., via another link such as 1550.

The fourth node 114 may comprise an interface unit to facilitate communications between the fourth node 114 and other nodes or devices, e.g., the first node 111, the second node 112, the third node 113, the fifth node 115, the core network 120*m* the host computer 1510, or any of the other nodes. In some particular examples, the interface may, for example, include a transceiver configured to transmit and receive radio signals over an air interface in accordance with a suitable standard.

The fourth node 114 may comprise an arrangement as shown in FIG. 12 or in FIG. 15.

The second node 112 embodiments relate to FIG. 8, FIGS. 9-10, FIG. 13 and FIGS. 14-19.

The second node 112 may also be configured to communicate user data with a host application unit in a host computer 1510, e.g., via another link such as 1550.

The second node 112 may comprise an interface unit to facilitate communications between the second node 112 and other nodes or devices, e.g., the first node 111, the third node 113, the fourth node 114, the fifth node 115, the wireless device 130, the host computer 1510, or any of the other nodes. In some particular examples, the interface may, for example, include a transceiver configured to transmit and receive radio signals over an air interface in accordance with a suitable standard.

The second node 112 may comprise an arrangement as shown in FIG. 13 or in FIG. 15.

FIG. 16: Methods Implemented in a Communication System Including a Host Computer, a Base Station and a User Equipment in Accordance with Some Embodiments FIG. 16 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 16 will be included in this section. In step 1610, the host computer provides user data. In substep 1611 (which may be optional) of step 1610, the host computer provides the user data by executing a host application. In step 1620, the host computer initiates a transmission carrying the user data to the UE. In step 1630 (which may be optional), the base station transmits to the UE the user data which was carried in the transmission that the host computer initiated, in accordance with the teachings of the embodiments described throughout this disclosure. In step 1640 (which may also be optional), the UE executes a client application associated with the host application executed by the host computer.

FIG. 17: Methods Implemented in a Communication System Including a Host Computer, a Base Station and a User Equipment in Accordance with Some Embodiments FIG. 17 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 17 will be included in this section. In step 1710 of the method, the host computer provides user data. In an optional substep (not shown) the host computer provides the user data by executing a host application. In step 1720, the host computer initiates a transmission carrying the user data to the UE. The transmission may pass via the base station, in accordance with the teachings of the embodiments described throughout this disclosure. In step 1730 (which may be optional), the UE receives the user data carried in the transmission.

FIG. 18: Methods Implemented in a Communication System Including a Host Computer, a Base Station and a User Equipment in Accordance with Some Embodiments FIG. 18 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 18 will be included in this section. In step 1810 (which may be optional), the UE receives input data provided by the host computer. Additionally or alternatively, in step 1820, the UE provides user data. In substep 1821 (which may be optional) of step 1820, the UE provides the user data by executing a client application. In substep 1811 (which may be optional) of step 1810, the UE executes a client application which provides the user data in reaction to the received input data provided by the host computer. In providing the user data, the executed client application may further consider user input received from the user. Regardless of the specific manner in which the user data was provided, the UE initiates, in substep 1830 (which may be optional), transmission of the user data to the host computer. In step 1840 of the method, the host computer receives the user data transmitted from the UE, in accordance with the teachings of the embodiments described throughout this disclosure.

FIG. 19: Methods Implemented in a Communication System Including a Host Computer, a Base Station and a User Equipment in Accordance with Some Embodiments FIG. 19 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 19 will be included in this section. In step 1910 (which may be optional), in accordance with the teachings of the embodiments described throughout this disclosure, the base station receives user data from the UE. In step 1920 (which may be optional), the base station initiates transmission of the received user data to the host computer. In step 1930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Further Numbered Embodiments

1. A base station configured to communicate with a user equipment (UE), the base station comprising a radio interface and processing circuitry configured to perform one or more of the actions described herein as performed by any of the first node 111, the second node 112 and/or the fourth node 114.

5. A communication system including a host computer comprising:
   processing circuitry configured to provide user data; and
   a communication interface configured to forward the user data to a cellular network for transmission to a user equipment (UE),
   wherein the cellular network comprises a base station having a radio interface and processing circuitry, the base station's processing circuitry configured to perform one or more of the actions described herein as performed by any of the first node 111, the second node 112 and/or the fourth node 114.

6. The communication system of embodiment 5, further including the base station.

7. The communication system of embodiment 6, further including the UE, wherein the UE is configured to communicate with the base station.

8. The communication system of embodiment 7, wherein:
   the processing circuitry of the host computer is configured to execute a host application, thereby providing the user data; and
   the UE comprises processing circuitry configured to execute a client application associated with the host application.

11. A method implemented in a base station, comprising one or more of the actions described herein as performed by any of the first node 111, the second node 112 and/or the fourth node 114.

15. A method implemented in a communication system including a host computer, a base station and a user equipment (UE), the method comprising:
   at the host computer, providing user data; and
   at the host computer, initiating a transmission carrying the user data to the UE via a cellular network comprising the base station, wherein the base station performs one or more of the actions described herein as performed by any of the first node 111, the second node 112 and/or the fourth node 114.

16. The method of embodiment 15, further comprising:
   at the base station, transmitting the user data.

17. The method of embodiment 16, wherein the user data is provided at the host computer by executing a host application, the method further comprising:
   at the UE, executing a client application associated with the host application.

21. A user equipment (UE) configured to communicate with a base station, the UE comprising a radio interface and processing circuitry configured to perform one or more of the actions described herein as performed by the first node 111, the second node 112 or the wireless device 130.

25. A communication system including a host computer comprising:
   processing circuitry configured to provide user data; and
   a communication interface configured to forward user data to a cellular network for transmission to a user equipment (UE),
   wherein the UE comprises a radio interface and processing circuitry, the UE's processing circuitry configured to perform one or more of the actions described herein as performed by the first node 111, the second node 112 or the wireless device 130.

26. The communication system of embodiment 25, further including the UE.

27. The communication system of embodiment 26, wherein the cellular network further includes a base station configured to communicate with the UE.

28. The communication system of embodiment 26 or 27, wherein:
   the processing circuitry of the host computer is configured to execute a host application, thereby providing the user data; and
   the UE's processing circuitry is configured to execute a client application associated with the host application.

31. A method implemented in a user equipment (UE), comprising one or more of the actions described herein as performed by the first node 111, the second node 112 or the wireless device 130.

35. A method implemented in a communication system including a host computer, a base station and a user equipment (UE), the method comprising:
   at the host computer, providing user data; and
   at the host computer, initiating a transmission carrying the user data to the UE via a cellular network comprising the base station, wherein the UE performs one or more of the actions described herein as performed by the first node 111, the second node 112 or the wireless device 130.

36. The method of embodiment 35, further comprising:
   at the UE, receiving the user data from the base station.

41. A user equipment (UE) configured to communicate with a base station, the UE comprising a radio interface and processing circuitry configured to perform one or more of the actions described herein as performed by the first node 111, the second node 112 or the wireless device 130.

45. A communication system including a host computer comprising:
   a communication interface configured to receive user data originating from a transmission from a user equipment (UE) to a base station,
   wherein the UE comprises a radio interface and processing circuitry, the UE's processing circuitry configured to: perform one or more of the actions described herein as performed by the first node 111, the second node 112 or the wireless device 130.

46. The communication system of embodiment 45, further including the UE.
47. The communication system of embodiment 46, further including the base station, wherein the base station comprises a radio interface configured to communicate with the UE and a communication interface configured to forward to the host computer the user data carried by a transmission from the UE to the base station.
48. The communication system of embodiment 46 or 47, wherein:
    the processing circuitry of the host computer is configured to execute a host application; and
    the UE's processing circuitry is configured to execute a client application associated with the host application, thereby providing the user data.
49. The communication system of embodiment 46 or 47, wherein:
    the processing circuitry of the host computer is configured to execute a host application, thereby providing request data; and
    the UE's processing circuitry is configured to execute a client application associated with the host application, thereby providing the user data in response to the request data.
51. A method implemented in a user equipment (UE), comprising one or more of the actions described herein as performed by the first node 111, the second node 112 or the wireless device 130.
52. The method of embodiment 51, further comprising:
    providing user data; and
    forwarding the user data to a host computer via the transmission to the base station.
55. A method implemented in a communication system including a host computer, a base station and a user equipment (UE), the method comprising:
    at the host computer, receiving user data transmitted to the base station from the UE, wherein the UE performs one or more of the actions described herein as performed by the first node 111, the second node 112 or the wireless device 130.
56. The method of embodiment 55, further comprising:
    at the UE, providing the user data to the base station.
57. The method of embodiment 56, further comprising:
    at the UE, executing a client application, thereby providing the user data to be transmitted; and
    at the host computer, executing a host application associated with the client application.
58. The method of embodiment 56, further comprising:
    at the UE, executing a client application; and
    at the UE, receiving input data to the client application, the input data being provided at the host computer by executing a host application associated with the client application,
    wherein the user data to be transmitted is provided by the client application in response to the input data.
61. A base station configured to communicate with a user equipment (UE), the base station comprising a radio interface and processing circuitry configured to perform one or more of the actions described herein as performed by any of the first node 111, the second node 112 and/or the fourth node 114.
65. A communication system including a host computer comprising a communication interface configured to receive user data originating from a transmission from a user equipment (UE) to a base station, wherein the base station comprises a radio interface and processing circuitry, the base station's processing circuitry configured to perform one or more of the actions described herein as performed by any of the first node 111, the second node 112 and/or the fourth node 114.
66. The communication system of embodiment 65, further including the base station.
67. The communication system of embodiment 66, further including the UE, wherein the UE is configured to communicate with the base station.
68. The communication system of embodiment 67, wherein:
    the processing circuitry of the host computer is configured to execute a host application;
    the UE is configured to execute a client application associated with the host application, thereby providing the user data to be received by the host computer.
71. A method implemented in a base station, comprising one or more of the actions described herein as performed by any of the first node 111, the second node 112 and/or the fourth node 114.
75. A method implemented in a communication system including a host computer, a base station and a user equipment (UE), the method comprising:
    at the host computer, receiving, from the base station, user data originating from a transmission which the base station has received from the UE, wherein the UE performs one or more of the actions described herein as performed by the first node 111, the second node 112 or the wireless device 130.
76. The method of embodiment 75, further comprising:
    at the base station, receiving the user data from the UE.
77. The method of embodiment 76, further comprising:
    at the base station, initiating a transmission of the received user data to the host computer.

REFERENCES

1. TS 38.331

The invention claimed is:

1. A method performed by a first node, the first node operating in a communications network, the method comprising:
    determining, based on a header of a packet, a first number of hops the packet has to traverse in the communications network to reach a second node in the communications network, the header of the packet indicating a second number of hops between the second node and a third node in the communications network in a first path, the first node obtaining a wired backhaul connection to a core network of the communications network from the third node;
    initiating routing the packet towards the second node based on the determined first number of hops; and
    obtaining, from a fourth node, a first list of BAP addresses, each of the BAP addresses in the obtained first list corresponding to each node in the communications network to which the fourth node provides the wired backhaul connection to the core network of the communications network, each of the BAP addresses in the obtained first list being based on a respective fifth number of hops between the third node and each node in the communications network to which the third node provides the wired backhaul connection to the core network.

2. The method according to claim 1, wherein the header comprises an address and an identifier, ID, of a route to be followed by the packet in the communications network.

3. The method according to claim 1, wherein the communications network is an Integrated Access Backhaul, IAB, network, and wherein an address is a Backhaul Adaptation Protocol, BAP, address and an identifier is a BAP routing ID.

4. The method according to claim 1, wherein the initiating of the routing is further based on a quality of service associated with the packet.

5. The method according to claim 1, further comprising:
obtaining a first Backhaul Adaptation Protocol, BAP, address, from the fourth node operating in the communications network, the obtained first BAP address being based on a third number of hops between the first node and the third node in the communications network in a second path.

6. The method according to claim 1, further comprising:
obtaining a second BAP address, from the fourth node, the obtained second BAP address being based on a fourth number of hops between the third node and the first node in the communications network in a third path.

7. The method according to claim 6, wherein a second path has a first path identifier indicating a third number of hops, and wherein the third path has a second path identifier indicating the fourth number of hops.

8. The method according to claim 1, further comprising at least one of:
obtaining a third BAP address from the fourth node, the obtained third BAP address being based on an updated sixth number of hops between the third node and the first node in the communications network; and
obtaining, from the fourth node, a second list of BAP addresses, wherein the obtained second list comprises at least one updated BAP address based on an updated seventh number of hops between the third node and at least one node in the communications network to which the third node provides a wired backhaul connection to the core network.

9. The method according to claim 1, wherein the third node is an Integrated Access Backhaul Donor Distributed Unit, IAB-Donor DU.

10. The method according to claim 3, wherein the fourth node is an Integrated Access Backhaul Donor Central Unit, IAB-Donor CU.

11. The method according to claim 4, wherein the initiating routing comprises selecting between at least two different paths, each of the at least two different paths being associated with a respective first number of hops between the first node and the second node, determined based on a respective BAP address for the second node for each path, the selecting being based on the quality of service to be fulfilled for the packet.

12. The method according to claim 5, wherein the first node receives a second packet via at least one of the second path and a third path, based on a quality of service to be fulfilled for the second packet.

13. The method according to claim 1, wherein the initiating routing is further based on a fourth BAP address of a next hop node towards the second node.

14. The method according to claim 13, wherein the packet is comprised in a set of packets to be scheduled by the first node, and wherein the first node schedules the packets according to at least one of:

a. a first descending order of a first respective amount of hops for the packets until their respective destination nodes, based on a respective BAP address of the respective destination nodes; and b. a second descending order of a second respective amount of hops from respective next hop nodes for the packets and their respective destination nodes, based on a respective BAP address of the respective destination nodes, and a respective BAP address of the respective next hop nodes.

15. A first node configured to operate in a communications network, the first node comprising processing circuitry configured to:
determine, based on a header of a packet, a first number of hops the packet is configured to have to traverse in the communications network to reach a second node in the communications network, the header of the packet being configured to indicate a second number of hops between the second node and a third node in the communications network in a first path, the first node being configured to obtain a wired backhaul connection to a core network of the communications network from the third node; and
initiate routing the packet towards the second node based on the first number of hops configured to be determined; and
obtain, from a fourth node, a first list of BAP addresses, each of the BAP addresses in the obtained first list corresponding to each node in the communications network to which the fourth node provides the wired backhaul connection to the core network of the communications network, each of the BAP addresses in the obtained first list being based on a respective fifth number of hops between the third node and each node in the communications network to which the third node provides the wired backhaul connection to the core network.

16. The first node according to claim 15, wherein the header is configured to comprise an address and an identifier, ID, of a route configured to be followed by the packet in the communications network.

17. The first node according to claim 15, wherein the communications network is configured to be an Integrated Access Backhaul, IAB, network, and wherein an address is configured to be a Backhaul Adaptation Protocol, BAP, address and an identifier is configured to be a BAP routing ID.

18. The first node according to claim 15, wherein the initiating of the routing is further configured to be based on a quality of service configured to be associated with the packet.

19. The first node according to claim 15, being further configured to:
obtain a first Backhaul Adaptation Protocol, BAP, address, from the fourth node configured to operate in the communications network, the first BAP address configured to be obtained is configured to be based on a third number of hops between the first node and the third node in the communications network in a second path.

* * * * *